United States Patent
Chen et al.

(10) Patent No.: US 11,285,781 B2
(45) Date of Patent: Mar. 29, 2022

(54) FLUID HEAT EXCHANGE ASSEMBLY, AND HEAT MANAGEMENT SYSTEM OF VEHICLE

(71) Applicant: Zhejiang Sanhua Intelligent Controls Co., Ltd, Shaoxing (CN)

(72) Inventors: Zhenwen Chen, Hangzhou (CN); Jianmin Zhang, Hangzhou (CN); Kezhe Qian, Hangzhou (CN); Shifeng Hu, Hangzhou (CN)

(73) Assignee: Zhejiang Sanhua Intelligent Controls Co., Ltd, Shaoxing (CN)

( * ) Notice: Subject to any disclaimer, the term of this patent is extended or adjusted under 35 U.S.C. 154(b) by 243 days.

(21) Appl. No.: 16/337,092

(22) PCT Filed: Nov. 9, 2017

(86) PCT No.: PCT/CN2017/110106
§ 371 (c)(1),
(2) Date: Mar. 27, 2019

(87) PCT Pub. No.: WO2018/086553
PCT Pub. Date: May 17, 2018

(65) Prior Publication Data
US 2020/0031198 A1 Jan. 30, 2020

(30) Foreign Application Priority Data
Nov. 9, 2016 (CN) .......................... 201610986593.2
Nov. 9, 2016 (CN) .......................... 201610986726.6
(Continued)

(51) Int. Cl.
*B60H 1/00* (2006.01)

(52) U.S. Cl.
CPC ..... *B60H 1/00885* (2013.01); *B60H 1/00278* (2013.01); *B60H 1/00342* (2013.01)

(58) Field of Classification Search
CPC ............ B60H 1/00278; B60H 1/00342; B60H 1/00485; B60H 1/00885; F28F 3/086;
(Continued)

(56) References Cited

U.S. PATENT DOCUMENTS 3,461,956 A * 8/1969 Otto ...................... F28D 9/0037
165/166
5,896,835 A * 4/1999 Kato ...................... F28D 9/005
123/73 A
(Continued)

FOREIGN PATENT DOCUMENTS

CN 103134358 A 6/2013
CN 103328914 A 9/2013
(Continued)

OTHER PUBLICATIONS

Office Action dated May 26, 2020 in corresponding EP App. No. 17870379.9.
(Continued)

*Primary Examiner* — Jianying C Atkisson
*Assistant Examiner* — Jose O Class-Quinones
(74) *Attorney, Agent, or Firm* — Boyle Fredrickson S.C.

(57) ABSTRACT

A fluid heat exchange assembly includes a fluid control module and a fluid heat exchange module, the fluid control module includes a first connecting lateral portion, the fluid heat exchange module includes a second connecting lateral portion; the first connecting lateral portion and the second connecting lateral portion are oppositely and sealingly arranged; the fluid heat exchange module includes a heat exchange core and a connecting component fixed by welding; the fluid control module includes at least a first flow passage and a second flow passage; the fluid heat exchange module includes a first fluid communication cavity, and the second flow passage is in communication with the first fluid
(Continued)

communication cavity; the connecting component includes a connecting channel, the connecting channel penetrates through the connecting component. The fluid heat exchange assembly reduces pipeline arrangement and is of a small and compact integral structure.

19 Claims, 23 Drawing Sheets

(30) Foreign Application Priority Data

| | | |
|---|---|---|
| Nov. 9, 2016 | (CN) | 201610986790.4 |
| Dec. 9, 2016 | (CN) | 201611126787.1 |
| May 26, 2017 | (CN) | 201710382932.0 |
| May 26, 2017 | (CN) | 201720597680.9 |
| May 26, 2017 | (CN) | 201720597964.8 |
| May 26, 2017 | (CN) | 201720597974.1 |
| May 26, 2017 | (CN) | 201720598045.2 |
| May 26, 2017 | (CN) | 201720602900.2 |

(58) Field of Classification Search
CPC ...... F28F 2250/06; F28F 9/0253; F28F 9/266; F28F 27/02; F28F 2280/06; F28D 9/005; F28D 9/0093; F28D 2021/008; F28D 2021/009; F16K 11/074; F16K 11/0746; F16K 11/076; F16K 3/314; F16K 27/04; F16K 27/045; F16K 27/048; F16K 3/08; F16K 31/44
See application file for complete search history.

(56) References Cited

U.S. PATENT DOCUMENTS

| | | | | |
|---|---|---|---|---|
| 6,182,749 | B1* | 2/2001 | Brost | F01M 5/007 |
| | | | | 123/196 AB |
| 7,748,442 | B2* | 7/2010 | Kalbacher | F16H 57/0412 |
| | | | | 165/299 |
| 9,093,729 | B2* | 7/2015 | Wesner | B60H 1/00 |
| 9,121,643 | B2* | 9/2015 | Schaefer | H01M 10/6568 |
| 9,322,319 | B2* | 4/2016 | Kim | F01P 11/08 |
| 9,360,262 | B2* | 6/2016 | Kim | F28F 27/02 |
| 9,383,144 | B2* | 7/2016 | Stoll | F28D 9/005 |
| 9,464,853 | B2* | 10/2016 | Sheppard | F28F 27/00 |
| 9,810,491 | B2* | 11/2017 | Kim | F28F 9/005 |
| 9,945,623 | B2* | 4/2018 | Sheppard | F28D 9/005 |
| 2003/0235731 | A1* | 12/2003 | Haltiner, Jr. | H01M 8/04089 |
| | | | | 429/434 |
| 2011/0005741 | A1* | 1/2011 | Sheppard | G05D 23/022 |
| | | | | 165/297 |
| 2012/0061048 | A1 | 3/2012 | Ohi et al. | |
| 2012/0210746 | A1* | 8/2012 | Kadle | F28D 9/0093 |
| | | | | 62/498 |
| 2012/0216562 | A1* | 8/2012 | Kadle | F28D 9/005 |
| | | | | 62/434 |
| 2012/0222846 | A1* | 9/2012 | Kadle | F25B 39/04 |
| | | | | 165/166 |
| 2013/0061584 | A1 | 3/2013 | Gerges et al. | |
| 2013/0319634 | A1 | 12/2013 | Sheppard et al. | |
| 2014/0238641 | A1* | 8/2014 | Gerges | F28D 9/0056 |
| | | | | 165/76 |
| 2014/0246173 | A1* | 9/2014 | Cheadle | F02M 26/26 |
| | | | | 165/103 |
| 2015/0000869 | A1* | 1/2015 | Denoual | F28F 27/02 |
| | | | | 165/96 |
| 2015/0185738 | A1* | 7/2015 | Qiu | G05D 23/1333 |
| | | | | 236/101 A |
| 2015/0276328 | A1 | 10/2015 | Huang et al. | |
| 2015/0316330 | A1* | 11/2015 | Kenney | F28D 9/0056 |
| | | | | 165/167 |
| 2016/0160813 | A1* | 6/2016 | Amaral | F02M 31/14 |
| | | | | 123/557 |
| 2016/0215664 | A1 | 7/2016 | Boyer et al. | |
| 2016/0363399 | A1* | 12/2016 | Kim | F28F 27/02 |
| 2017/0030456 | A1* | 2/2017 | Zou | F16K 11/065 |
| 2018/0347686 | A1* | 12/2018 | Baaso | F16N 39/02 |

FOREIGN PATENT DOCUMENTS

| | | |
|---|---|---|
| CN | 104296422 | 1/2015 |
| CN | 104380028 A | 2/2015 |
| CN | 205373470 U | 7/2016 |
| CN | 205373471 U | 7/2016 |
| JP | 2012057889 | 3/2012 |
| JP | 2014526666 | 10/2014 |
| KR | 20100015470 | 2/2010 |
| WO | 2012095531 | 7/2012 |
| WO | 2016049776 A1 | 4/2016 |

OTHER PUBLICATIONS

Office Action dated Jul. 7, 2020 in JP App. No. 2019-520357.
Office Action dated Apr. 25, 2020 in corresponding KR App. No. 10-2019-7010089.

* cited by examiner

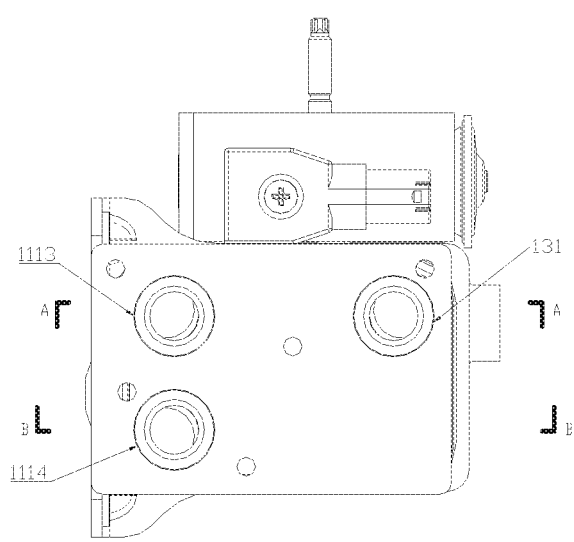
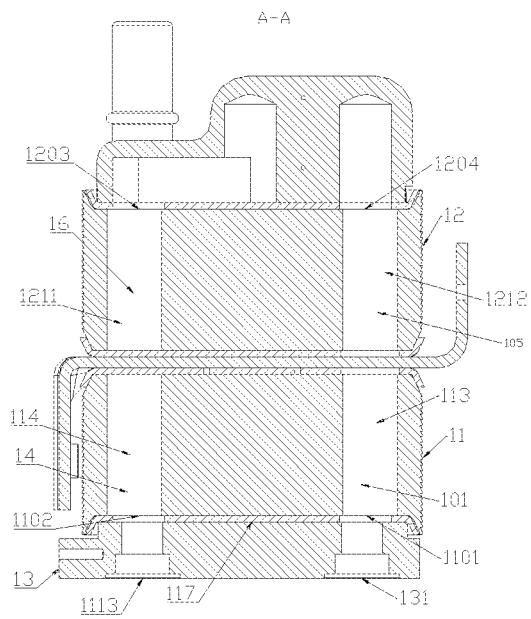
Fig. 17     Fig. 18
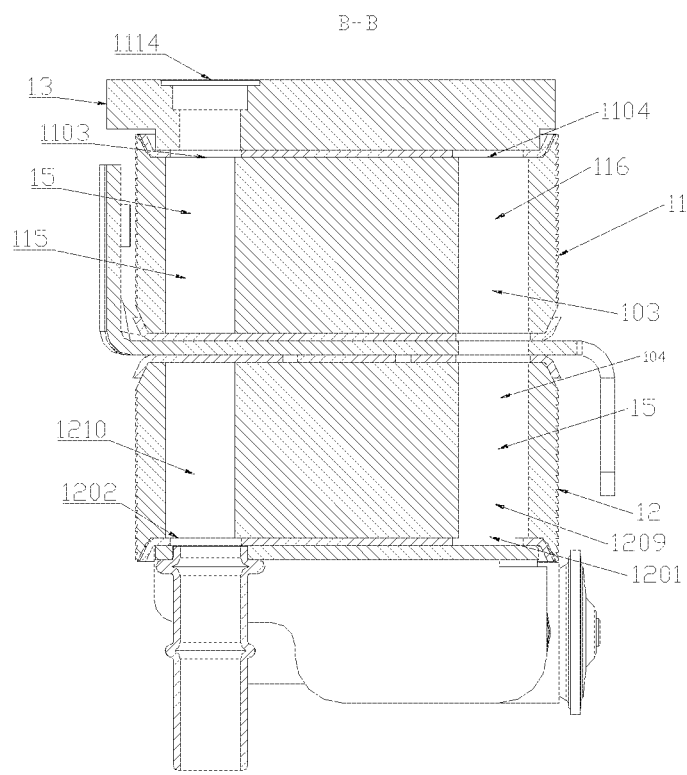
Fig. 19

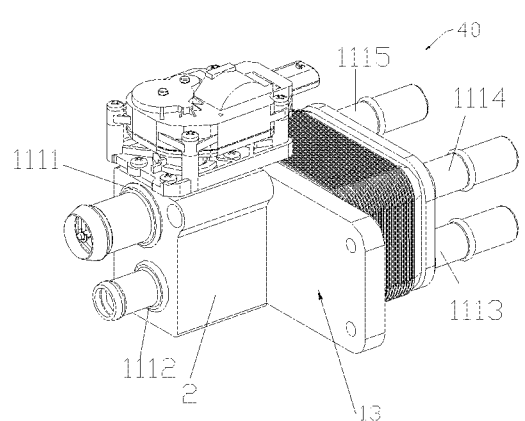
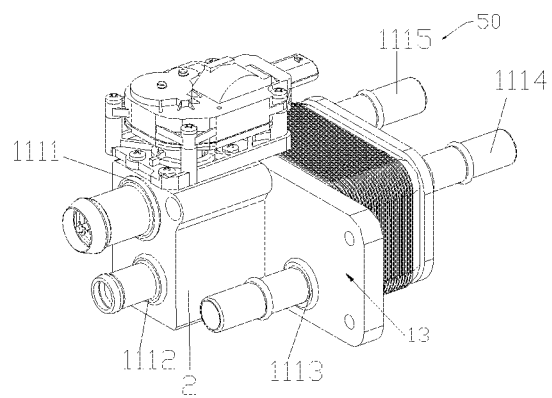
Fig. 36      Fig. 37
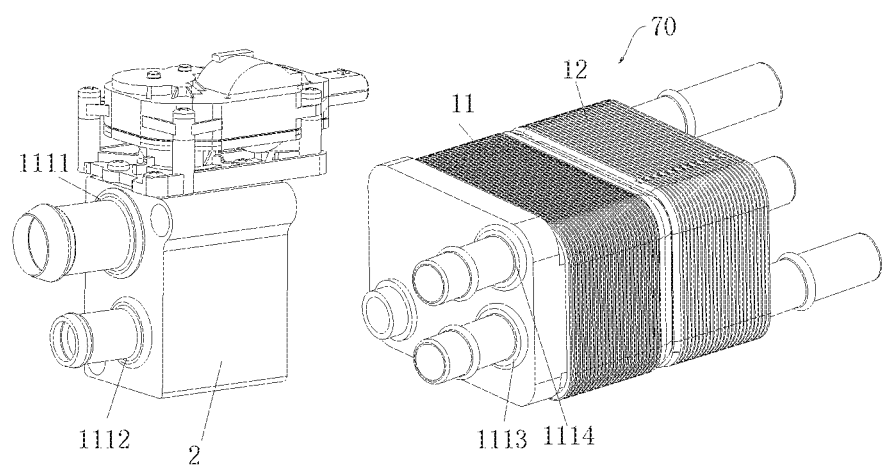
Fig. 38

FLUID HEAT EXCHANGE ASSEMBLY, AND HEAT MANAGEMENT SYSTEM OF VEHICLE

CROSS-REFERENCE TO RELATED APPLICATIONS

The present application is the national phase of International Application No. PCT/CN2017/110106, titled "FLUID HEAT EXCHANGE ASSEMBLY, AND HEAT MANAGEMENT SYSTEM OF VEHICLE", filed on Sep. 11, 2017, which claims priority to the following ten Chinese Patent Applications, the entire disclosures of which are incorporated herein by reference:

1. Chinese Patent Application No. 201610986593.2 titled "FLUID HEAT EXCHANGE ASSEMBLY AND THERMAL MANAGEMENT SYSTEM FOR VEHICLE", filed with the Chinese State Intellectual Property Office on Nov. 9, 2016;
2. Chinese Patent Application No. 201610986726.6 titled "FLUID HEAT EXCHANGE ASSEMBLY AND THERMAL MANAGEMENT SYSTEM FOR VEHICLE", filed with the Chinese State Intellectual Property Office on Nov. 9, 2016;
3. Chinese Patent Application No. 201610986790.4 titled "FLUID HEAT EXCHANGE ASSEMBLY", filed with the Chinese State Intellectual Property Office on Nov. 9, 2016;
4. Chinese Patent Application No. 201611126787.1 titled "FLUID HEAT EXCHANGE ASSEMBLY", filed with the Chinese State Intellectual Property Office on Dec. 9, 2016;
5. Chinese Patent Application No. 201710382932.0 titled "FLUID HEAT EXCHANGE ASSEMBLY", filed with the Chinese State Intellectual Property Office on May 26, 2017;
6. Chinese Patent Application No. 201720597680.9 titled "FLOW CONTROL DEVICE", filed with the Chinese State Intellectual Property Office on May 26, 2017;
7. Chinese Patent Application No. 201720597964.8 titled "FLUID HEAT EXCHANGE ASSEMBLY", filed with the Chinese State Intellectual Property Office on May 26, 2017;
8. Chinese Patent Application No. 201720597974.1 titled "FLUID HEAT EXCHANGE ASSEMBLY", filed with the Chinese State Intellectual Property Office on May 26, 2017;
9. Chinese Patent Application No. 201720598045.2 titled "FLUID HEAT EXCHANGE ASSEMBLY", filed with the Chinese State Intellectual Property Office on May 26, 2017;
10. Chinese Patent Application No. 201720602900.2 titled "FLUID CONTROL DEVICE", filed with the Chinese State Intellectual Property Office on May 26, 2017.

TECHNICAL FIELD

The present application relates to the field of fluid heat exchange.

BACKGROUND OF THE INVENTION

A thermal management system for vehicle is a system that coordinates relationships among heat, engine or battery, and the entire vehicle from the perspective of system integration and entirety, and adopts a comprehensive method to control and optimize the heat transfer. The thermal management system for vehicle can automatically adjust the cooling intensity according to the driving conditions and environmental conditions, to ensure that a cooled object works within an optimal temperature range, thereby optimizing the environmental performance and energy saving effect of the entire vehicle, and improving the running safety of the vehicle and the comfortableness of driving. However, components used in the thermal management system for vehicle and the entire vehicle are generally installed separately. These components occupy a large installation space, and many pipes are required.

SUMMARY OF THE INVENTION

An object of the present application is to provide a fluid heat exchange assembly and a thermal management system for vehicle, so that pipe arrangement is reduced, and the integral structure is small and compact.

In order to achieve the above object, a technical solution is provided as follows: a fluid heat exchange assembly includes a fluid control module and a fluid heat exchange module, wherein the fluid control module includes a first connecting lateral portion, the fluid heat exchange module includes a second connecting lateral portion; the first connecting lateral portion and the second connecting lateral portion are oppositely and sealingly arranged; the fluid heat exchange module includes a heat exchange core and a connecting component fixed by welding; the connecting component is provided with the second connecting lateral portion; the connecting component includes a third connecting lateral portion, the heat exchange core includes a fourth connecting lateral portion, and the third connecting lateral portion and the fourth connecting lateral portion are fixed by welding; the fluid control module includes at least a first flow passage and a second flow passage, the first flow passage is able to be in communication with the second flow passage; the fluid heat exchange module includes a first fluid communication cavity, and the second flow passage is in communication with the first fluid communication cavity; the connecting component includes a connecting channel, the connecting channel penetrates through the connecting component, and the second flow passage with the first fluid communication cavity are connected by the connecting channel.

In order to achieve the above object, a technical solution is provided as follows: a thermal management system for vehicle includes a battery assembly and the fluid heat exchange assembly according to the above solution, wherein the fluid control module includes the first flow passage, the second flow passage and the third flow passage. The fluid heat exchange module includes the first fluid communicating cavity and a second fluid communication cavity, the first fluid communication cavity and the second fluid communication cavity are isolated from each other in the fluid heat exchange module. The fluid heat exchange assembly includes a first outer port, a second outer port, a third outer port, a fourth outer port and a fifth outer port, the first outer port is in communication with the first flow passage, the second outer port is in communication with the third flow passage, the second flow passage is in communication with the first fluid communication cavity, the fourth outer port is in communication with the second fluid communication cavity, and the fifth outer port is in communication with the second fluid communication cavity. An inlet and an outlet of the battery assembly are in communication with the first outer port and the second outer port.

In order to achieve the above object, a technical solution is provided as follows:

a thermal management system for vehicle includes the fluid heat exchange assembly according to the above solution, the thermal management system for vehicle includes a coolant and a refrigerant, a first fluid is in the first fluid communication cavity, a second fluid is in the second fluid communication cavity, the coolant is defined as the first fluid, and the refrigerant is defined as the second fluid;

the fluid control module includes the first flow passage, the second flow passage and the third flow passage, the fluid heat exchange module includes the first fluid communicating cavity and a second fluid communication cavity, the first fluid communication cavity and the second fluid communication cavity are isolated from each other in the fluid heat exchange module, the fluid heat exchange assembly includes a first outer port, a second outer port, a third outer port, a fourth outer port and a fifth outer port, the first outer port is in communication with the first flow passage, the second outer port is in communication with the third flow passage, the second flow passage is in communication with the first fluid communication cavity, the fourth outer port is in communication with the second fluid communication cavity, and the fifth outer port is in communication with the second fluid communication cavity; the second fluid flows through the fourth outer port, the second fluid communication cavity and the fifth outer port;

the thermal management system for vehicle at least includes following operating states:

a first operating state, wherein: the first flow passage is not in communication with the second flow passage, the first fluid flows through the first outer port, the first flow passage, the third flow passage and the second outer port; and a second operating state, wherein: the first flow passage is in communication with the second flow passage, a flow rate of a fluid flowing into the second flow passage is controlled and can be regulated by a first valve core member; a part of the first fluid flows through the first outer port, the first flow passage, the second flow passage, the first fluid communication cavity and the third outer port, another part of the first fluid flows through the first outer port, the first flow passage, the third flow passage and the second outer port.

The above technical solutions according to the present application include the fluid control module and the fluid heat exchange module. The fluid heat exchange assembly integrates functions of fluid communication and fluid heat exchange, reduces the pipe arrangement and has a compact structure and a small installation space, and the heat wasting on the pipelines is reduced.

BRIEF DESCRIPTION OF THE DRAWINGS

FIG. 17 is a schematic front view of the fluid heat exchange module in FIG. 1;

FIG. 18 is a sectional schematic view taken along A-A in FIG. 17;

FIG. 19 is a sectional schematic view taken along B-B in FIG. 17;

FIG. 36 is a perspective structural schematic view of yet another embodiment of the fluid heat exchange assembly;

FIG. 37 is a perspective structural schematic view of another embodiment of the fluid heat exchange assembly;

FIG. 38 is a perspective exploded schematic view of another embodiment of the fluid heat exchange assembly;

DETAIL DESCRIPTION OF EMBODIMENTS

Figure 1:
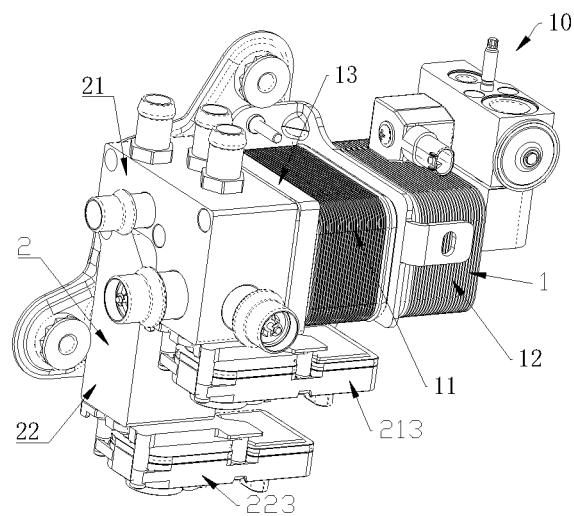
FIG. 1 is a perspective structural schematic view of a specific embodiment according to the present application.

A fluid heat exchange assembly can be used in a thermal management system for vehicle, such as a new energy vehicle, a hybrid vehicle or an oil-fueled vehicle.

The fluid heat exchange assembly includes a fluid control module and a fluid heat exchange module, the fluid control module and the fluid heat exchange module are fixedly assembled through a fixing manner such as threaded connection. The fluid control module can control a flow rate of an outlet fluid and control the fluid communication or blocking of a flow passage. The fluid heat exchange assembly includes at least a first outer port and a second outer port, the fluid control module is provided with the first outer port, and the fluid heat exchange module is provided with the second outer port. The fluid heat exchange assembly includes a first outer port, a second outer port and a third outer port, the fluid control module is provided with the first outer port and the second outer port, and the fluid heat exchange module is provided with the third outer port. In this specification, the outer ports are located at end openings of channels of the fluid heat exchange assembly. In a case that an outer port is invisible in the drawings, in order to facilitate the indication of the position of the outer port, the position of the outer port may be pointed to an outer connecting pipe connected to the outer port.

The fluid heat exchange module includes at least one heat exchange core and at least one connecting component, the heat exchange core and the connecting component are fixedly assembled through a fixing manner such as welding.

The fluid control module includes a first connecting lateral portion, the fluid heat exchange module includes a second connecting lateral portion, the first connecting lateral portion and the second connecting lateral portion are oppositely and sealingly arranged, and the first connecting lateral portion and the second connecting lateral portion are fixed through an assembling manner, such as welding, threaded connection or other fixing manners. The connecting component includes a third connecting lateral portion, the heat exchange core includes a fourth connecting lateral portion, the connecting component is provided with the second connecting lateral portion, and the third connecting lateral portion and the fourth connecting lateral portion are fixed by welding. The fluid heat exchange module and the fluid control module are integrated together, so that the structure is smaller and more compact, moreover, a fluid entering the fluid heat exchange module from the fluid control module can perform heat exchange with the fluid in the fluid heat exchange module, and the fluid control module can be used to control a flow rate of the fluid therein.

The fluid heat exchange module includes a first fluid communication cavity and a second fluid communication cavity, the first fluid communication cavity and the second fluid communication cavity are isolated from each other in the heat exchange core, a first fluid flows in the first fluid communication cavity, and a second fluid flows in the second fluid communication cavity. It should be noted that, the first fluid and the second fluid in this application includes a same fluid having different temperatures, or different fluids having different temperatures.

The fluid heat exchange module further includes a fourth outer port and a fifth outer port. In order to illustrate the relationship between the joint components and the fluids, the fluid heat exchange module is defined to include a first fluid first port, a first fluid second port (also referred to as the third outer port), a second fluid first port (also referred to as the fourth outer port) and a second fluid second port (also referred to as the fifth outer port). The first fluid first port may be arranged on the connecting component, the first fluid second port may be arranged on the heat exchange core or the connecting component, the second fluid first port may be arranged on the connecting component or the heat exchange core, and the second fluid second port may be arranged on the connecting component or the heat exchange core (reference is made to FIG. 20, which is a structural schematic view of the fluid heat exchange module 1').

The fluid heat exchange assembly includes a first fluid channel, a second fluid channel and a third fluid channel, at least a part of the first fluid channel is located in the fluid control module, at least a part of the first fluid channel is located in the fluid heat exchange module, at least a part of the second fluid channel is located in the fluid control module, and at least a part of the third fluid channel is located in the fluid heat exchange module 1.

The fluid heat exchange module includes a first fluid communication cavity, the fluid control module includes at least a first flow passage and a second flow passage, and the first flow passage can be in communication with the second flow passage. The fluid heat exchange module includes a first fluid communication cavity, and the second flow passage is in communication with the first fluid communication cavity. The connecting component includes a connecting channel, the connecting channel penetrates through the connecting component, and the connecting channel connects the second flow passage with the first fluid communication cavity. The connecting component includes a plane portion, the plane portion is located at the third connecting lateral portion, and the plane portion is in contact with the heat exchange core and is fixed to the heat exchange core by welding. The plane portion occupies at least ½ of an area of the fourth connecting lateral portion, in this way, a welding face between the plane portion and the fourth connecting lateral portion is large, so that the welding between the plane portion and the fourth connecting lateral portion 117 is more stable, and leakage is not likely to occur to affect the performance. In addition, the processing of the connecting component is simple, and the assembly of the connecting component and the heat exchange core is relatively simple. Thus, the processing technology of the fluid heat exchange assembly is simplified, which facilitates standardized and rapid manufacturing without requiring complicated molds.

First Embodiment

Figure 33:
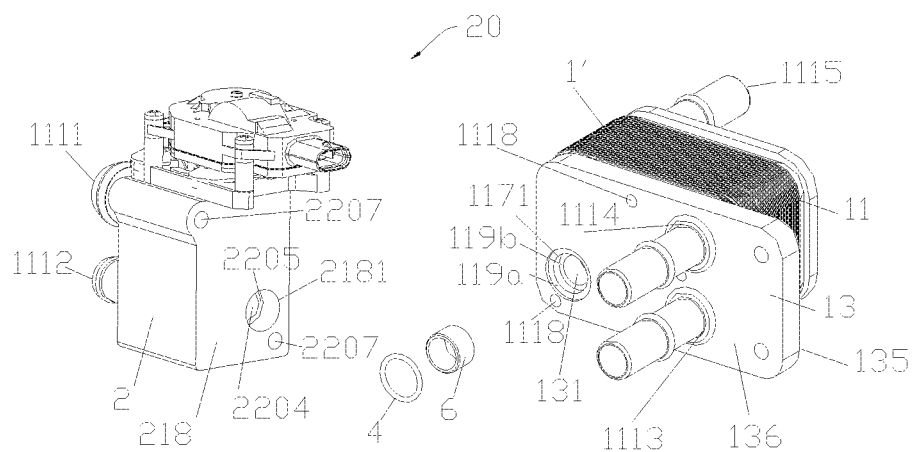
FIG. 33 is a perspective exploded schematic view of the fluid heat exchange assembly in FIG. 32.
Figure 34:
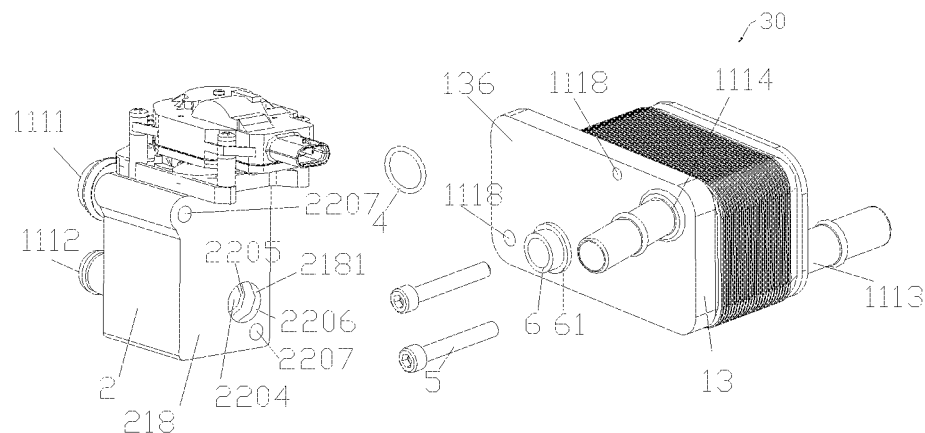
FIG. 34 is a perspective exploded schematic view of another embodiment of the fluid heat exchange assembly.
Figure 35:
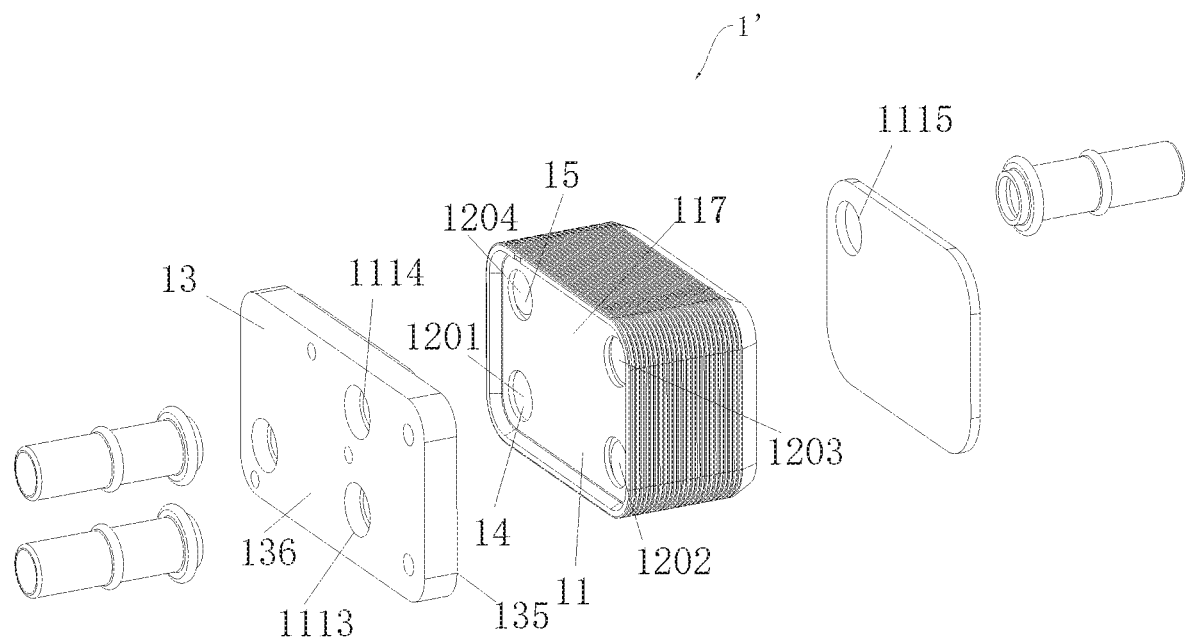
FIG. 35 is a perspective exploded schematic view of the fluid heat exchange module in FIG. 32.

Reference is made to FIGS. 1 to 4, and FIG. 1 is a schematic view showing a fluid heat exchange assembly 10. The fluid heat exchange assembly 10 includes a fluid control module 2 and a fluid heat exchange module 1. Reference is made to FIGS. 32 to 35, FIG. 32 is a schematic view showing a fluid heat exchange assembly 20; FIG. 33 is an exploded schematic view showing the fluid heat exchange assembly 20; FIG. 34 is an exploded schematic view showing the fluid heat exchange assembly 30; FIG. 35 is an exploded schematic view showing the fluid heat exchange module 1'. The fluid heat exchange module 1/1' includes at least one heat exchange core 11 and at least one connecting component 13, the heat exchange core 11 and the connecting component 13 are fixedly assembled through a fixing manner such as welding.

The fluid control module 2 includes a first connecting lateral portion 218, the fluid heat exchange module includes a second connecting lateral portion 136, the first connecting lateral portion 218 and the second connecting lateral portion 136 are oppositely and sealingly arranged, and the first connecting lateral portion 218 and the second connecting lateral portion 136 are fixed through an assembling manner, such as welding, threaded connection or other fixing manners. The connecting component 13 includes a third connecting lateral portion 135, the heat exchange core 11 includes a fourth connecting lateral portion 117, the connecting component 13 is provided with the second connecting lateral portion 136, and the third connecting lateral portion 135 and the fourth connecting lateral portion 117 are fixed by welding.

The fluid heat exchange module 1/1' further includes a fourth outer port 1114 and a fifth outer port 1115, the fluid heat exchange module 1/1' includes a first fluid first port 131, a first fluid second port 1113 (also referred to as the third outer port), a second fluid first port 1114 (also referred to as the fourth outer port) and a second fluid second port 1115 (also referred to as the fifth outer port). The first fluid first port 131 may be arranged on the connecting component 13, the first fluid second port 1113 may be arranged on the heat exchange core 11 or the connecting component 13, the second fluid first port 1114 may be arranged on the connecting component 13 or the heat exchange core 11, and the second fluid second port 1115 may be arranged on the connecting component 13 or the heat exchange core 11 (reference is made to FIG. 20, which is a structural schematic view of the fluid heat exchange module 1').

The fluid heat exchange assembly 10/20/30 includes a first fluid channel 101 (as shown in FIG. 18), a second fluid channel and a third fluid channel 103 (as shown in FIG. 19), at least a part of the first fluid channel 101 is located in the fluid control module 2, at least a part of the first fluid channel 101 is located in the fluid heat exchange module 1, at least a part of the second fluid channel is located in the fluid control module 2, and at least a part of the third fluid channel 103 is located in the fluid heat exchange module 1.

Figure 3:
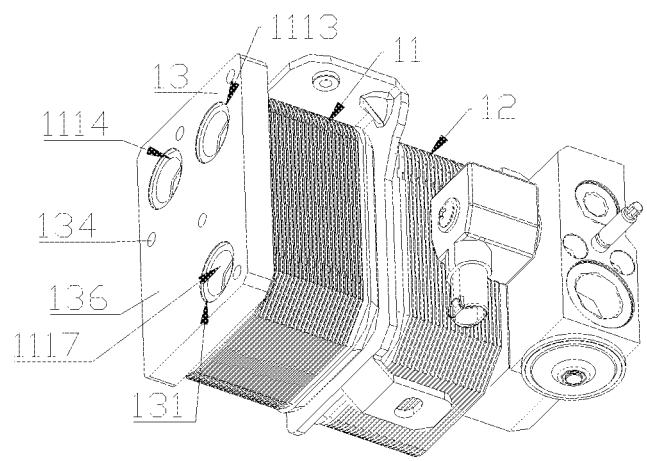
FIG. 3 is a perspective structural schematic view of a fluid heat exchange module in FIG. 1.
Figure 20:
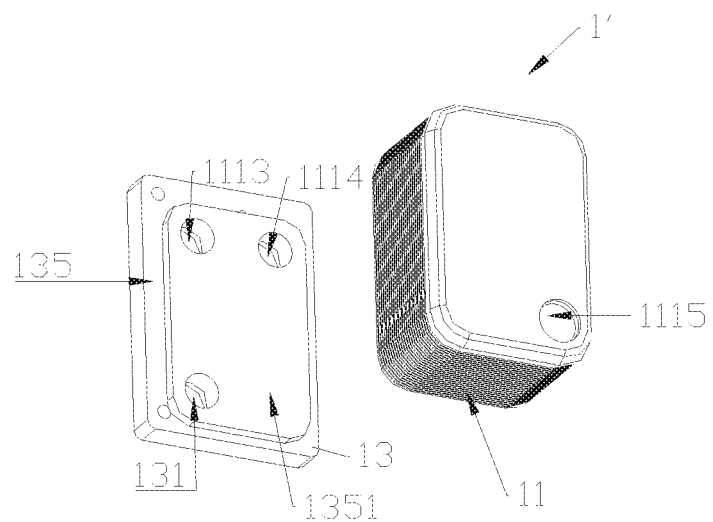
FIG. 20 is a perspective structural exploded schematic view of another embodiment of the fluid heat exchange module.

The fluid heat exchange module includes a first fluid communication cavity, the fluid control module includes at least a first flow passage and a second flow passage, the first flow passage can be in communication with the second flow passage. The fluid heat exchange module includes a first fluid communication cavity, and the second flow passage is in communication with the first fluid communication cavity. The connecting component 13 includes a connecting channel 1117 (as shown in FIG. 3), the connecting channel 1117 penetrates through the connecting component 13, and the connecting channel 1117 connects the second flow passage with the first fluid communication cavity. Reference is made to FIG. 20, the connecting component 13 includes a plane portion 1351, the plane portion 1351 is located at the third connecting lateral portion 135, and the plane portion 1351 is in contact with the heat exchange core 11 and is fixed to the heat exchange core 11 by welding. The plane portion occupies at least ½ of an area of the fourth connecting lateral portion 117, in this way, a welding face between the plane portion and the fourth connecting lateral portion 117 is large, so that the welding between the plane portion 1351 and the fourth connecting lateral portion 117 is more stable, and leakage is not likely to occur to affect the performance. In addition, the processing of the connecting component is simple, the assembly of the connecting component and the heat exchange core is relatively simple. Thus, the processing technology of the fluid heat exchange assembly is simplified, which facilitates standardized and rapid manufacturing without requiring complicated molds.

As an embodiment, reference is made to FIGS. 32 to 35, and FIGS. 18 and 19, the fluid heat exchange module 1/1' includes at least one heat exchange core 11, in a case that the fluid heat exchange module 1 includes two cores, the core fixed to the connecting component is defined as a first core, in order to facilitate the following description, the heat exchange core 11 is defined as a first heat exchange core 11. The first heat exchange core 11 includes a first fluid communication cavity 14 and a second fluid communication cavity 15, and the first fluid communication cavity 14 and the second fluid communication cavity 15 are isolated from each other. In a case that the fluid in the first fluid communication cavity 14 and the fluid in the second fluid communication cavity 15 have different temperatures, the fluid in the first fluid communication cavity 14 and the fluid in the second fluid communication cavity 15 can achieve heat exchange in the first heat exchange core 11. The first fluid communication cavity 14 includes a first orifice channel 113 and a second orifice channel 114, and the first orifice channel 113 is in communication with the second orifice channel 114; the second fluid communication cavity 15 includes a third orifice channel 115 and a fourth orifice channel 116, and the third orifice channel 115 is in communication with the fourth orifice channel 116.

The first heat exchange core 11 includes multiple plates which are laminated, each of the plates includes a first orifice 1101, a second orifice 1102, a third orifice 1103 and a fourth orifice 1104, the first orifices 1101 in the plates are aligned to form the first orifice channel 113, the second orifices 1102 in the plates are aligned to form the second orifice channel 114, the third orifices 1103 in the plates are aligned to form the third orifice channel 115, and the fourth orifices 1104 in the plates are aligned to form the fourth orifice channel 116. The first heat exchange core 11 is substantially of a cuboid structure, the first orifice channel 113, the second orifice channel 114, the third orifice channel 115 and the fourth orifice channel 116 are located at positions close to corners of the first heat exchange core 11.

The connecting component 13 is provided with the first fluid first port 131, the first heat exchange core 11 is provided with the first fluid second port 1113, the second fluid first port 1114 and the second fluid second port 1115 (as shown in FIG. 20). The first fluid first port 131 is in communication with the first orifice channel 113, the first fluid second port 1113 is in communication with the second orifice channel 114, the second fluid first port 1114 is in communication with the third orifice channel 115, and the second fluid second port 1115 is in communication with the fourth orifice channel 116.

Reference is made to FIGS. 4 to 8. The fluid control module 2 includes at least a first fluid control device 21, the first fluid control device 21 includes at least a first fluid inlet (in order to facilitate the following description, the first fluid inlet herein is also referred to as a first fluid first inlet 2162 and is also referred to as a first outer port) and a first fluid first outlet 2163, the first fluid control device 21 includes at least a first flow passage 2165a and a second flow passage 2165b; the first fluid first inlet 2162 is in communication with the first flow passage 2165a, the first fluid first outlet 2163 is in communication with the second flow passage 2165b, and the first fluid first outlet 2163 is in communication with the first fluid first port 131 of the connecting component. In this way, the first fluid channel 101 includes the first fluid first inlet 2162, the first flow passage 2165a, the second flow passage 2165b, the first fluid first outlet 2163, the first fluid first port 131, the first orifice channel 113, the second orifice channel 114 and the first fluid second port 1113.

The structure shown in the figs. is taken as an example, the first fluid control device 21 includes a first fluid inlet (in order to facilitate the following description, the first fluid inlet herein is also referred to as a first fluid first inlet 2162), a first fluid first outlet 2163 and a first fluid second outlet 2164 (which is also referred to as a second outer port), the first fluid control device 21 includes at least a first flow passage 2165a, a second flow passage 2165b and a third flow passage 2165c; the first fluid first inlet 2162 is in communication with the first flow passage 2165a, the first fluid first outlet 2163 is in communication with the second flow passage 2165b, the first fluid second outlet 2164 is in communication with the third flow passage 2165c and the first fluid first outlet 2163 is in communication with the first fluid first port 131 of the connecting component. In this way, the first fluid channel 101 includes the first fluid first inlet 2162, the first flow passage 2165a, the second flow passage 2165b, the first fluid first outlet 2163, the first fluid first port 131, the first orifice channel 113, the second orifice channel 114 and the first fluid second port 1113; the second fluid channel includes the first fluid first inlet 2162, the first flow passage 2165a, the third flow passage 2165c and the first fluid second outlet 2164; the third fluid channel 103 includes the second fluid first port 1114, the third orifice channel 115, the fourth orifice channel 116 and the second fluid second port 1115. The fluid in the first fluid channel 101 exchanges heat with the fluid in the third fluid channel 103, and the first fluid control device 21 can unblock the flow passage, switch the flow passage and regulate and control the flow rates in the flow passages for the fluid in the first fluid channel 101.

Figure 2:
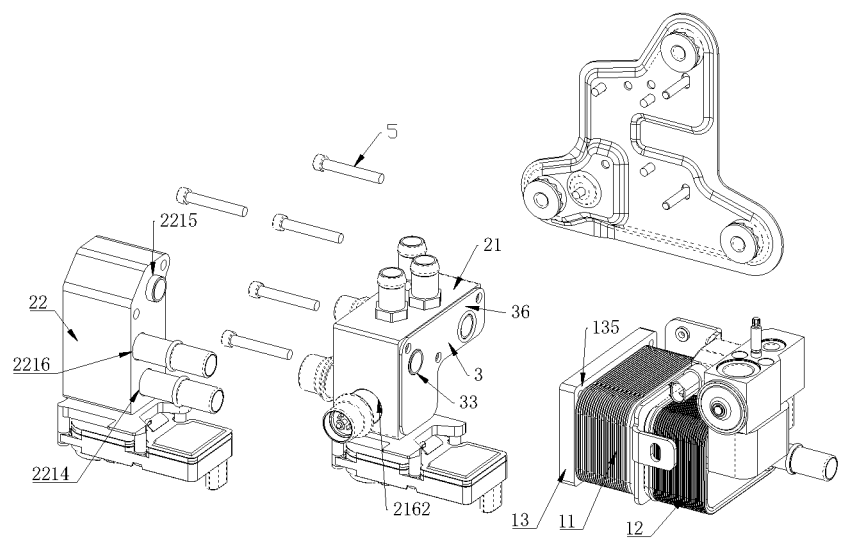
FIG. 2 is a perspective exploded schematic view of the structure shown in FIG. 1.
Figure 4:
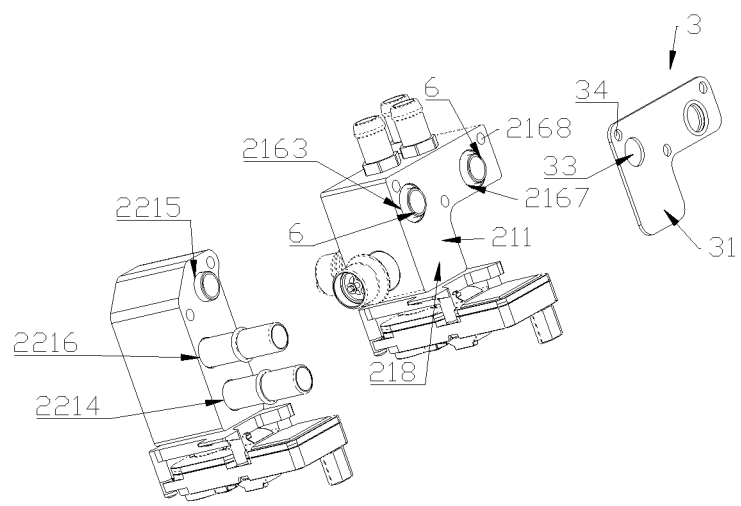
FIG. 4 is a perspective structural exploded schematic view of a fluid control module in FIG. 1.

As an embodiment, the first fluid control device 21 is made of a metal material, particularly the aluminum, and the heat exchange core and the connecting component 13 are made of a metal material, particularly the aluminum. Referring to FIGS. 2 to 4, the fluid heat exchange assembly 10 includes an isolating member 3, so that the first fluid control device 21 and the connecting component 13 are sealingly arranged. The isolating member 3 is at least provided with a connecting orifice 33, and the connecting orifice 33 is in communication with both the first fluid first port 131 and the first fluid first outlet 2163. A size of the connecting orifice 33 is greater than or equal to the sizes of the first fluid first port 131 and the first fluid first outlet 2163, such that when the fluid flows through the isolating member, the flowing performance of the fluid may not be affected by a large resistance caused by the isolating member.

As an embodiment, the structure of the isolating member is shown in FIG. 2, the first fluid control device 21 is isolated from the connecting component 13 by the isolating member 3, at least a part of one lateral portion 31 of the isolating member 3 abuts against the connecting component 13, and at least a part of another lateral portion 32 of the isolating member 3 abuts against the first fluid control device 21. By providing the isolating member 3, the heat exchange between the fluid in the first fluid control device 21 and the fluid in the heat exchange core 11 can be reduced, which avoids the situation that the fluid in the heat exchange core cannot reach an expected temperature, and thus is beneficial to improving the heat exchange efficiency. Specifically, the isolating member 3 includes an isolating portion 36, the isolating portion 36 is arranged at a periphery portion and at least a part of an extended region of the connecting orifice 33, the isolating portion 36, the first fluid control device 21 and the connecting component 13 are sealingly arranged, the isolating portion 36 abuts against the first fluid control device 21 or a clearance is kept between the isolating portion 36 and the first fluid control device 21, and the isolating portion 36 abuts against the connecting component 13 or a clearance is kept between the isolating portion 36 and the connecting component 13. It should be noted that, the isolating portion may completely abut against the connecting component clingingly or may abut against the connecting component by providing an intermediate member, and the isolating portion may entirely or partially abut against the first fluid control device and the connecting component. In this application, the abutting arrangement includes direct abutting and indirect abutting by providing other members, for example, the isolating portion directly abuts against the connecting component or indirectly abuts against the connecting component by providing other members.

Figure 27:
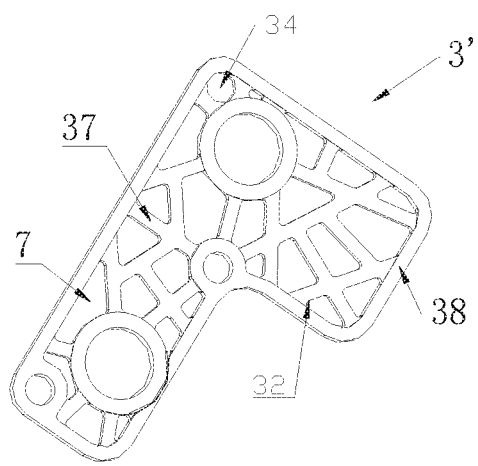
FIG. 27 is a perspective structural schematic view of another embodiment of an isolating member.

As another embodiment, the structure of the isolating member is shown in FIG. 27, at least a part of one lateral portion 31 of the isolating member 3' abuts against the connecting component 13, at least a part of another lateral portion 32 of the isolating member 3' abuts against the first fluid control device 21. The fluid heat exchange assembly includes an isolating region 7, the isolating region 7 is a closed space, the isolating region 7 is located between the first fluid control device 21 and the connecting component 13, and the first fluid control device 21 and the connecting component 13 are isolated by the isolating region 7, so that a fourth mounting lateral portion 218 is not in contact with the connecting component 13. The arrangement of the isolating region is conducive to the isolation of the fluid heat exchange between the fluid heat exchange module and the first fluid control device, which avoids a situation that the fluid in the fluid heat exchange module cannot reach an expected temperature, and thus is beneficial to improving the heat exchange efficiency. Specifically, the isolating member 3' includes a main frame 37, the main frame 37 is of a hollowed out structure, the hollowed out areas forms the isolating region 7, one lateral portion of a periphery portion 38 of the main frame 37 abuts against the first fluid control device 21, another lateral portion of the periphery portion 38 of the main frame 37 abuts against the connecting component 13, and the number of the isolating region 7 may be one, two or more.

The isolating member 3/3' is resistant to high and low temperatures, resistant to the ethylene glycol medium, and has the dimensional stability. Specifically, the material of the isolating member 3 may be at least one type of material chosen from plastic, nylon, resin or other non-heat-conductive materials.

The fluid control module 2 includes a first mounting hole 2168 penetrating the fluid control module 2, the isolating member 3, 3' includes a second mounting hole 34 penetrating the isolating member 3, 3', the connecting component 13 includes a third mounting hole 134, and positions of the first mounting hole 2168, the second mounting hole 34 and the third mounting hole 134 correspond to one another. The fluid heat exchange assembly includes a fixing member 5, the fixing member 5 extends into the first mounting hole 2168, the second mounting hole 34 and the third mounting hole 134, and the fluid control module 2, the isolating member 3, 3' and the connecting component 13 are fixedly assembled. In this way, the fluid control module 2, the isolating member 3, 3' and the connecting component 13 are fixedly assembled, so that a situation of poor sealing performance caused by poor welding can be avoided.

Reference is made to FIGS. 5 to 14, the first fluid control device 21 includes a base member 211 (shown in FIG. 4), a valve core member 212 and a control member 213. The base member 211 includes a base main body 216 and a cover body 217, the base main body 216 is provided with a mounting cavity 2161, the mounting cavity 2161 is provided with a mounting opening 2161*a*, the valve core member 212 is disposed into the mounting cavity 2161 via the mounting opening 2161*a* and is at least partially accommodated in the mounting cavity 2161, and at least a part of the valve core member 212 is mechanically connected to the control member 213. The base main body 216 and the cover body 217 are further assembled and sealingly arranged. Specifically, the base main body 216 and the cover body 217 are respectively provided with bolt mounting holes, the base main body 216 and the cover body 217 can be assembled by bolt members to achieve relatively fixed arrangement, and the base member 211 and the control member 213 may also be assembled by screw connection.

It should be noted that, in addition to the above-described metal materials, the base member 211 may also be made of materials which are resistance to high pressure and high temperature, such as plastic.

The base main body 216 is provided with a first fluid first inlet 2162, a first fluid first outlet 2163, a first fluid second outlet 2164, a first flow passage 2165*a*, a second flow passage 2165*b* and a third flow passage 2165*c*. The first flow passage 2165*a*, the second flow passage 2165*b* and the third flow passage 2165*c* are all in communication with the mounting cavity 2161. The valve core member 212 includes a first valve plate 2121, a second valve plate 2122 and a transmission member 9. The base main body 216 is provided with a first opening 2166*a* located at a lateral portion of the mounting cavity 2161, and a second opening 2166*b* and a third opening 2166*c* both located at a bottom of the mounting cavity 2161. The first flow passage 2165*a* is in communication with the first opening 2166*a*, the second flow passage 2165*b* is in communication with the second opening 2166*b*, the third flow passage 2165*c* is in communication with the third opening 2166*c*, and a depth of the second flow passage 2165*b* and a depth of the third flow passage 2165*c* in the base main body 216 are different. The second valve plate 2122 communicates the mounting cavity 2161 with the second flow passage 2165*b* and/or third flow passage 2165*c*, that is, the second flow passage 2165*b* can be in communication with the mounting cavity 2161 through the second valve plate 2122, the third flow passage 2165*c* can be in communication with the mounting cavity 2161 through the second valve plate 2122, and a situation also exists that the second flow passage 2165*b* and the third flow passage 2165*c* are both in communication with the mounting cavity 2161. The first opening 2166*a* is located at one side of the first valve plate 2121 and/or the second valve plate 2122, while the second opening 2166*b* and the third opening 2166*c* are located at another side of the first valve plate 2121 and/or the second valve plate 2122. Specifically, the first opening 2166*a* is located at a side where a fourth face of the second valve plate 2122 is located, and the second opening 2166*b* and the third opening 2166*c* are located at a side where a first face of the first valve plate 2121 is located. At least one flow passage of the second flow passage 2165*b* and the third flow passage 2165*c* includes a bent portion. In this case, when the first fluid control device and the fluid heat exchange module are assembled, the joint components of the first fluid control device can avoid the structure of the fluid heat exchange module, so that the structure of the fluid heat exchange assembly is more compact and more simple, thus facilitating subsequent mounting of structure.

The mounting cavity 2161 is substantially cylindrical, the second opening 2166*b* and the third opening 2166*c* are located at the bottom of the mounting cavity 2161, and the first valve plate 2121 and the second valve plate 2122 are disc-shaped. The first valve plate 2121 and the second valve plate 2122 are located in the mounting cavity 2161, the first valve plate includes a first face 2121*d* and a second face 2121*e* oppositely arranged, the first face 2121*d* and the base main body 216 are arranged to be in sealing contact with each other or the first face 2121*d* and the base main body 216 are sealingly arranged by providing a sealing element, and the second face 2121*e* of the first valve plate 2121 is arranged to be in contact with the second valve plate 2122. The first valve plate 2121 includes a first through hole 2121*a* and a second through hole 2121*b*. The first through hole 2121*a* is in communication with the second opening 2166*b*, a size of the first through hole 2121*a* is greater than or equal to that of the second opening 2166*b*, the second through hole 2121*b* is in communication with the third opening 2166*c*, and a size of the second through hole 2121*b* is greater than or equal to that of the third opening 2166*c*. The second valve plate 2122 includes at least one communication hole 2122*a*, the communication hole 2122*a* is not larger than the first through hole 2121*a* in size, and the communication hole 2122*a* is not larger than the second through hole 2121*b* in size. The first through hole 2121*a* and the second through hole 2121*b* are approximately semi-circular, circular or of other shapes.

As another alternative solution, the first valve plate and the second valve plate may not be circular, a first through hole and a second through hole are provided between a wall portion of the first valve plate and a side wall of the mounting cavity, the first through hole is in communication with the second opening, the first through hole is larger than or equal to the second opening in size, the second through hole is in communication with the third opening, and the second through hole is larger than or equal to the third opening in size.

Figures 28, 29:
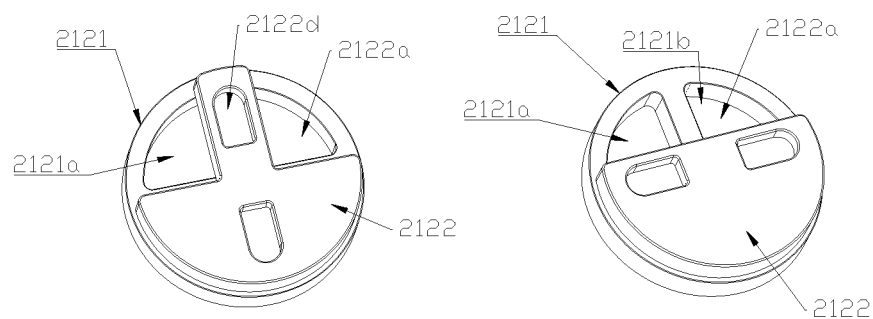
FIG. 28 is a structural schematic view of another embodiment of a valve core member.
FIG. 29 is a structural schematic view of yet another embodiment of the valve core member.

As another embodiment, reference is made to FIGS. 28 to 29, at least one communication hole is provided between a wall portion of the second valve plate 2122 and the side wall of the mounting cavity, the communication hole 2122a is not larger than the first through hole in size, and the communication hole is not larger than the second through hole in size. In a rotating process of the second valve plate, the communication hole may be or may not be in communication with the first through hole, and the communication hole may be or may not be in communication with the second through hole.

In a specific embodiment, the first fluid control device 21 includes a sealing sheet 214, the first face 2121d of the first valve plate 2121 and the base main body 216 are sealingly arranged through the sealing sheet 214, and the sealing sheet 214 and the bottom of the mounting cavity 2161 are in contact with each other and sealingly arranged. The sealing sheet 214 includes an isolating portion 2141, a third through hole 2143 and a fourth through hole 2144. The third through hole 2143 and the fourth through hole 2144 are isolated from each other through the isolating portion 2141. The third through hole 2143 is in communication with the first opening 2166a, the third through hole 2143 is larger than or equal to the second opening 2166b in size, the fourth through hole 2144 is in communication with the third opening 2166c, and the fourth through hole 2144 is larger than or equal to the third opening 2166c in size. The third through hole 2143 and the first through hole 2121a are arranged in alignment with each other, and the fourth through hole 2144 and the second through hole 2121b are arranged in alignment with each other. The third through hole 2143 and the fourth through hole 2144 are approximately semicircular, oval-shaped or of other shapes. Of course, the third through hole 2143 and the first through hole may be smaller than the second opening 2166b in size, and the second through hole and the fourth through hole 2144 may be smaller than the third opening 2166c in size.

In order to fix the sealing sheet 214 at the bottom of the mounting cavity 2161 and to accurately position the sealing sheet 214 with respect to the first valve plate 2121, the sealing sheet 214 is provided with a positioning through hole 2142, the positioning through hole 2142 is located in an region of the isolating portion 2141, the first valve plate 2121 is provided with a first positioning hole 2121c, and a position of the first positioning hole 2121c corresponds to a position of the positioning through hole 2142. The valve core member 212 includes a positioning pin 2124, the positioning pin 2124 is located in the first positioning hole 2121c and the positioning through hole 2142, so as to fix the sealing sheet 214 to the first valve plate 2121.

Figure 8:
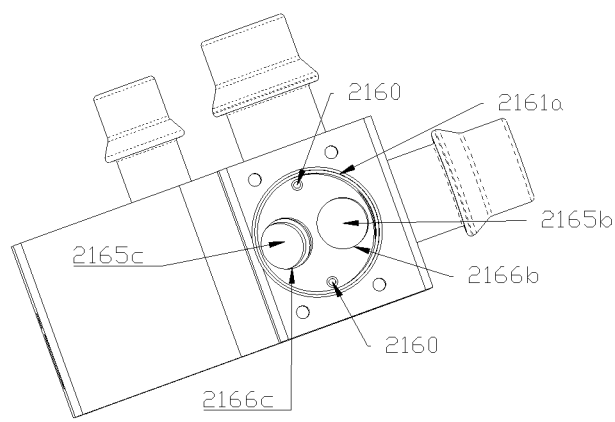
FIG. 8 is a schematic view of a first base member of the first fluid control device in FIG. 1.
Figure 9:
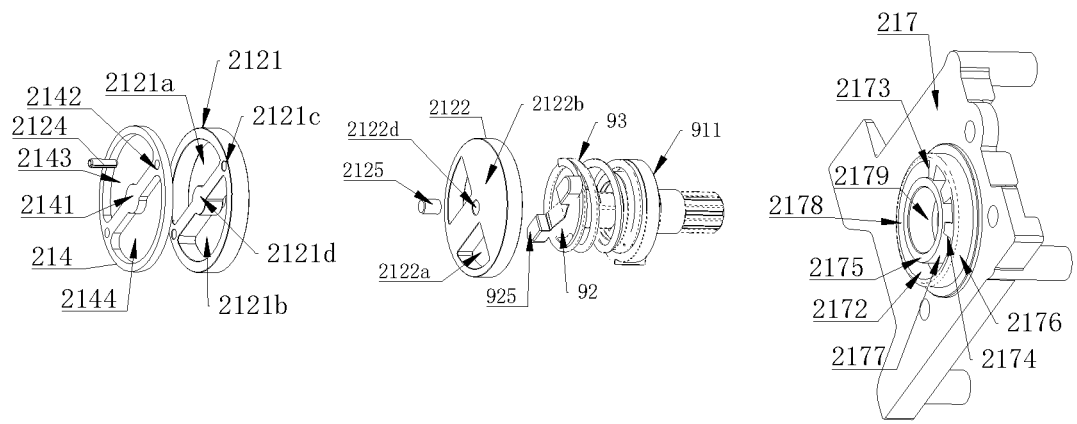
FIG. 9 is a perspective exploded schematic view of a first valve core member of the first fluid control device in FIG. 1.

More specifically, the base main body 216 is provided with a second positioning hole 2160 located at the bottom of the mounting cavity 2161, and a position of the second positioning hole 2160 corresponds to the position of the positioning through hole 2142. For example, two positioning through holes 2142 are provided, as shown in FIG. 8, two second positioning holes 2160 are provided and located on a symmetric line of the second opening 2166b and the third opening 2166c or at positions adjacent to the symmetric line, and the positioning pin 2124 is located in the first positioning hole 2121c, the positioning through hole 2142 and the second positioning hole 2160.

Of course, there may be one positioning through hole, in a case that the positioning through hole is not circular, one positioning through hole can also make the first valve plate and the base main body accurately positioned without displacement.

The number of the positioning through holes 2142 may be two or more, to ensure that the sealing sheet 214 and the first valve plate 2121 can be accurately fixed to the bottom of the mounting cavity 2161, and that the first through hole 2121a and the second through hole 2121b are aligned with the second opening 2166b and the third opening 2166c respectively. In this way, the holing of the positioning through hole 2142 comparatively may not affect sizes of the third through hole 2143 and the fourth through hole 2144, thus the third through hole 2143 and the fourth through hole 2144 in the sealing sheet 214 have large flow areas, which is beneficial to maintaining the product performance.

The second valve plate 2122 includes a third face 2122b and a fourth face 2122c oppositely arranged, the third face 2122b of the second valve plate 2122 is arranged in sealing contact with the second face 2121e of the first valve plate 2121, and the third face 2122b of the second valve plate 2122 rotates relative to the second face 2121e of the first valve plate 2121. That is, the second valve plate 2122 is a movable valve plate, the first valve plate 2121 is a relatively fixed valve plate with respect to the second valve plate 2122, the second valve plate 2122 performs a rotary motion relative to the second face 2121e of the first valve plate 2121, which reduces a space required by a motion route while ensuring the opening and closing of the communication hole 2122a, thus is beneficial to reducing a product volume. The roughness of the third face 2122b of the second valve plate 2122 is smaller than or equal to that of the second face 2122e of the second valve plate 2122, and roughness of the first face 2121d of the first valve plate 2121 is smaller than or equal to the second face 2121e of the first valve plate 2121. As contact friction surfaces, the second face 2121e of the first valve plate 2121 and the third face 2122b of the second valve plate 2122 have relatively high requirements for the roughness, after many designs and repeated tests, the surface roughness of the second face 2121e of the first valve plate 2121 is greater than 0.03 μm and less than 0.5 μm, and/or the surface roughness of the third face 2122b of the second valve plate 2122 is greater than 0.03 μm and less than 0.5 μm, for example, the surface roughness of 0.03 μm, 0.04 μm, 0.05 μm, 0.06 μm, 0.07 μm, 0.08 μm, 0.09 μm, 0.1 μm, 0.2 μm, 0.3 μm, 0.4 μm, 0.45 μm, 0.485 μm or any other value in the above range can ensure the sealing between the first valve plate 2121 and the second valve plate 2122, to achieve internal sealing of a liquid flowing medium, thus preventing the effect on the control performance of the flowing medium caused by internal leakage. On the contrary, as non-frictional surfaces, the first face 2121d of the valve plate 2121 and the fourth face 2122c of the second valve plate 2122 have low requirements for the roughness, thus reducing the manufacturing cost.

Specifically, the valve core member 212 includes a positioning shaft 2125, the positioning shaft 2125 and the transmission member are independently arranged, the first valve plate 2121 includes a first position-limiting hole 2121f, the second valve plate 2122 includes a second position-limiting hole 2122d, at least one of the first position-limiting hole 2121f and the second position-limiting hole 2122d is a blind hole, at least a part of the positioning shaft 2125 is located in the first position-limiting hole 2121f, and at least another part of the positioning shaft is located in the second position-limiting hole 2122d. At least one of the first position-limiting hole 2121f and the second position-limiting hole 2122d is a blind hole, in this way, the fluid is not apt to flow through the position-limiting holes to affect the efficiency of flow regulation. Besides, the positioning shaft and the transmission member are independently arranged, which facilitates the processing of the positioning shaft and makes the fixing arrangement or the position-limiting arrangement of the transmission member and the second valve plate more accurate, thereby avoiding the improper cooperation of the second valve plate with the mounting cavity and the first valve plate due to a processing error of the transmission member. The improper cooperation may affect the accurate flow control of a flow control device. It should be noted that in this application, the positioning shaft 2125 and the transmission member being independently arranged refers to that the positioning shaft and the transmission member are independent of each other.

As an embodiment, an opening of the second position-limiting hole 2122d faces the first valve plate 2121, the second valve plate 2122 includes a wall portion which forms the second position-limiting hole 2122d, the wall portion is arranged opposite to the opening of the second position-limiting hole 2122d, at least a part of the positioning shaft 2125 is located in the first position-limiting hole 2121f and the second position-limiting hole 2122d, and the positioning shaft 2125 does not penetrate the second valve plate.

Figures 30A, 30B:
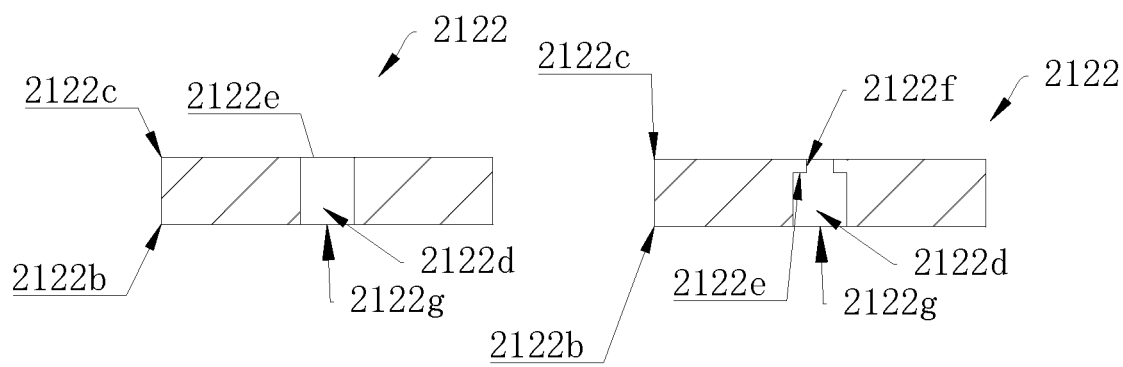
FIG. 30a is a sectional schematic view of another embodiment of the second valve plate.
FIG. 30b is a sectional schematic view of yet another embodiment of the second valve plate.

Specifically, reference is made to FIG. 30a, the second position-limiting hole 2122d is a blind hole, the second valve plate 2122 includes a wall portion 2122e which forms the second position-limiting hole 2122d, the wall portion 2122e is arranged opposite to the opening 2122g of the second position-limiting hole 2122d, and the positioning shaft does not penetrate the second valve plate 2122. In this way, the fluid cannot pass through the second position-limiting hole, which is particularly applicable to a situation that the fluid flows into the first valve plate from above the second valve plate.

As another embodiment, reference is made to FIG. 30b, the second position-limiting hole is a through hole, the second valve plate includes a wall portion 2122e and a side wall 2122f which form the second position-limiting hole, the wall portion 2122e is arranged opposite to the opening 2122g of the second position-limiting hole; an equivalent inner diameter of the side wall 2122f is smaller than an equivalent inner diameter of the positioning shaft, an end portion of the positioning shaft abuts against the wall portion 2122e of the second position-limiting hole, or a clearance is kept between the end portion of the positioning shaft and the wall portion 2122e of the second position-limiting hole.

Figure 31:
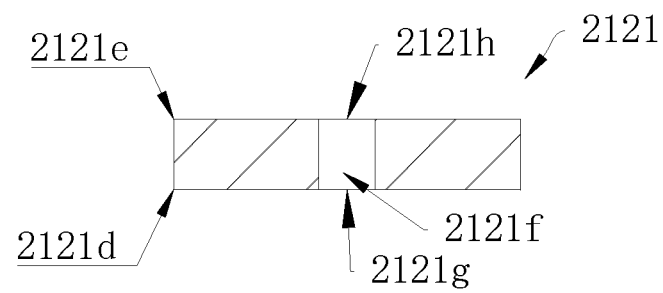
FIG. 31 is a sectional schematic view of another embodiment of the first valve plate.

As another embodiment, reference is made to FIG. 31, an opening 2121h of the first position-limiting hole 2121f faces the second valve plate, the first valve plate includes a wall portion 2121g which forms the first position-limiting hole, the wall portion 2121g is arranged opposite to the opening 2121h of the first position-limiting hole, at least a part of the positioning shaft is located in the first position-limiting hole and the second position-limiting hole, and the positioning shaft does not penetrate the first valve plate, so that the fluid cannot pass through the first position-limiting hole.

More specifically, for example, the first position-limiting hole 2121f is located at a center of a circle of the first valve plate 2121, and the second position-limiting hole 2122d is located at a center of a circle of the second valve plate 2122; the positioning shaft is located in the first position-limiting hole and the second position-limiting hole, and a height of the positioning shaft 2125 is not greater than the sum of a depth of the first position-limiting hole 2121f and a depth of the second position-limiting hole 2122d. More specifically, the first position-limiting hole and the second position-limiting hole are both blind holes, so that the second valve plate can be in communication with upper and lower spaces thereof only through a flow hole. In this way, the second valve plate 2122 can perform the rotary motion on the first valve plate 2121 with the help of an external force, so that a position of the communication hole 2122a above the first valve plate 2121 continuously changes, to change communicating areas of the first through hole 2121a and the second through hole 2121b in the first valve plate 2121, such that the flow rates of the fluid entering the first through hole 2121a and the second through hole 2121b are variable.

As another embodiment, the positioning shaft penetrates the first valve plate, a part of the positioning shaft is located in the first position-limiting hole and the second position-limiting hole; as another embodiment, the positioning shaft penetrates the second valve plate, and a part of the positioning shaft is located in the first position-limiting hole and the second position-limiting hole.

More specifically, the opening of the second position-limiting hole faces the first valve plate, the second valve plate includes a wall portion where the second position-limiting hole is formed, the wall portion is arranged opposite to the opening of the second position-limiting hole, and the positioning shaft does not penetrate the second valve plate; the first position-limiting hole is a through hole, one end of the positioning shaft is located in the second position-limiting hole, and the other end of the positioning shaft extends out of the first position-limiting hole. The other end of the positioning shaft may extend into the sealing element or the base main body. Of course, in a case that the first position-limiting hole is a blind hole, the positioning shaft may extend out of the second position-limiting hole.

Figure 10:
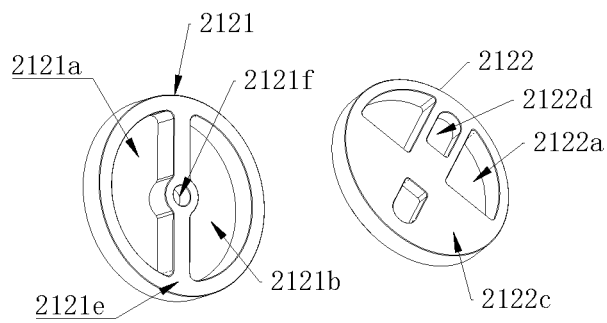
FIG. 10 is a schematic view of a first valve plate and a second valve plate of the first valve core member in FIG. 9.

As a specific embodiment, as shown in FIG. 10, the second valve plate 2122 includes two communication holes 2122a, the two communication holes 2122a are symmetrically arranged with respect to the second position-limiting hole 2122d, the two communication holes 2122a have the same size, and the communication holes 2122a may be fan-shaped, circle-shaped, strip-shaped or of other various shapes. Of course, the second valve plate 2122 may be provided with multiple communication holes 2122a, the sum of areas of the multiple communication holes 2122a is not greater than an area of the first through hole 2121a, and the sum of areas of the multiple communication holes is not greater than an area of the second through hole 2121b, which can ensure that one of the flow passages is completely cut off or blocked when the flow passages are switched.

The first valve plate 2121 and the second valve plate 2122 are both ceramic valve plates or metal valve plates, so that each valve plate has high abrasion resistance, high melting point and high hardness, and is not easily oxidized at high temperatures. For example, the ceramic valve plate has good corrosion resistance to acid, alkali and salt, therefore, the ceramic valve or the metal valve can maintain a good sealing effect after being used repeatedly at different temperatures for a long time, and is not apt to age compared with a rubber material, thus can ensure the performance of the flow control device.

The control member 213 can provide a driving force which drives the transmission member 9 to rotate, specifically, the transmission member 9 is able to rotate with respect to the base member 211. In this application, the transmission member being able to rotate with respect to the base member includes that the transmission member rotates clockwise or anticlockwise in the base member. The transmission member 9 is fixedly arranged or limitedly arranged with the second valve plate, that is, the control member 213 drives the second valve plate 2122 to motion through the transmission member 9, or the second valve plate 2122 rotates with the transmission member 9. One end of the transmission member 9 is mechanically connected to the control member 213, and is sealingly arranged with the base member 211, while another end of the transmission member 9 is fixedly connected to the second valve plate 2122. Driven by the transmission member 9, the second valve plate 2122 is opened and closed, to adjust opening degrees of the first through hole 2121*a* and the second through hole 2121*b* in the first valve plate 2121, so as to adjust a ratio of the flow distributed by the first fluid first inlet 2162 to the first fluid first outlet 2163 to the flow distributed by the first fluid first inlet 2162 to the first fluid second outlet 2164. Specifically, in a case that the first through hole 2121*a* and the second through hole 2121*b* are opened at the same time, the opening degree of the second through hole 2121*b* is decreased when the opening degree of the first through hole 2121*a* is increased, or the opening degree of the first through hole 2121*a* is decreased when the opening degree of the second through hole 2121*b* is increased.

An operating position of the transmission member 9 includes a first position and a second position, and the transmission member 9 is able to rotate between the first position and the second position with respect to the base member 211. Specifically, the second valve plate 2122 operates between the first position and the second position with respect to the first valve plate 2121. When the second valve plate 2122 is located at the first position, the second valve plate 2122 allows the first through hole 2121*a* to be in communication with the second flow passage 2165*b*, and blocks the communication between the second through hole 2121*b* and the third flow passage 2165*c*. When the second valve plate 2122 is located at the second position, the second valve plate 2122 allows the communication between the second through hole 2121*b* and the third flow passage 2165*c*, and blocks the communication between the first through hole 2121*a* and the second flow passage 2165*b*. Further, in the operating process of the second valve plate 2122, when the second valve plate 2122 reaches the first position, the opening degree of the first through hole 2121*a* is maximum and the opening degree of the second through hole 2121*b* is zero, in this case, a flow area of the first through hole 2121*a* is maximum and a flow area of the second through hole 2121*b* is minimum. When the second valve plate 2122 reaches the second position, the opening degree of the first through hole 2121*a* is zero and the opening degree of the second through hole 2121*b* is maximum, in this case, the flow area of the first through hole 2121*a* is minimum and the flow area of the second through hole 2121*b* is maximum. When the second valve plate 2122 operates to a position between the first position and the second position, the first through hole 2121*a* and the second through hole 2121*b* are opened at the same time, the sum of the opening degree of the first through hole 2121*a* and the opening degree of the second through hole 2121*b* equals to a full opening degree (a maximum opening degree) of the first through hole 2121*a* or a full opening degree (a maximum opening degree) of the second through hole 2121*b*. That is, the sum of the flow areas of the first through hole 2121*a* and the second through hole 2121*b* equals to a maximum flow area of any one of the first through hole 2121*a* and the second through hole 2121*b*, so that the flow control device can realize proration of a working medium. Besides, the first valve plate 2121 and the second valve plate 2122 are sealingly arranged, which can improve the sealing performance of the product to a great extent, thereby preventing the working medium from leaking between the first valve plate 2121 and the second valve plate 2122. As the flow area of the first through hole 2121*a* and the second through hole 2121*b* of the first valve plate 2121 increases or decreases, the flow rate of the working medium gradually increases or decreases, thus the opening and closing characteristics of the fluid control device can be maintained relatively consistent during a closing or opening process of the first through hole 2121*a* and the second through hole 2121*b*, and the performance of the flow regulation of the system is relatively stable during the operation of the system.

Reference is made to FIGS. 11 to 14, the transmission member 9 includes a first transmission portion 922 and a second transmission portion 912, the first transmission portion 922 and a second transmission portion 912 are located at two opposite ends of the transmission member 9, and the second transmission portion 912 and a transmission output portion of the control member 213 are fixed to each other by, for example, fitting and assembling of internal and external splines.

As a specific embodiment, the transmission member 9 includes a connecting piece 92 and a transmission piece 91. A main body portion 911 of the transmission piece 91 and an end of the connecting piece 92 are assembled and fixed to each other. The connecting piece 92 is provided with a first transmission portion 922, and the first transmission portion 922 and the second valve plate 2122 are fixedly arranged or limitedly arranged. The transmission piece 91 is provided with a second transmission portion 912, and the second transmission portion 912 protrudes outward from the main body portion 911 and extends out of the base member 211. The base member 211 has a through hole 2171 for the second transmission portion 912 to pass through and extend out of the base member 211. The transmission member 9 further includes a position-limiting portion 9113, and the position-limiting portion 9113 is located in the mounting cavity 2161 of the base main body 216. A position-limiting concave portion 2172, a first stopping portion 2173 and a second stopping portion 2174 (as shown in FIG. 19) are formed by the base member 211. The position-limiting portion 9113 is at least partially located in the position-limiting concave portion 2172. Driven by the transmission output portion, the transmission member 9 rotates between the first position and the second position with respect to the base member 211. When the transmission member 9 is located at the first position, the position-limiting portion 9113 abuts against the first stopping portion 2173, and when the transmission member 9 rotates to the second position, the position-limiting portion 9113 abuts against the second stopping portion 2174, thus the transmission member 9 can be accurately limited between the first position and the second position. The second transmission portion 912 and the position-limiting portion 9113 may be separately arranged and assembled to each other. Of course, the second transmission portion 912 and the position-limiting portion 9113 may be integrally formed as in this embodiment. By using the transmission member 9 to integrally form the position-limiting portion 9113 and the second transmission portion 912, a motion that the position-limiting portion 9113 reaches a limited position can be accurately transmitted to the second transmission portion 912, and then is transmitted to a transmission system, which can improve the accuracy of the motion of the position-limiting portion 9113, and can limit the position timely and avoid hysteretic position limiting which affects the performance of the flow regulation compared with the structure in which the position-limiting portion 9113 and the second transmission portion 912 are openly arranged. Since the position-limiting portion 9113 is arranged inside the base member 211, and the second transmission portion 912 is arranged outside the base member 211, the position-limiting portion 9113 and the second transmission portion 912 are separated from each other by the base member 211, so that the impact on the position-limiting portion 9113 can be eliminated during the transmission process, thus relatively reducing the excessive impact on a gear transmission system caused by a momentary pause in the position limiting process.

One of the transmission piece 91 and the connecting piece 92 is provided with a positioning concave portion 913, and the other of the transmission piece 91 and the connecting piece 92 is provided with a positioning fool-proof portion 921. In this embodiment, the transmission piece 91 is provided with the positioning concave portion 913 and the connecting piece 92 is provided with the positioning fool-proof portion 921, it may also be that the connecting piece 92 is provided with the positioning concave portion 913 and the transmission piece 91 is provided with the positioning fool-proof portion 921. The positioning fool-proof portion 921 and the positioning concave portion 913 are assembled and fixed with respect to each other along an axial direction of the transmission member 9, and the positioning concave portion and the positioning fool-proof portion are each provided with an anti-mismatch structure for mutual positioning.

The transmission member 9 includes a connecting piece 92 and a transmission piece 91, which are assembled to form the transmission member. The connecting piece 92 and the transmission piece 91 are slightly movable in an axial direction of a valve core, to effectively ensure that the connecting piece 92 and the second valve plate are firmly fixed when the valve core member and the base member are assembled, thus preventing the sealing failure between the second valve plate and the first valve plate caused by mechanical errors, thereby improving the stability of the product performance.

In this embodiment, the fluid heat exchange assembly 10 includes at least following operating states:

a first operating state: the first flow passage 2165a is not in communication with the second flow passage 2165b, and the first flow passage 2165a is in communication with the third flow passage 2165c;

a second operating state: the first flow passage 2165a is in communication with the second flow passage 2165b, and the first flow passage 2165a is not in communication with the third flow passage 2165c; and a third operating state: the first flow passage 2165a is in communication with both the second flow passage 2165b and the third flow passage 2165c.

It should be noted that, in a case that the first fluid control device only includes the first fluid first inlet, the first fluid first outlet, the first flow passage and the second flow passage, the fluid heat exchange assembly includes at least following operating states:

a first operating state: the first flow passage is not in communication with the second flow passage;

a second operating state: the first flow passage is in communication with the second flow passage, the flow rate of the fluid flowing into the second flow passage is controlled and can be regulated through the first valve core member;

a third operating state: a fourth flow passage is in communication with a fifth flow passage, the flow rate of the fluid flowing into the fifth flow passage is controlled and can be regulated through the second valve core member; and a fourth operating state: the fourth flow passage is not in communication with the fifth flow passage.

Figure 22:
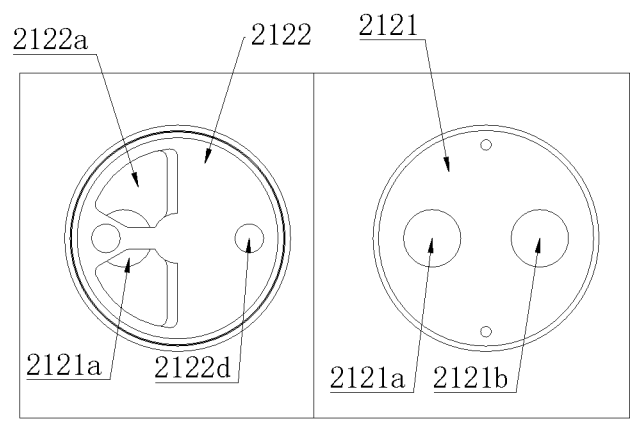
FIGS. 22 to 26 are schematic top views of an embodiment of the first valve plate and the second valve plate in different states.

Reference is made to FIGS. 22 to 26, in the operating states of the fluid control device, since the second valve plate is rotated under the action of a driving mechanism, different operating states are formed as the second valve plate rotates to different positions. Valve plates shown in FIGS. 22 to 26 represent a specific embodiment of the present application, and are not considered to be a limitation of the present application. Referring to FIG. 22, the communication hole 2122a of the second valve plate is arranged corresponding to the first through hole of the first valve plate, and the communication hole 2122a is completely in communication with the first through hole 2121a, so that after entering the mounting cavity from the third opening 2166c, the fluid completely (i.e., 100% in proportion) enters the first through hole from the communication hole. In this application, this state is also called full opening. In this case, the first flow passage 2165a is in communication with the second flow passage 2165b, and the first flow passage 2165a is not in communication with the third flow passage 2165c, the first fluid channel 101 includes the fluid first inlet, the first flow passage, the mounting cavity, the communication hole, the first through hole, the second flow passage, the fluid first outlet and the first fluid communication cavity, and the fluid in the first fluid channel 101 exchanges heat with the fluid in the second fluid communication cavity. The second fluid channel includes the fluid first inlet and the mounting cavity, the second fluid channel is blocked by the second valve plate, and the second fluid channel is not in communication with the third flow passage.

Figures 23, 24:
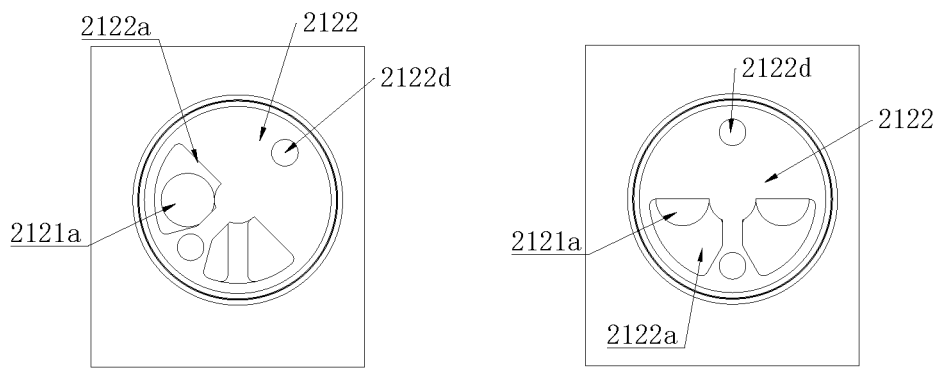
Figures 25, 26:
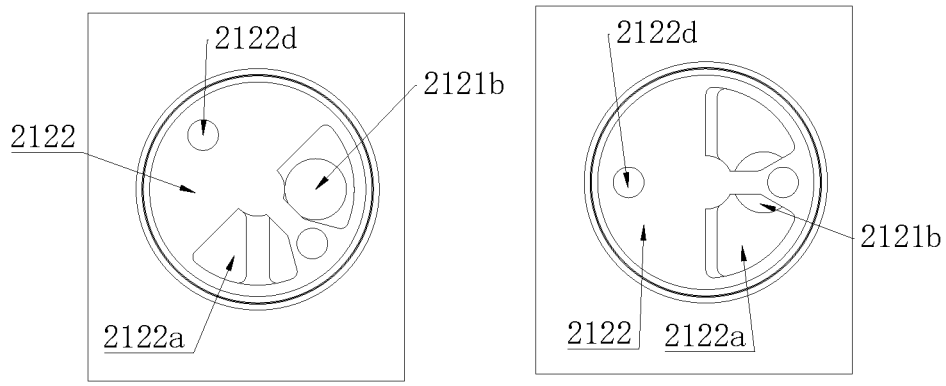

Referring to FIG. 23, the second valve plate 2122 rotates anticlockwise by about 30 degrees with respect to the position of the second valve plate in FIG. 22, a part of the communication hole 2122a (about 30%) is in communication with the second through hole, a part of the communication hole 2122a (about 70%) is in communication with the first through hole, so that the fluid flowing into the mounting cavity from the third opening is proportionally distributed into the first through hole and the second through hole, and then flows out from the first opening and the second opening. In this case, the first flow passage 2165a is in communication with both the second flow passage 2165b and the third flow passage 2165c, but the flow rates distributed to the second flow passage 2165b and the third flow passage 2165c are different. Reference is made to FIG. 24, the second valve plate 2122 rotates anticlockwise by about 60 degrees with respect to the position of the second valve plate in FIG. 23, an area of the communication hole 2122a in communication with the first through hole is substantially equal to an area of the communication hole 2122a in communication with the second through hole, such that the fluid flowing into the mounting cavity from the third opening enters into the first through hole and the second through hole respectively in substantially equal proportions, that is, the fluid with the flow rate of 50% enters to each of the first through hole and the second through hole. In this case, the first flow passage 2165a is in communication with both the second flow passage 2165b and the third flow passage 2165c, but the flow rates distributed to the second flow passage 2165b and the third flow passage 2165c are different. Reference is made to FIG. 25, the second valve plate 2122 continues to rotate anticlockwise by about 60 degrees with respect to the position of the second valve plate in FIG. 24, about 70% of the area of the communication hole 2122a is in communication with the second through hole, and about 30% of the area of the communication hole 2122a is in communication with the first through hole. 70% of the area of the communication hole 2122a is in communication with the second through hole, such that the fluid flowing into the mounting cavity from the third opening is distributed into the first through hole and the second through hole in proportions of 30% and 70% respectively, which is conducive to the control of the flow rates. In this case, the first flow passage 2165a is in communication with both the second flow passage 2165b and the third flow passage 2165c, but the flow rates distributed to the second flow passage 2165b and the third flow passage 2165c are different. In this way, the first fluid channel 101 includes the fluid first inlet, the first flow passage, the mounting cavity, the communication hole, the first through hole, the second flow passage, the fluid first outlet and the first fluid communication cavity, and the fluid in the first fluid channel exchanges heat with the fluid in the second fluid communication cavity. The second fluid channel includes the fluid first inlet, the mounting cavity, the communication hole, the second through hole, the third flow passage and the fluid second outlet, an area of the communication hole in communication with the first through hole changes with a rotation angle of the second valve plate, and an area of the communication hole in communication with the second through hole changes with the rotation angle of the second valve plate.

Referring to FIG. 26, the second valve plate 2122 continues to rotate anticlockwise by about 30 degrees with respect to the position of the second valve plate in FIG. 25, in this case, about 100% of the area of the communication hole 2122a is in communication with the second through hole, that is, the communication hole 2122a is completely in communication with the second through hole, which may also be referred to as full opening. All the fluid flowing into the mounting cavity from the third opening enters the second through hole via the communication hole 2122a. In this case, the first flow passage 2165a is in communication with the third flow passage 2165c, and the first flow passage 2165a is not in communication with the second flow passage 2165b. The first fluid channel 101 includes the fluid first inlet, the first flow passage and the mounting cavity, the first fluid channel is blocked by the second valve plate, and the first fluid channel is not in communication with the first fluid communication cavity. The second fluid channel includes the fluid first inlet, the mounting cavity, the communication hole, the second through hole, the third flow passage and the fluid second outlet.

The transmission output portion of the control member 213 can provide a driving force for the transmission member 9, and the second transmission portion 912 is mechanically connected to the transmission output portion, thus the power can be smoothly transmitted.

Further, the transmission piece 91 includes a main body portion 911, the main body portion 911 includes a pivoting portion 9111 and a connecting portion 9112. The pivoting portion 9111 pivotally cooperates with the base member 211. The base member 211 is provided with a pivotal cooperating portion 2175 arranged corresponding to the pivoting portion 9111, and the pivotal cooperating portion 2175 is provided with a pivoting concave portion 2179 receiving the pivoting portion. The pivoting concave portion 2179 is in communication with the through hole 2171, and an outer side of the pivoting portion 9111 pivotally cooperates with an inner side of the pivotal cooperating portion 2175. The connecting portion 9112 and the pivoting portion 9111 are integrally formed to have a step-shaped arrangement. Specifically, the pivoting portion 9111 is cylindrical, and the connecting portion 9112 is columnar, and an outer perimeter of the pivoting portion 9111 is smaller than an outer perimeter of the connecting portion 9112. The position-limiting portion 9113 is integrally formed with a part of a peripheral side of the connecting portion 9112. The fluid control device further includes a sealing element, a clamping convex portion 2176 integrally protrudes from the base member 211, and the sealing element is clamped on an outer peripheral side of the clamping convex portion 2176, such that the base member 211 is sealed, and the fluid medium is prevented from leaking outward.

The position-limiting portion 9113 includes a first extending portion 9114 and/or a second extending portion 9115. The first extending portion 9114 protrudes outward in a radial direction of the connecting portion 9112, the second extending portion 9115 protrudes toward the position-limiting concave portion 2172 from the connecting portion 9112 and/or the first extending portion 9114, for example, protrudes in a vertical direction or protrudes upward in a direction having a slight included angle with respect to the vertical direction. The position limitation to the transmission member 9 can be realized through cooperation between at least one of the first extending portion 9114 and the second extending portion 9115 and the position-limiting concave portion 2172. The clamping convex portion 2176 is located at an outer peripheral side of the position-limiting portion 9113, and the clamping convex portion 2176 protrudes toward the same side as the pivotal cooperating portion 2175. If necessary, for example, in a case that a clearance between the clamping convex portion 2176 and the position-limiting portion 9113 is very small, an inner peripheral side of the clamping convex portion 2176 may limit the position of the outer peripheral side of the position-limiting portion 9113, to prevent the position-limiting portion 9113 from shifting. The position-limiting portion 9113 in this embodiment includes a first stop cooperating portion 9116 and a second stop cooperating portion 9117 which are integrally formed at two ends of the position-limiting portion 9113 arranged in a circumferential direction. Specifically, the position-limiting portion 9113 extends in a shape of a single convex block from a peripheral side of the transmission piece 91, and the first stop cooperating portion 9116 and the second stop cooperating portion 9117 are two outer side faces of the position-limiting portion 9113. Or, the position-limiting portion 9113 is a first convex block and a second convex block protruding from the peripheral side of the transmission piece 91, that is, the first convex block and the second convex block are spaced apart from each other, an inner side of the first convex block and an inner side of the second convex block are relatively close to each other and are arranged to face each other, and an outer side of the first convex block and an outer side of the second convex block are relatively away from each other and are arranged opposite to each other. The first stop cooperating portion 9116 is the outer side of the first convex block, and the second stop cooperating portion 9117 is the outer side of the second convex block. In a case that the transmission member 9 is located at the first position, the first stop cooperating portion 9116 abuts against the first stopping portion 2173. In a case that the transmission member 9 rotates clockwise or anticlockwise to the second position, the second stop cooperating portion 9117 abuts against the second stopping portion 2174. In a case that the transmission output portion drives the transmission member 9 to be at the first position or the second position, correspondingly, the transmission member 9 drives the second valve plate 2122 to open or close the flow hole, the transmission output portion moves between the first position and the second position, and the first valve plate 2121 completes a motion routine from opening to closing with respect to the second valve plate 2122.

In this embodiment, the base member 211 includes a base main body 216 and a cover body 217. The mounting cavity 2161 is formed in the base main body 216, and the second transmission portion 912 extends outward from the cover body 217. The pivotal cooperating portion 2175 is integrally formed at one side of the cover body 217, and protrudes toward the mounting cavity 2161 in the vertical direction. The first stopping portion 2173 is integrally formed with an outer peripheral side of the pivotal cooperating portion 2175, and the second stopping portion 2174 is integrally formed with the outer peripheral side of the pivotal cooperating portion 2175. The position-limiting concave portion 2172 is formed at the outer peripheral side of the pivotal cooperating portion, and the position-limiting concave portion 2172 extends to form at an area between the first stopping portion 2173 and the second stopping portion 2174. The clamping convex portion 2176 integrally protrudes from the cover body 217, and the sealing element is clamped on the outer peripheral side of the clamping convex portion 2176, such that the base main body 216 and the cover body 217 are sealed, and the fluid medium is prevented from leaking outward. A first curved face 9118 and/or a second curved face 9119 are formed on an inner side and an outer side of the position-limiting portion 9113 respectively, a first position-limiting face 2177 and a second position-limiting face 2178 are formed at two sides of the position-limiting concave portion 2172 respectively, the first stopping portion 2173 is arranged to intersect with the first position-limiting face 2177 and the second position-limiting face 2178, and the second stopping portion 2174 is arranged to intersect with the first position-limiting face 2177 and the second position-limiting face 2178, and the first curved face 9118 and the second curved face 9119 are arranged opposite to the first position-limiting face 2177 and the second position-limiting face 2178 of the position-limiting concave portion 2172 respectively.

Figures 11, 12:
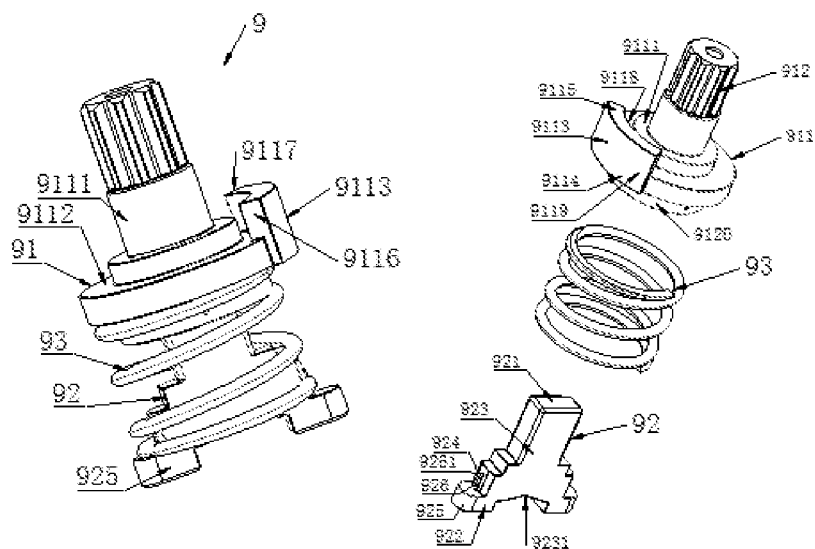
FIG. 11 is a structural schematic view of a transmission member of the first valve core member in FIG. 9.
FIG. 12 is a perspective exploded schematic view of the transmission member in FIG. 11.
Figures 13, 14:
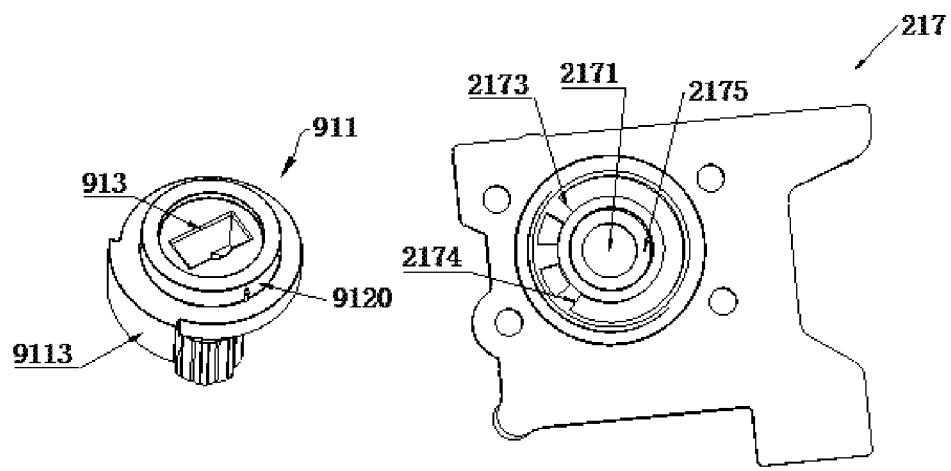
FIG. 13 is a schematic view showing a transmission member in FIG. 12 from another perspective.
FIG. 14 is a structural schematic view of a first cover body in FIG. 11.

The transmission member 9 includes an elastic piece 93 (specifically a spring shown in FIGS. 11 and 12). The elastic piece 93 has one end clamped to the transmission piece 91 and another end clamped to the connecting piece 92, and the transmission piece 91 is able to move axially with respect to the connecting piece 92. Specifically, the transmission piece 91 includes a clamping portion 9120, the clamping portion 9120 is integrally arranged with the main body portion 911, the clamping portion 9120 protrudes toward the connecting piece 92 from the main body portion 911, a peripheral diameter of the clamping portion 9120 is smaller than a peripheral diameter of the main body portion 911, and one end of the elastic piece 93 is fixed to the clamping portion 9120 by clamping.

The connecting piece 92 includes a body portion 923, a boss portion 924 and a matching portion 925. One end of the body portion 923 extends into the main body portion 911, the boss portion 924 is integrally arranged with the body portion 923, the boss portion 924 extends in a radial direction of the transmission member 9 from the body portion 923, and one end of the elastic piece 93 is fixed to the boss portion 924 by clamping. The matching portion 925 is integrally arranged with the body portion 923, the matching portion 925 extends in the radial direction of the transmission member 9 from the body portion 923, and extends in the axial direction of the transmission member 9. The second valve plate includes a positioning slot 2122d, at least a part of the matching portion 925 protrudes into the positioning slot 2122d of the second valve plate 2122 for positioning between the matching portion and the second valve plate, and the matching portion 925 and the second valve plate 2122 are fixedly arranged or limitedly arranged. More specifically, the connecting piece 92 includes a position-limiting boss 926, the position-limiting boss 926 protrudes integrally from a periphery of the boss portion 924, and one end portion of the position-limiting boss 926 is integrally arranged with the matching portion 925. The position-limiting boss 926 includes a small diameter portion 9261, and the small diameter portion 9261 is located at an end portion relatively away from the matching portion 925.

In order to ensure that the connecting piece 92 and the second valve plate 2122 are connected through the matching portion 925, and make a side wall of the second valve plate 2122 and a side wall of the mounting cavity 2161 to be parallel to ensure the sealing performance between the second valve plate and the mounting cavity, two or more matching portions 925 are provided. The body portion 923 includes an inward retracted portion 9231, the inward retracted portion 9231 is located between the adjacent matching portions 925, a clearance is kept between the inward retracted portion 9231 and the second valve plate 2122, and the second valve plate 2122 is located between the inward retracted portion 9231 and the positioning shaft, or a clearance is kept between the inward retracted portion and the positioning shaft. Such arrangement facilitates the accurate positioning of the connecting piece 92 and the second valve plate, and effectively avoids the inaccurate positioning of the connecting piece due to a processing error of the connecting member. For example, the connecting member tends to be oblique due to the processing error, resulting in that the rotation angle cannot be accurately controlled. Outer peripheral sizes of the transmission piece 91, the connecting piece 92 and the elastic piece 93 are smaller than that of the second valve plate 2122.

The fluid heat exchange assembly 10 includes a joint component 6, the joint component 6 is hollow, an end portion of the joint component 6 is located in the fluid control module 2 and/or the fluid heat exchange module 1, and the joint component 6 allows the communication between the fluid control module 2 and the fluid heat exchange module 1. The fluid control module and the fluid heat exchange module are connected through the joint component, which facilitates the processing of the fluid control module and the fluid heat exchange module, so that the fluid control module and the fluid heat exchange module are accurately positioned for assembly, thereby ensuring the sealing performance of the fluid channel.

Figure 21:
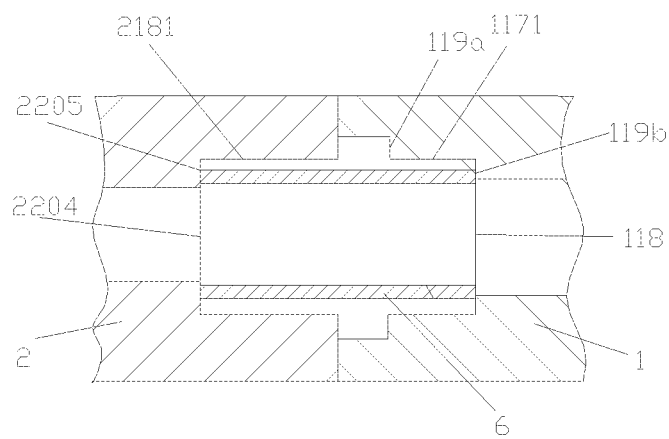
FIG. 21 is a partially sectional view of a fluid heat exchange assembly in FIG. 1.

Reference is made to FIGS. 4 and 21, the joint component 6, the fluid control module 2 and the fluid heat exchange module 1 are separately arranged, the fourth mounting lateral portion 218 is provided with a first opening 2181, the third mounting lateral portion 117 is provided with a second opening 1171, and the joint component 6 extends into the first opening 2181 and the second opening 1171. The fluid control module 2 includes a first flow hole 2204, the fluid heat exchange module 1 includes a second flow hole 118, the first flow hole 2204 is in communication with an inner cavity of the joint component 6, and the second flow hole 118 is in communication with the inner cavity of the joint component 6. A diameter of the first flow hole 2204 is smaller than an inner diameter of the first opening 2181, and a diameter of the second flow hole 118 is smaller than an inner diameter of the second opening 1171. It should be noted that, in this application, the term "separately arranged" refers to that the joint component 6, the fluid control module 2 and the fluid heat exchange module 1 are separate members before being assembled together. The joint component 6, the fluid control module and the fluid heat exchange module 1 are separately arranged, thus not only the processing and design are facilitated, and meanwhile the joint component 6 is positioned by the first opening and the second opening, the diameter of the first flow hole is smaller than that of the first opening, the diameter of the second flow hole is smaller than that of the second opening, so that the flow resistance of the fluid flowing through the fluid control module 2 and the fluid heat exchange module 1 is small. In addition, inner diameters of the first flow hole 2204, the second flow hole 118, and the joint component 6 are substantially equal, so as to avoid a throttling effect caused by too large diameter difference that affects the flow resistance. Herein, the inner diameters of the first flow hole 2204, the second flow hole 118, and the joint component 6 being substantially equal includes situations that the inner diameters of the first flow hole 2204, the second flow hole 118, and the joint component 6 are slightly different. The second flow hole is an end opening of the connecting channel 1117.

Specifically, an outer diameter of the joint component 6 is smaller than the first opening 2181 and equal to or larger than the second opening 1171, and the joint component 6 is in interference fit with the fluid heat exchange module 1. The interference fit between the joint component 6 and the fluid heat exchange module 1 facilitates the assembly and fixation between the joint component 6 and the fluid control module 2, and the positioning is more accurate.

As another embodiment, the outer diameter of the joint component 6 is smaller than the second opening 1171 and equal to or larger than the first opening 2181, and the joint component 6 is in interference fit with the fluid control module 2. The interference fit between the joint component 6 and the fluid control module 2 facilitates the assembly and fixation between the joint component 6 and the fluid heat exchange module 1, and the positioning is more accurate. In this application, the interference fit includes a case that a minimum interference amount is zero.

Specifically, the fluid heat exchange module 1 is provided with a first flat portion 119a and a second flat portion 119b (as shown in FIG. 21). The fluid control module 2 is provided with a second flat portion 2205. The first flat portion 119a is located around the second opening 1171. The fluid heat exchange assembly 10 includes a sealing element located at the first flat portion 119a. The second flat portion 119b is located around the second flow hole 118, the second flat portion 2205 is located around the first flow hole 2204, and at least one of the second flat portions 119b and 2205 abuts against an end portion of the joint component 6. A distance between the second flat portion 119b and the second flat portion 2205 is greater than or equal to a length of the joint component 6. Thus, the positioning of the joint component between the fluid heat exchange module 1 and the fluid control module 2 is facilitated, thereby avoiding the effect on the performance of the fluid heat exchange assembly. In addition, after being in interference fit with the fluid control module, the joint component is assembled to the fluid heat exchange module, which makes the installation more convenient.

As another embodiment, the fluid heat exchange module 1 is provided with a second flat portion 119b, the fluid control module is provided with a first flat portion and a second flat portion 2205, and the sealing element is located at the first flat portion. Thus, after being in interference fit with the fluid heat exchange module, the joint component is assembled to the fluid control module through the sealing element and the first flat portion, to ensure the performance requirements of the fluid heat exchange assembly.

As another embodiment, the fluid heat exchange module and the fluid control module may both be provided with a first flat portion and a second flat portion, the fluid heat exchange module and the fluid control module are sealingly arranged through the first flat portions and the sealing element.

Specifically, the joint component 6 extends into the connecting component 13 and does not penetrate the connecting component 13, and a thickness of the connecting component 13 is smaller than a thickness of the fluid control module 2. The fluid heat exchange module 1 is cooperatively connected to the joint component 6 through the connecting component 13, and the thickness of the connecting component 13 is smaller than the thickness of the fluid control module 2, which helps ensure the connecting strength of the assembly between the joint component 6 and the connecting component 13.

Specifically, a distance between the second flat portion 2205 and a wall face of the base member 211 forming the mounting cavity 2161 is not smaller than 0.5 mm, such that the cooperation between the joint component 6 and the second flat portion 2205 can better meet the strength requirement, and an inner structure of the mounting cavity 2161 is not easily affected.

Of course, as another embodiment, the joint component 6 may be integrally arranged with one of the fluid heat exchange module 1 and the fluid control module 2. Reference is made to FIG. 34, which is an exploded schematic view of a perspective structure of a fluid heat exchange assembly 30. The joint component 6 is integrally arranged with one of the fluid heat exchange module 1 and the fluid control module 2, the joint component 6 integrally protrudes from the first connecting lateral portion 218 or the second connecting lateral portion 136, and the other of the fluid control module 2 and the fluid heat exchange module 1' is provided with a first opening and a first flat portion.

Specifically, as an embodiment, the joint component 6 is integrally arranged with the fluid heat exchange module 1, the joint component 6 integrally protrudes from the second connecting lateral portion 136, the fluid control module 2 is provided with a first opening 2181 and a first flat portion 2206, and the first flat portion 2206 is located around the first opening 2181. The fluid heat exchange assembly 30 further includes a sealing element 4 located at the first flat portion 2206. The thickness of the connecting component 13 is smaller than the thickness of the fluid control module 2. In this embodiment, the joint component 6 is integrally arranged with one of the fluid heat exchange module 1 and the fluid control module 2, the assembly is convenient, certain connecting strength can be ensured, and the sealing performance is also relatively good.

Specifically, a root portion of the joint component 6 is provided with a flange 61, the flange 61 is integrally arranged with the fluid heat exchange module 1, and the flange 61 is arranged opposite to the first flat portion 2206. The fluid control module 2 is provided with a first flow hole 2204 and a second flat portion 2205, the second flat portion 2205 is located around the first flow hole 2204, the first flat portion 2206 is located around the first opening 2181, and an inner diameter of the first flow hole 2204 is smaller than an inner diameter of the first opening 2181. In this way, the flow resistance of the fluid flowing into the inner cavity of the joint component through the first flow hole 2204 is relatively not affected, so that the fluid can flow smoothly.

As another embodiment, the fluid heat exchange module 1 is provided with a second flow hole and a second flat portion, the second flat portion is located around the second flow hole, and an inner diameter of the second flow hole is smaller than the inner diameter of the first opening. In this way, the flow resistance of the fluid flowing into the inner cavity of the joint component through the first flow hole is relatively not affected, so that the fluid can flow smoothly, and a certain performance requirement can be ensured.

Referring to FIGS. 33 and 34, the fluid control module 2 includes a through hole 2207, and the fluid heat exchange module 1' includes a mounting hole 1118 corresponding to the position of the through hole 2207. The fluid heat exchange assembly 20, 30 further includes fasteners 5 which extend into the through hole 2207 and the mounting hole 1118, and the fasteners 5 are fixed to the fluid control module 2 and the fluid heat exchange module 1. The first connecting lateral portion 218 and the second connecting lateral portion 136 are closely fitted, and are fixed through the fasteners 5, for example, the fasteners are bolts. In this way, the sealing element 4 located at the first flat portion is subjected to a pressure between the first connecting lateral portion 218 and the second connecting lateral portion 136, to form a sealing surface, thereby preventing fluid leakage.

In this embodiment, the fluid heat exchange assembly 10/20/30 includes at least following operating states:

a first operating state: the first flow passage 2165a is not in communication with the second flow passage 2165b, and the first flow passage 2165a is in communication with the third flow passage 2165c;

a second operating state: the first flow passage 2165a is in communication with the second flow passage 2165b, and the first flow passage 2165a is not in communication with the third flow passage 2165c; and a third operating state: the first flow passage 2165a is in communication with both the second flow passage 2165b and the third flow passage 2165c.

Figure 32:
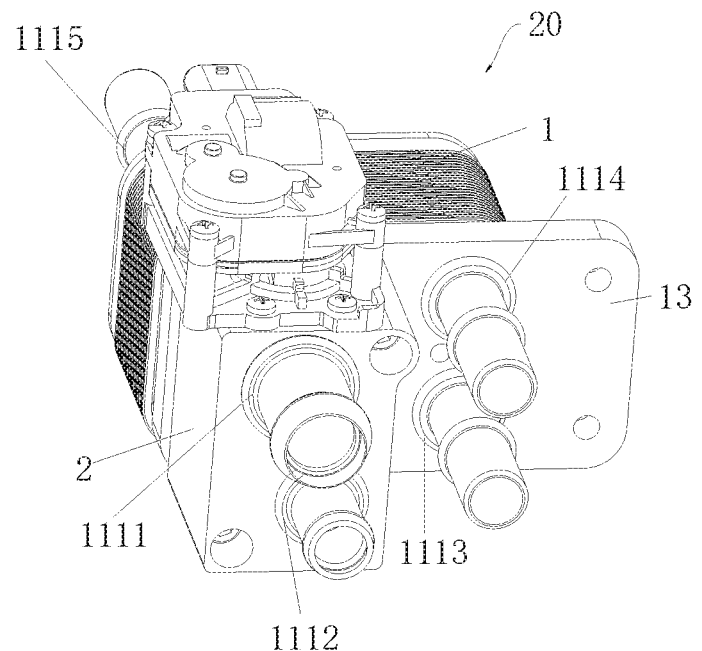
FIG. 32 is a perspective structural schematic view of an embodiment of the fluid heat exchange assembly.

As another embodiment, reference is made to FIGS. 32 and 37, and FIG. 37 is a perspective schematic view of the structure of a fluid heat exchange assembly 50. A first outer port 1111 is adjacent to the second connecting lateral portion 136, and a third outer port 1113 is located at the second connecting lateral portion (that is, the first outer port and the third outer port are located at a same side of the fluid heat exchange module). The first fluid channel includes the first outer port 1111, the first flow passage 2165a, the second flow passage 2165b, the inner cavity of the joint component 6, the first orifice channel, the second orifice channel and the third outer port 1113. An inlet and an outlet of the first fluid channel are located at a same side of the connecting component 13, which facilitates the installation of a system connecting with the first fluid channel.

Referring to FIG. 32, the third outer port 1113 and the fourth outer port 1114 are located at a same lateral portion of the fluid heat exchange module 1, the fourth outer port 1114 is in communication with an inlet of the second fluid communication cavity 15, and the fifth outer port 1115 is in communication with an outlet of the second fluid communication cavity 15. The first outer port 1111 is the inlet of the first fluid channel, and the third outer port 1113 is the outlet of the first fluid channel. The first fluid channel sequentially includes the first outer port 1111, the first flow passage 2165a, the second flow passage 2165b, the inner cavity of the joint component, the first orifice channel, the second orifice channel, and the third outer port 1113; and the second fluid communication cavity 15 sequentially includes the fourth outer port 1114, the third orifice channel, the fourth orifice channel and the fifth outer port 1115. In this way, the first fluid communication cavity and the second fluid communication cavity are reversely arranged, which facilitates a better heat exchange between the fluid in the first fluid communication cavity and the fluid in the second fluid communication cavity, thereby improving the performance required by the assembly.

Reference is made to FIG. 36, which is a perspective schematic view of the structure of a fluid heat exchange assembly 40. The third outer port 1113, the fourth outer port 1114 and the fifth outer port 1115 are located at a same lateral portion of the heat exchange core 11, and are located at a lateral portion of the heat exchange core 11 relatively away from the fluid control module 2. The second fluid communication cavity 15 includes the fourth outer port 1114, the third orifice channel, the fourth orifice channel and the fifth outer port 1115. A fluid inlet and a fluid outlet of the second fluid communication cavity are located at a same lateral portion, which facilitates the installation.

As another embodiment, the third outer port 1113, the fourth outer port 1114 and the fifth outer port 1115 are located at a same lateral portion of the heat exchange core 11. The third outer port 1113 and the fourth outer port 1114 are located at the second connecting lateral portion 136. The fluid control module 2 includes a communication channel (not shown in the figs.), a third channel includes the second fluid communication cavity 15 and the communication channel, and the communication channel is in communication with the fifth outer port 1115. The third channel is isolated from the first flow passage 2165a, and is isolated from the second flow passage 2165b. The third channel is isolated from a third flow passage 203. The third channel includes the fourth outer port 1114, the third orifice channel, the fourth orifice channel, the communication channel and the fifth outer port 1115. In this way, the third outer port 1113, the fourth outer port 1114 and the fifth outer port 1115 are located at the same lateral portion of the heat exchange core 11, which facilitates subsequent pipe connection.

As another embodiment, reference is made to FIG. 37, which is a schematic view of the structure of the fluid heat exchange assembly 50. The fourth outer port 1114 and the fifth outer port 1115 are located at a same lateral portion of the connecting component 13, and the first outer port 1111, the third outer port 1112 and the third outer port 1113 are located at a same lateral portion of the heat exchange core 11. In a case that the first fluid channel and the second fluid channel are filled with different fluids, the joint components for the same fluid are arranged at a same side of the heat exchange assembly, to facilitate the connection with other members.

Figure 61:
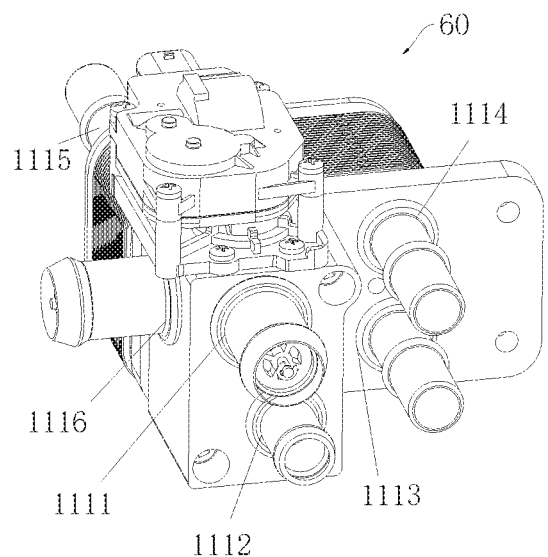
FIG. 61 is a perspective structural schematic view of another embodiment of the fluid heat exchange assembly.

As another embodiment, reference is made to FIG. 61, which is a schematic view of the structure of a fluid heat exchange assembly 60. The fluid control module 2 further includes a sixth outer port 1116 and a fourth flow passage 204, and the sixth outer port 1116 is in communication with the fourth flow passage 204. The mounting cavity 2161 is in communication with the first flow passage 2165a, and the mounting cavity 2161 is in communication with the fourth flow passage 204.

Specifically, the first fluid channel includes the first outer port 1111, the sixth outer port 1116, the first flow passage 2165a, the fourth flow passage 204, the mounting cavity 2161, the second flow passage 2165b, the inner cavity of the joint component 6, the first fluid communication cavity 14 and the third outer port 1113. And the second fluid channel includes the first outer port 1111, the sixth outer port 1116, the first flow passage 2165a, the fourth flow passage 204, the mounting cavity 2161, the third flow passage 203, and the third outer port 1112.

Second Embodiment

Figure 39:
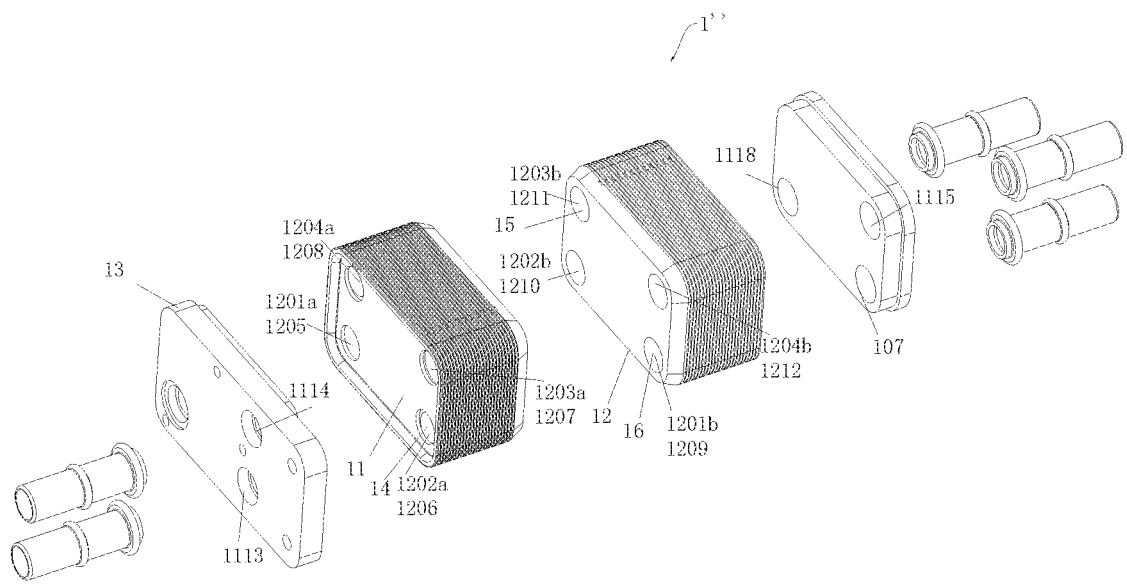
FIG. 39 is a partially sectional schematic view of the fluid heat exchange assembly in FIG. 38.
Figures 40, 41:
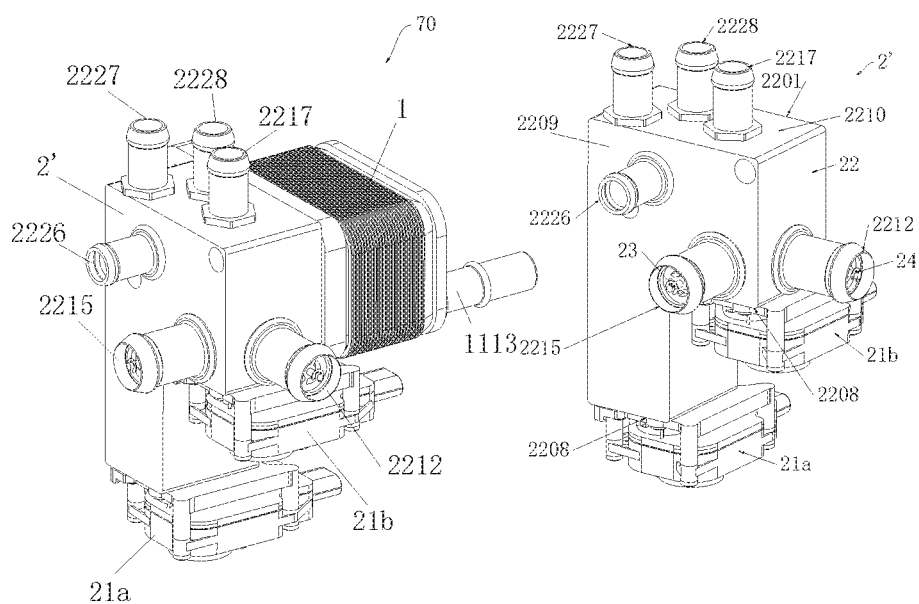
FIG. 40 is a perspective structural schematic view of another embodiment of the fluid heat exchange assembly.
FIG. 41 is a perspective structural schematic view of a fluid conducting module shown in FIG. 40.
Figures 42, 43:
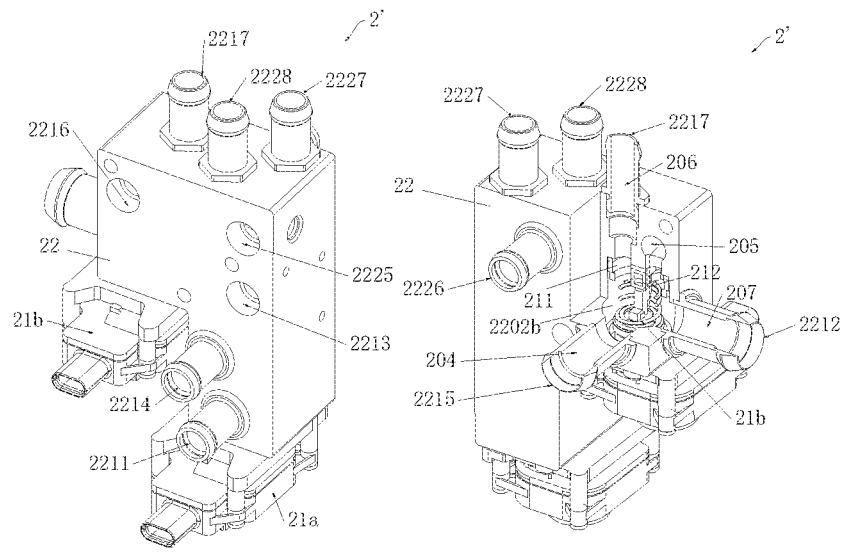
FIG. 42 is a perspective structural schematic back view of the fluid conducting module shown in FIG. 40.
FIG. 43 is a sectional schematic view of the fluid conducting module shown in FIG. 40.
Figures 44, 45:
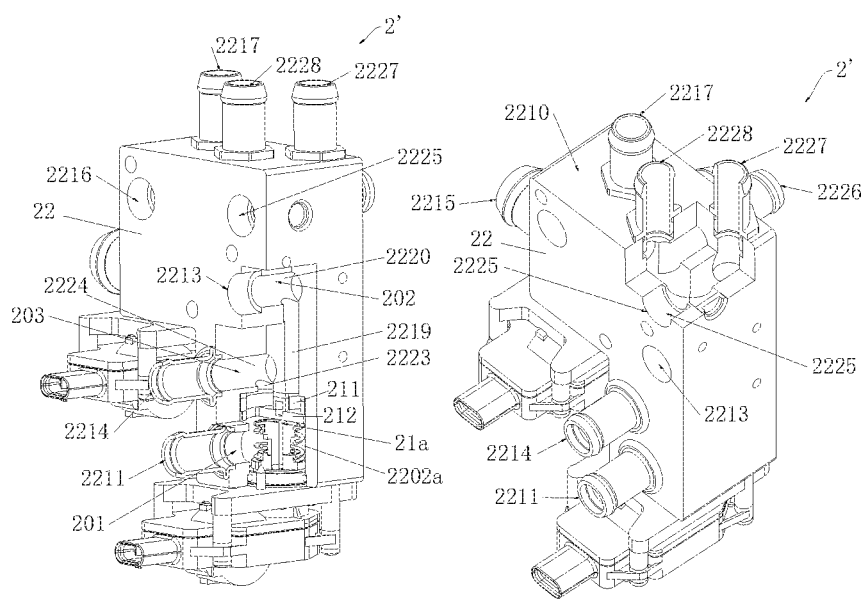
FIG. 44 is a sectional schematic view of the fluid conducting module shown in FIG. 40, wherein a sectional position is different from a sectional position in FIG. 43.
FIG. 45 is a sectional schematic view of the fluid conducting module shown in FIG. 40, wherein a sectional position is different from the sectional positions in FIG. 43 and FIG. 44.

As another embodiment, reference is made to FIGS. 38 and 39, FIG. 38 is a perspective exploded schematic view of a fluid heat exchange assembly 70; and FIG. 39 is an exploded schematic view of a fluid heat exchange module 1". The fluid heat exchange assembly 70 includes a fluid control module 2 and a fluid heat exchange module 1", where the fluid control module 2 refers to the fluid control module 2 in the above description, the fluid heat exchange module 1" includes a first heat exchange core 11 and a second heat exchange core 12, the first heat exchange core 11 is fixedly assembled to the fluid control module 22, and the first heat exchange core 11 is fixedly assembled to the second heat exchange core 12. The fluid heat exchange assembly 60 further includes a seventh outer port 107 and an eighth outer port 108.

The fluid heat exchange module 1" includes a first fluid communication cavity 14, a second fluid communication cavity 15 and a third fluid communication cavity 16. A part of the first fluid communication cavity 14 is arranged in the first heat exchange core 11, a part of the second fluid communication cavity 15 is arranged in the first heat exchange core 11, a part of the second fluid communication cavity 15 is arranged in the second heat exchange core 12, a part of the third fluid communication cavity 16 is arranged in the second heat exchange core 12, and the first fluid communication cavity 14, the second fluid communication cavity 15 and the third fluid communication cavity 16 are not in communication with one another.

In this embodiment, the first heat exchange core 11 includes multiple plates which are laminated. Each of the plates includes a first orifice 1201a, a second orifice 1202a, a third orifice 1203a and a fourth orifice 1204a. The first orifices 1201a in all the plates are aligned to form a first orifice channel 1205, the second orifices 1202a in all the plates are aligned to form a second orifice channel 1206, the third orifices 1203a in all the plates are aligned to form a third orifice channel 1207, and the fourth orifices 1204a in all the plates are aligned to form a fourth orifice channel 1208. The first heat exchange core 11 is substantially of a cuboid structure, the first orifice channel 1205, the second orifice channel 1206, the third orifice channel 1207 and the fourth orifice channel 1208 are located at positions close to corners of the first heat exchange core 11. Wherein, the first orifice channel 1205 is in communication with the second orifice channel 1206 to form a part of the first fluid communication cavity 14, the third orifice channel 1207 is in communication with the fourth orifice channel 1208 to form a part of the second fluid communication cavity 15, the second orifice channel 1206 is in communication with the third outer port 1113, and the third orifice channel 1207 is in communication with the fourth outer port 1114.

The second heat exchange core 12 includes multiple plates which are laminated, each of the plates includes a first orifice 1201b, a second orifice 1202b, a third orifice 1203b and a fourth orifice 1204b. The first orifices 1201b in all the plates are aligned to form a fifth orifice channel 1209, the second orifices 1202b in all the plates are aligned to form a sixth orifice channel 1210, the third orifices 1203b in all the plates are aligned to form a seventh orifice channel 1211, and the fourth orifices 1204b in all the plates are aligned to form an eighth orifice channel 1212. The second heat exchange core 12 is substantially of a cuboid structure, the fifth orifice channel 1209, the sixth orifice channel 1210, the seventh orifice channel 1211 and the eighth orifice channel 1212 are located at positions close to corners of the second heat exchange core 12. Wherein, the fifth orifice channel 1209 is in communication with the sixth orifice channel 1210 to form a part of the third fluid communication cavity 16, the seventh orifice channel 1211 is in communication with the eighth orifice channel 1212 to form a part of the second fluid communication cavity 15. And the fourth orifice channel 116 is in communication with the seventh orifice channel 1211 to form a part of the second fluid communication cavity 15. In this way, three kinds of fluids flowing through the heat exchange core can exchange heat in the same fluid heat exchange assembly 10, so that the fluid heat exchange assembly 10 integrates functions of fluid communication and fluid heat exchange, which has a compact structure and occupies a small installation space, thereby reducing the waste of heat in pipelines. Of course, the fluid heat exchange assembly 10 may also allow only two kinds of fluids to flow.

The eighth orifice channel 1212 is in communication with the fifth outer port 1115, the fifth orifice channel 1209 is in communication with the seventh outer port 107, and the sixth orifice channel 1210 is in communication with the eighth outer port 108. The first fluid communication cavity includes the first orifice channel, the second orifice channel and the third outer port. The second fluid communication cavity includes the fourth outer port, the third orifice channel, the fourth orifice channel, the seventh orifice channel, the eighth orifice channel and the fifth outer port. The third fluid communication cavity includes the seventh outer port, the fifth orifice channel, the sixth orifice channel and the eighth outer port. In this way, the three kinds of fluids flowing through the heat exchange core can exchange heat in the same fluid heat exchange assembly, so that the fluid heat exchange assembly integrates functions of fluid communication and fluid heat exchange, which has a compact structure and occupies a small installation space, thereby reducing the waste of heat in pipelines. Of course, the fluid heat exchange assembly may also allow only two kinds of fluids to flow.

Third Embodiment

As another embodiment, reference is made to FIGS. 1 to 4 again, the fluid control module 2 includes a first fluid control device 21 and a second fluid control device 22, the first fluid control device 21 and the second fluid control device 22 are separately arranged, the first fluid control device 21 is fixedly assembled to the fluid heat exchange module 1, and the second fluid control device 22 is fixedly assembled to the fluid heat exchange module 1 through a fixing manner such as screwed connection. Referring to FIG. 2, the first fluid control device 21 includes a fourth mounting lateral portion 218, and the fourth mounting lateral portion 218 is fixedly assembled to the connecting lateral portion 136 of the connecting component 13. The second fluid control device 22 includes a fourth mounting lateral portion 218, and the fourth mounting lateral portion 218 is fixedly assembled to the connecting lateral portion 136 of the connecting component 13.

The connecting component 13 is provided with the first fluid first port 131 and the second fluid first port 1114, the first heat exchange core 11 is provided with the first fluid second port 1113 and the second fluid second port 1115. The first fluid first port 131 is in communication with the first orifice channel 113, the first fluid second port 1113 is in communication with the second orifice channel 114, the second fluid first port 1114 is in communication with the third orifice channel 115, and the second fluid second port 1115 is in communication with the fourth orifice channel 116.

The first fluid control device 21 refers to the above structure. In order to facilitate the following description, "first" is added before names of members included in the first fluid control device 21 such as the base member 211, the valve core member 212, the control member 213 and the like for distinction, and "second" is added before names of the similar members included in the second fluid control device 22 for distinction. However, for the valve core member 212, the sub-members of the valve core member 212 are not distinguished in order to avoid cumbersome names.

Figures 15, 16:
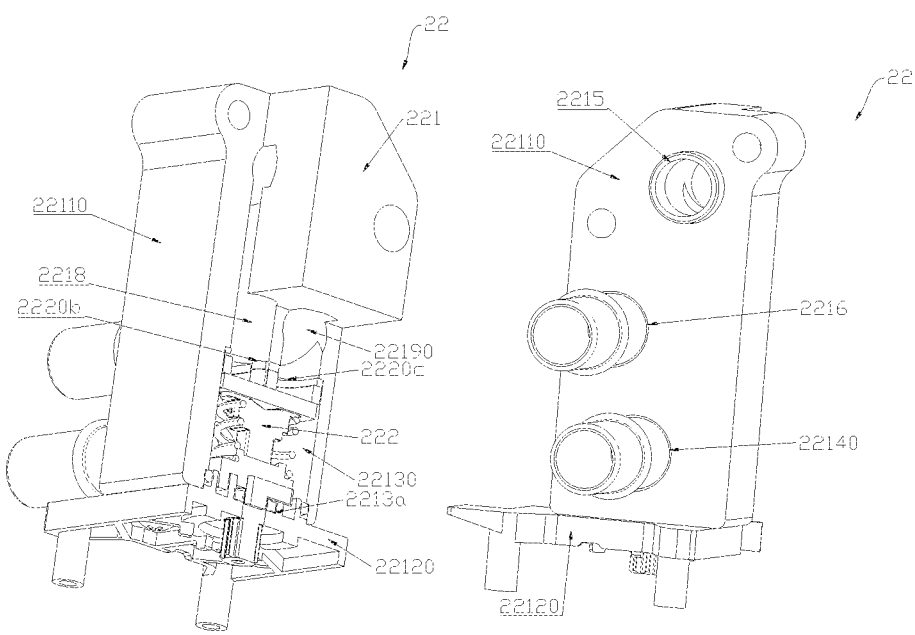
FIG. 15 is a partially sectional schematic view of a second fluid control device in FIG. 1.
FIG. 16 is a schematic view showing the second fluid control device in FIG. 11 from another perspective.

Reference is made to FIGS. 15 and 16, the second fluid control device 22 includes at least a second fluid inlet (in order to facilitate the following description, the second fluid inlet herein is referred to as a second fluid first inlet 22140), a second fluid first outlet 2215, a fourth flow passage and a fifth flow passage 2218, the second fluid first inlet 22140 is in communication with the fourth flow passage, and the second fluid first outlet 2215 is in communication with the fifth flow passage 2218. The structure shown in the figs. is taken as an example, the second fluid control device 22 includes a second fluid second outlet 2216 and a sixth flow passage 22190. The second fluid first inlet 22140 is in communication with the fourth flow passage, and the second fluid first outlet 2215 is in communication with the fifth flow passage 2218, the second fluid second outlet 2216 is in communication with the sixth flow passage 22190, and the second fluid first outlet 2215 is in communication with the second fluid first port 1114 of the connecting component 13. In this way, the third fluid channel 103 includes the second fluid first inlet 22140, the fourth flow passage, the fifth flow passage 2218, the second fluid first outlet 2215, the second fluid first port 1114, the third orifice channel 115, the fourth orifice channel 116 and the second fluid second port 1115. The fourth fluid channel 104 includes the second fluid first inlet 22140, the fourth flow passage, the sixth flow passage 22190 and the second fluid second outlet 2216. In this way, the two fluid control devices are both integrated with the fluid heat exchange module 1, the working medium from a same inlet can be proportionally distributed to different outlets by the first fluid control device, so that a flow rate of the working medium entering the fluid heat exchange module 1 is controllable. The working medium from a same inlet can be proportionally distributed to different outlets by the second fluid control device, so that the flow rate of the working medium entering the fluid heat exchange module 1 is controllable. In this way, the temperature and flow rate of the fluid leaving the fluid heat exchange module after heat exchange can be relatively accurately controlled. In this embodiment, flow rates of the two kinds of fluids entering the heat exchange core can be controlled at the same time, so that the heat exchange of the fluids in the heat exchange core is controllable, which contributes to realizing the heat exchange result. At the same time, the first fluid control device and the second fluid control device are arranged at the same side of the fluid heat exchange module, so that the pipe arrangement is more simple, and the overall structure is smaller and more compact.

The second fluid control device 22 includes a second base member 221, a second valve core member 222 and a second control member 223. The second base member 221 includes a second base main body 22110 and a second cover body 22120. The second base main body 22110 has a second mounting cavity 22130, and the second mounting cavity 22130 has a mounting opening 2213a. The second valve core member 222 is placed into the second mounting cavity 22130 from the second mounting opening 2213a, and is at least partially accommodated in the second mounting cavity 22130. At least a part of the second valve core member 222 is mechanically connected to the second control member 223. Further, the second base main body 22110 and the second cover body 22120 are assembled and sealingly arranged. Specifically, the second base main body 22110 and the second cover body 22120 are respectively provided with bolt mounting holes, and can be assembled by bolts to be relatively fixed, and the second base member 221 and the second control member 223 are assembled through screwed connection.

The second base main body 22110 is provided with the second fluid first inlet 22140, the second fluid first outlet 2215, the second fluid second outlet 2216, the fourth flow passage, the fifth flow passage 2218 and the sixth flow passage 22190. The second valve core member 222 includes a first valve plate 2121, a second valve plate 2122 and a transmission member 9, the second base main body 2212 is provided with a fourth opening located at a lateral portion of the second mounting cavity 22130 and a fifth opening and a sixth opening both located at a bottom of the second mounting cavity 22130. The fourth flow passage is in communication with the fourth opening, the fifth flow passage 2218 is in communication with the fifth opening 2220b, the sixth flow passage 22190 is in communication with the sixth opening 2220c, and depths of the fourth flow passage and the fifth flow passage 2218 in the second base main body 22110 are different. The second valve plate 2122 allows the communication between the second mounting cavity 22130 and the fourth flow passage and/or the fifth flow passage 2218, that is, the fourth flow passage can be in communication with the second mounting cavity 22130 through the second valve plate 2122, the fifth flow passage 2218 can be in communication with the second mounting cavity 22130 through the second valve plate 2122, and a situation is also included that both the fourth flow passage and the fifth flow passage 2218 are both in communication with the second mounting cavity 22130.

The fluid heat exchange assembly 10 includes a first fluid channel 101, a second fluid channel, a third fluid channel 103 and a fourth fluid channel 104. At least a part of the first fluid channel 101 is located in the first fluid control module 21, and at least a part of the first fluid channel 101 is located in the fluid heat exchange module 1. At least a part of the second fluid channel is located in the first fluid control module 21. At least a part of the third fluid channel 103 is located in the fluid heat exchange module 1, and at least a part of the third fluid channel 103 is located in the second fluid control module 22. At least a part of the fourth fluid channel 104 is located in the second fluid control module 22. Specifically, the first fluid channel 101 includes a first fluid communication cavity 14, and the third fluid channel 103 includes a second fluid communication cavity 15.

The operation position of the first valve core member includes a first position and a second position. When the first valve core member is located at the first position, the first flow passage is in communication with the second flow passage, the first flow passage is not in communication with the third flow passage, and an opening degree of the second flow passage is full opening degree. When the first valve core member is located at the second position, the first flow passage is in communication with the third flow passage, the first flow passage is not in communication with the second flow passage, and an opening degree of the third flow passage is full opening degree. When the first valve core member is located between the first position and the second position, the first flow passage is in communication with the second flow passage and the third flow passage respectively, and the opening degrees of the second flow passage and the third flow passage are determined according to a rotation angle of the first valve core member in a first base member.

An operation position of the second valve core member includes a first position and a second position. When the second valve core member is located at the first position, the fourth flow passage is in communication with the fifth flow passage, the fourth flow passage is not in communication with the sixth flow passage, and an opening degree of the fifth flow passage is full. When the second valve core member is located at the second position, the fourth flow passage is in communication with the sixth flow passage, the fourth flow passage is not in communication with the fifth flow passage, and an opening degree of the sixth flow passage is full. When the second valve core member is located between the first position and the second position, the fourth flow passage is in communication with the fifth flow passage and the sixth flow passage respectively, and the opening degrees of the fifth flow passage and the sixth flow passage are determined according to a rotation angle of the second valve core member in the second base member.

Fourth Embodiment

Referring to FIGS. 17 to 19, as another embodiment, the fluid heat exchange module 1 includes a first heat exchange core 11 and a second heat exchange core 12, the first heat exchange core 11 is fixedly assembled to the second heat exchange core 12 through a fixing manner such as welding. The first heat exchange core 11 may be directly fixed to the second heat exchange core 12, or may also be fixed to the second heat exchange core 12 by fasteners. The fluid control module 2 includes a first fluid control device 21 and a second fluid control device 22, the first fluid control device 21 is fixedly assembled to the fluid heat exchange module 1, and the second fluid control device 22 is fixedly assembled to the fluid heat exchange module 1 through a fixing manner such as screwed connection. Referring to FIG. 2, the first fluid control device 21 includes a fourth mounting lateral portion 218, and the fourth mounting lateral portion 218 is fixedly assembled to the connecting lateral portion 136 of the connecting component 13. The second fluid control device 22 includes a fourth mounting lateral portion 218, and the fourth mounting lateral portion 218 is fixedly assembled to the connecting lateral portion 136 of the connecting component 13.

At least three kinds of fluids are allowed to flow in the fluid heat exchange assembly 10. The fluid heat exchange assembly 10 includes at least a first fluid channel 101, a second fluid channel, a third fluid channel 103, a fourth fluid channel 104 and a fifth fluid channel 105. At least a part of the first fluid channel 101 is located in the first fluid control module 21, and at least a part of the first fluid channel 101 is located in the first heat exchange core 11. At least a part of the second fluid channel is located in the first fluid control module 21. At least a part of the third fluid channel 103 is located in the second fluid control module 22, at least a part of the third fluid channel 103 is located in the first heat exchange core 11, and at least a part of the third fluid channel 103 is located in the second heat exchange core 12. At least a part of the fourth fluid channel 104 is located in the second fluid control module 22; and at least a part of the fifth fluid channel 105 is located in the second heat exchange core 12. The fluid heat exchange module 1 includes a first fluid communication cavity 14, a second fluid communication cavity 15 and a third fluid communication cavity 16. At least a part of the second fluid communication cavity 15 is isolated from the first fluid communication cavity 14, and the fluids therein are able to perform heat exchange. At least a part of the second fluid communication cavity 15 is isolated from the third fluid communication cavity 16, and the fluids therein are able to perform heat exchange.

The first heat exchange core 11 includes multiple plates which are laminated, each of the plates includes a first orifice 1101, a second orifice 1102, a third orifice 1103 and a fourth orifice 1104. The first orifices 1101 in all the plates are aligned to form a first orifice channel 113, the second orifices 1102 in all the plates are aligned to form a second orifice channel 114, the third orifices 1103 in all the plates are aligned to form a third orifice channel 115, and the fourth orifices 1104 in all the plates are aligned to form a fourth orifice channel 116. The first heat exchange core 11 is substantially of a cuboid structure, the first orifice channel 113, the second orifice channel 114, the third orifice channel 115 and the fourth orifice channel 116 are located at positions close to corners of the first heat exchange core 11. Wherein, the first orifice channel 113 is in communication with the second orifice channel 114 to form a part of the first fluid communication cavity 14, the third orifice channel 115 is in communication with the fourth orifice channel 116 to form a part of the second fluid communication cavity 15, the first orifice channel 113 is in communication with the first fluid first port 131, and the third orifice channel 115 is in communication with the second fluid first port 1114.

The second heat exchange core 12 includes multiple plates which are laminated. Each of the plates includes a first orifice 1201, a second orifice 1202, a third orifice 1203 and a fourth orifice 1204. The first orifices 1201 in all the plates are aligned to form a fifth orifice channel 1209, the second orifices 1202 in all the plates are aligned to form a sixth orifice channel 1210, the third orifices 1203 in all the plates are aligned to form a seventh orifice channel 1211, and the fourth orifices 1204 in all the plates are aligned to form an eighth orifice channel 1212. The second heat exchange core 12 is substantially of a cuboid structure, the fifth orifice channel 1209, the sixth orifice channel 1210, the seventh orifice channel 1211 and the eighth orifice channel 1212 are located at positions close to corners of the second heat exchange core 12. Wherein, the fifth orifice channel 1209 is in communication with the sixth orifice channel 1210 to form a part of the third fluid communication cavity 16, the seventh orifice channel 1211 is in communication with the eighth orifice channel 1212 to form a part of the second fluid communication cavity 15, and the fourth orifice channel 116 is in communication with the seventh orifice channel 1211 to form a part of the second fluid communication cavity 15. In this way, the three kinds of fluids flowing through the heat exchange core can exchange heat in the same fluid heat exchange assembly 10, so that the fluid heat exchange assembly 10 integrates functions of fluid communication and fluid heat exchange, which has a compact structure and occupies a small installation space, thereby reducing the waste of heat in a pipeline. Of course, the fluid heat exchange assembly 10 may also allow only two kinds of fluids to flow in.

The connecting component 13 is provided with the first fluid first port 131 and the second fluid first port 1114, the first fluid first port 131 is in communication with the first orifice channel 113, the second fluid first port 1114 is in communication with the third orifice channel 115. Specifically, the first fluid second port 1113 is arranged on the connecting component 13 or the first heat exchange core 11, the second fluid second port 1115 is arranged in the second heat exchange core 12, and the second fluid second port 1115 is in communication with the eighth orifice channel. The first fluid first port 131 and the second fluid first port 1114 may be located at diagonal positions, which contributes to the assembly and fixation of the first fluid control device 21 and the second fluid control device 22.

In this embodiment, the fluid heat exchange assembly 10 includes at least following operating states:

a first operating state: the first flow passage 2165a is not in communication with the second flow passage 2165b, and the first flow passage 2165a is in communication with the third flow passage 2165c;

a second operating state: the first flow passage 2165a is in communication with the second flow passage 2165b, and the first flow passage 2165a is not in communication with the third flow passage 2165c;

a third operating state: the first flow passage 2165a is in communication with both the second flow passage 2165b and the third flow passage 2165c;

a fourth operating state: the fourth flow passage is in communication with the fifth flow passage 2218, and the fourth flow passage is not in communication with the sixth flow passage 22190;

a fifth operating state: the fourth flow passage is in communication with the sixth flow passage 22190, and the fourth flow passage is not in communication with the fifth flow passage 2218; and a sixth operating state: the fourth flow passage is in communication with both the fifth flow passage 2218 and the sixth flow passage 22190.

As another embodiment, the first fluid second port 1113 may be arranged on the connecting component 13, the first base member 211 includes a communication channel 2167, the communication channel 2167 is in communication with the first fluid second port 1113, and the communication channel 2167 is not in communication with the first mounting cavity 2161.

The first fluid control device includes a communication opening 2163, the isolating member 3 is provided with a connecting orifice 33, the communication opening 2163 is in communication with the connecting orifice 33, and the connecting orifice 33 is in communication with the first fluid second port 1113. The first fluid control device includes a joint component 6', the joint component 6' may be integrally arranged with the first fluid control device, or the joint component 6' may be separately arranged with the first fluid control device, and a specific structure of the joint component 6' is similar to that of the joint component 6.

Figure 5:
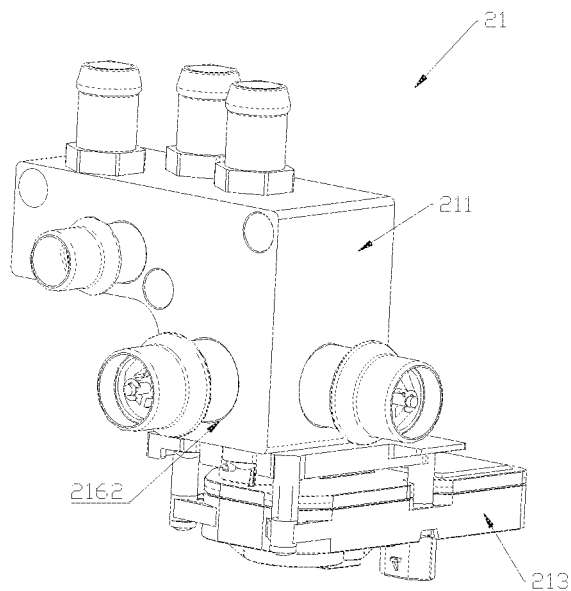
FIG. 5 is a perspective structural schematic view of a first fluid control device in FIG. 1.
Figure 6:
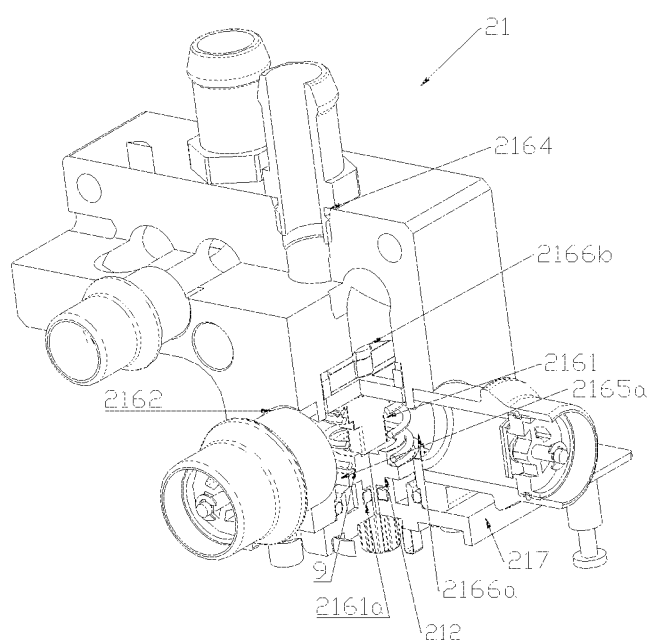
FIG. 6 is a partial sectional schematic view of the first fluid control device in FIG. 5.
Figure 7:
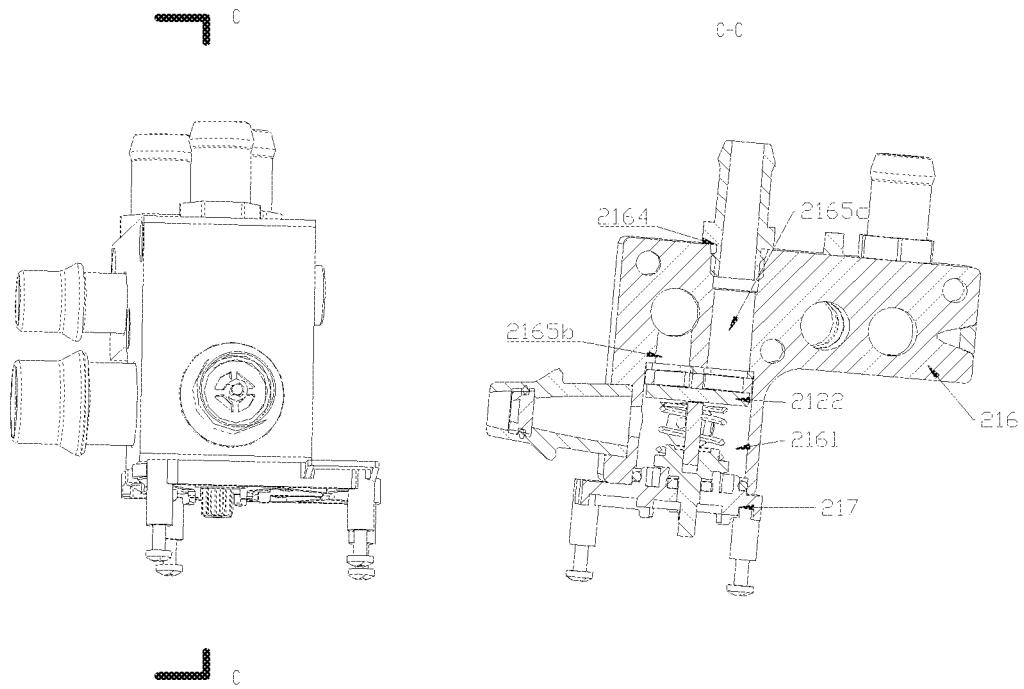
FIG. 7 is a planar schematic view and sectional schematic view of the first fluid control device in FIG. 1.

As another embodiment, reference is made to FIGS. 5 and 6, the first fluid control device 21 may be of a four-way structure, and the second fluid control device 22 may be of a of a four-way structure. Specifically, for example, the first fluid control device 21 includes a first fluid first inlet 2162, a first fluid second inlet 2162', a first fluid first outlet 2163 and a first fluid second outlet 2164. The first fluid control device 21 also includes the first flow passage 2165a, the second flow passage 2165b, the third flow passage 2165c and a seventh flow passage. The first fluid first inlet 2162 is in communication with the first flow passage 2165a, the first fluid second inlet 2162' is in communication with the seventh flow passage 2165d, the first fluid first outlet 2163 is in communication with the second flow passage 2165b, and the first fluid second outlet 2164 is in communication with the third flow passage 2165c. The second valve plate 2122 communicates the first mounting cavity 2161 and the second flow passage 2165b and/or the third flow passage 2165c, that is, the second flow passage 2165b can be in communication with the first mounting cavity 2161 through the second valve plate 2122, i.e., the second flow passage 2165b is in communication with both the first flow passage 2165a and the seventh flow passage. The third flow passage 2165c can be in communication with the first mounting cavity 2161 through the second valve plate 2122, i.e., the third flow passage 2165c is in communication with both the first flow passage 2165a and the seventh flow passage; and a situation that both the second flow passage 2165b and the third flow passage 2165c are in communication with the first mounting cavity 2161 is included.

Fifth Embodiment

Reference is made to FIGS. 40 to 45, and FIG. 40 is a perspective structural schematic view of a fluid heat exchange assembly 70. The fluid heat exchange assembly 70 includes a fluid control module 2' and a fluid heat exchange module 1''', and the fluid heat exchange module 1''' refers to the fluid heat exchange module in the above description. The fluid control module 2' includes a base member 22, a first body portion 21a and a second body portion 21b, the base member 21 includes a first mounting cavity 2202a and a second mounting cavity 2202b, which are not in communication with each other, at least a part of the first body portion 21a is located in the first mounting cavity, and at least a part of the second body portion 21b is located in the second mounting cavity 2202b.

The base member 22 includes a first fluid inlet 2211, a first fluid first outlet 2213, a first fluid second outlet 2214, a second fluid first inlet 2215, a second fluid first outlet 2216 and a second fluid second outlet 2217; the first fluid inlet 2211 is in communication with the first mounting cavity 2202a, and the second fluid first inlet 2215 is in communication with the second mounting cavity 2202b. The first outlet, the second outlet, the first inlet and the second inlet herein are only intended to facilitate the description, and have no limitation to the order of function. The fluid heat exchange module 1''' includes at least one heat exchange core, and the fluid heat exchange module 1''' at least includes the first fluid communication cavity 14 and the second fluid communication cavity 15. At least a part of the first fluid communication cavity 14 is arranged in the heat exchange core, at least a part of the second fluid communication cavity 15 is arranged in the heat exchange core, the first fluid communication cavity 14 is isolated from the second fluid communication cavity 15, the first fluid first outlet 2213 is in communication with the first fluid communication cavity, and the second fluid first outlet 2216 is in communication with the second fluid communication cavity.

The base member 22 includes a fluid channel, the fluid channel includes a first flow passage 201, a second flow passage 202, a third flow passage 203, a fourth flow passage 204, a fifth flow passage 205 and a sixth flow passage 206. The first flow passage 201 is in communication with the first fluid inlet 2211, the second flow passage 202 is in communication with the first fluid first outlet 2213, the third flow passage 203 is in communication with the first fluid second outlet 2214, the fourth flow passage 204 is in communication with the second fluid first inlet 2215, the fifth flow passage 205 is in communication with the second fluid first outlet 2216, and the sixth flow passage 206 is in communication with the second fluid second outlet 2217. The first flow passage 201 is in communication with at least one of the second flow passage 202 and the third flow passage 203, and the fourth flow passage 204 is in communication with at least one of the fifth flow passage 205 and the sixth flow passage 206.

The fluid heat exchange assembly includes at least following operating states:

a first operating state: the first flow passage 201 is not in communication with the second flow passage 202, and the first flow passage 201 is in communication with the third flow passage 203; the fluid flows through the first fluid inlet 2211, the first flow passage 201, the third flow passage 203 and the first fluid second outlet 2214;

a second operating state: the first flow passage 201 is in communication with the second flow passage 202, and the first flow passage 201 is not in communication with the third flow passage 203; the fluid flows through the first fluid inlet 2211, the first flow passage 201, the second flow passage 202 and the first fluid first outlet 2213;

a third operating state: the first flow passage 201 is in communication with both the second flow passage 202 and the third flow passage 203; after flowing through the first fluid inlet 2211 and the first flow passage 201, the fluid is divided into two branches, one of the branches flows through the second flow passage 202 and the first fluid first outlet 2213, and the other flows through the third flow passage 203 and the first fluid second outlet 2214.

The fluid heat exchange assembly includes at least following operating states:

a fourth operating state: the fourth flow passage 204 is not in communication with the fifth flow passage 205, and the fourth flow passage 204 is in communication with the sixth flow passage 206; the fluid flows through the second fluid first inlet 2215, the fourth flow passage 204, the sixth flow passage 206 and the second fluid second outlet 2217;

a fifth operating state: the fourth flow passage 204 is in communication with the fifth flow passage 205, and the fourth flow passage 204 is not in communication with the sixth flow passage 206; the fluid flows through the second fluid first inlet 2215, the fourth flow passage 204, the fifth flow passage 205 and the second fluid first outlet 2216;

a sixth operating state: the fourth flow passage 204 is in communication with both the fifth flow passage 205 and the sixth flow passage 206; after flowing through the second fluid first inlet 2215 and the fourth flow passage 204, the fluid is divided into two branches, one of the branches flows through the fifth flow passage 205 and the second fluid first outlet 2216, and the other flows through the sixth flow passage 206 and the second fluid second outlet 2217.

Structures of the first body portion 21a and the second body portion 21b refer to the valve core member 212 described above, and FIGS. 9 to 14 and FIG. 56.

The first body portion 21a includes a first valve plate 2121, the first valve plate 2121 is located in the first mounting cavity 2202a, and the first valve plate 2121 is fixed to the base member 22. The first flow passage 201 is in communication with the first mounting cavity 2202a, the first fluid inlet 2211 is located at one side of the first valve plate 2121, and the first fluid first outlet 2213 and the first fluid second outlet 2214 are located at another side of the first valve plate 2121. The first valve plate 2121 is provided with a first through hole 2121a and a second through hole 2121b being not in communication with each other, wherein the first through hole 2121a is in communication with the second flow passage 202, and the second through hole 2121b is in communication with the third flow passage 203.

The first body portion 21a further includes a second valve plate 2122, and the second valve plate 2122 is arranged opposite to the first valve plate 2121. The second valve plate 2122 is provided with at least one communication hole 2122a, an area of the communication hole 2122a or the sum of areas of two or more communication holes 2122a is smaller than a half of an area of the second valve plate 2122, the communication hole 2122a in the second valve plate 2122 is in communication with the first fluid inlet 2211 through the first flow passage 201. The second valve plate 2122 is able to rotate with respect to the first valve plate 2121, by regulating an orifice area of the first through hole 2121a and the second through hole 2121b being in communication with the communication hole 2122a in the second valve plate 2122, flow rates of the fluids entering the second flow passage and the third flow passage can be regulated, and the second flow passage or the third flow passage can be unblocked or blocked. The fluid heat exchange assembly includes a positioning pin and a sealing element, the base member includes a first bottom surface where the first mounting cavity 2202a is formed, for example, the sealing element is a sealing sheet 214, and the sealing sheet 214 is located between the first valve plate 2121 and the first bottom surface. The first bottom surface is provided with a position-limiting hole, the first valve plate is provided with a positioning hole, and the positioning pin is located in the position-limiting hole and the positioning hole, in this way, the first valve plate 2121 is fixed to the base member without shifting.

Of course, the second body portion 21b may also include a first valve plate 2121 and a second valve plate 2122, the first valve plate 2121 is located in the second mounting cavity 2202b, and the first valve plate 2121 is fixedly arranged to the base member 22. The fourth flow passage 204 is in communication with the second mounting cavity 2202b, the second fluid first inlet 2215 is located at one side of the first valve plate 2121, and the second fluid first outlet 2216 and the second fluid second outlet 2217 are located at another side of the first valve plate 2121. The first valve plate 2121 is provided with first through holes 2121a and a second through hole 2121b being not in communication with each other, wherein one of the first through hole 2121a is in communication with the fifth flow passage 205, and the second through hole 2121b is in communication with the sixth flow passage 206. The second valve plate 2122 is arranged opposite to the first valve plate 2121. The second valve plate 2122 is provided with at least one communication hole 2122a, an area of the communication hole 2122a or the sum of areas of two or more communication holes 2122a is smaller than a half of an area of the second valve plate 2122, the communication hole 2122a in the second valve plate 2122 is in communication with the second fluid first inlet 2215 through the fourth flow passage 204. The second valve plate 2122 is able to rotate with respect to the first valve plate 2121, by regulating an orifice area of the first through hole 2121a and the second through hole 2121b in the first valve plate 2121 being in communication with the communication hole 2122a in the second valve plate 2122, flow rates of the fluids entering the fifth flow passage 205 and the sixth flow passage 206 can be regulated, and the fifth flow passage 205 or the sixth flow passage 206 can be unblocked or blocked.

The fluid heat exchange assembly includes a positioning pin and a sealing element, for example, the sealing element is a sealing sheet 214, the base member includes a second bottom surface where the second mounting cavity is formed, and the sealing sheet 214 is located between the first valve plate and the second bottom surface. The second bottom surface is provided with a position-limiting hole, the first valve plate is provided with a positioning hole, and the positioning pin is located in the position-limiting hole and the positioning hole, in this way, the first valve plate is fixedly arranged to the base member without shifting.

With continued reference to FIGS. 40 to 45, the base member 22 is a block structure, and specifically, the base member 22 is an aluminum casting structure. The base member 22 includes a first lateral portion 2208, a neighboring lateral portion and a fourth lateral portion 2210. The first lateral portion 2208 is provided with an opening of the first mounting cavity 2202a and an opening of the second mounting cavity 2202b. The neighboring lateral portion is adjacent to the first lateral portion 2208. The first fluid inlet 2211 is located at the neighboring lateral portion, the neighboring lateral portion includes a second lateral portion (i.e., the first connecting lateral portion 218) and a third lateral portion 2209, the first lateral portion 2208 is adjacently arranged to the second lateral portion, the first lateral portion 2208 is adjacently arranged to the third lateral portion 2209, and the third lateral portion 2209 is oppositely arranged to the second lateral portion. The first lateral portion 2208 is oppositely arranged to the fourth lateral portion 2210, and the second lateral portion is adjacently arranged to the fourth lateral portion 2210. The first lateral portion herein refers to an opposite side of the assembly rather than being limited only to a plane. Specifically, the first fluid first outlet 2213 and the second fluid first outlet 2216 are located at the second lateral portion, and the second flow passage 202 is a bent-type channel. The second flow passage 202 includes a first transitional channel 2219 in communication with the first through hole 2121a in the first valve plate 2121 of the first body portion 21a and a first communication channel 2220 in communication with the first fluid first outlet 2213, and an extending direction of the first transitional channel 2219 is different from that of the first communication channel 2220. The fifth flow passage 205 is a bent-type channel, and includes a transitional channel in communication with the first through hole 2121a in the first valve plate 2121 of the second body portion 21b and a communication channel in communication with the second fluid first outlet 2216, and an extending direction of the transitional channel is different from that of the communication channel. In this way, the first fluid first outlet 2213 and the second fluid first outlet 2216 are located at a same lateral portion, which facilitates the connection of subsequent devices.

Specifically, the first fluid first outlet 2213 is located at the second lateral portion, the first fluid inlet 2211 is located at the second lateral portion, and the first fluid second outlet 2214 is located at the second lateral portion. The third flow passage 203 is a bent-type channel and includes a second transitional channel 2223 in communication with the second through hole 2121b in the first valve plate 2121 of the first body portion 21a and a second communication channel 2224 in communication with the first fluid second outlet 2214. An extending direction of the second transitional channel 2223 is different from that of the second communication channel 2224, and a length of the first transitional channel 2219 of the second flow passage 202 is greater than that of the second transitional channel 2223 of the third flow passage 203. In this way, the first fluid first inlet and the first fluid first outlet are opened at a same lateral portion, which facilitates the installation and connection between the first fluid in an external system and the assembly.

Specifically, the first fluid inlet 2211 is located at the second lateral portion, the second fluid first inlet is located at the third lateral portion 2209, the first fluid first inlet and the second fluid inlet are arranged at two opposite lateral portions respectively, which facilitates the pipe connection, and does not tend to cause pipe interference. Specifically, a distance between the opening of the first mounting cavity 2202a and the fourth lateral portion is larger than a distance between the opening of the second mounting cavity 2202b and the fourth lateral portion, which not only facilitates drilling, but also facilitates the installation of a motor, avoids the interference and facilitates the connection and control of the motor.

Specifically, the base member 22 further includes a second fluid second inlet 2212, the second fluid second inlet 2212 is in communication with the second mounting cavity 2202b, the fluid channel further includes a seventh flow passage 207, the seventh flow passage 207 is in communication with the second fluid second inlet 2212, the seventh flow passage 207 is in communication with the second mounting cavity 2202b, and the second fluid first inlet 2215 and the second fluid second inlet 2212 are located at the neighboring lateral portion.

Specifically, the second lateral portion is provided with a first opening 2225, the fourth lateral portion 2210 is provided with at least one of a second opening 2227 and a third opening 2228, the first opening 2225 is in communication with the second opening 2227, and the first opening 2225 is in communication with the third opening 2228. Of course, the base member 22 may further include a fourth opening 2226, the fourth opening 2226 is in communication with the second opening 2227, the fourth opening 2226 is in communication with the third opening 2228, and the fourth opening 2226 may be located at the third lateral portion or other positions. The first opening 2225 may be in communication with the second fluid communication cavity of the fluid heat exchange module 1, so that after entering the base member 22 from the first opening 2225, the fluid can flow out from the second opening 2227 and the third opening 2227; the fluid may also enter the base member 22 from the fourth opening 2226, and flows out from the second opening 2227 and the third opening 2228, so that the base member 22 can integrate different flow passages, which makes the structure more compact and reduces many connecting pipes, so that the system connected to the assembly is more stable.

Sixth Embodiment

Figure 46:
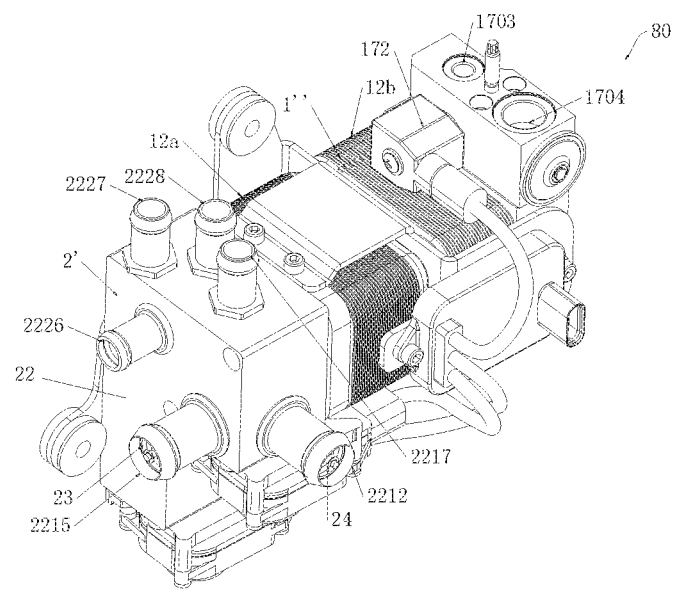
FIG. 46 is a perspective structural schematic view of another embodiment of the fluid heat exchange assembly.

Reference is made to FIG. 46, which is a perspective structural schematic view of a fluid heat exchange assembly 80. The fluid heat exchange module 1" includes a first heat exchange core 11 and a second heat exchange core 12, the first heat exchange core 11 is fixedly assembled to the fluid control module 2', and the first heat exchange core 11 is fixedly assembled to the second heat exchange core 12. The fluid heat exchange module 1" includes a first fluid communication cavity 14, a second fluid communication cavity 15 and a third fluid communication cavity 16. A part of the first fluid communication cavity 14 is arranged in the first heat exchange core 11, a part of the second fluid communication cavity 15 is arranged in the first heat exchange core 11, a part of the first fluid communication cavity 14 is arranged in the second heat exchange core 12, a part of the third fluid communication cavity 16 is arranged in the second heat exchange core 12, and the first fluid communication cavity 14, the second fluid communication cavity 15 and the third fluid communication cavity 16 are not in communication with one another.

Figure 48:
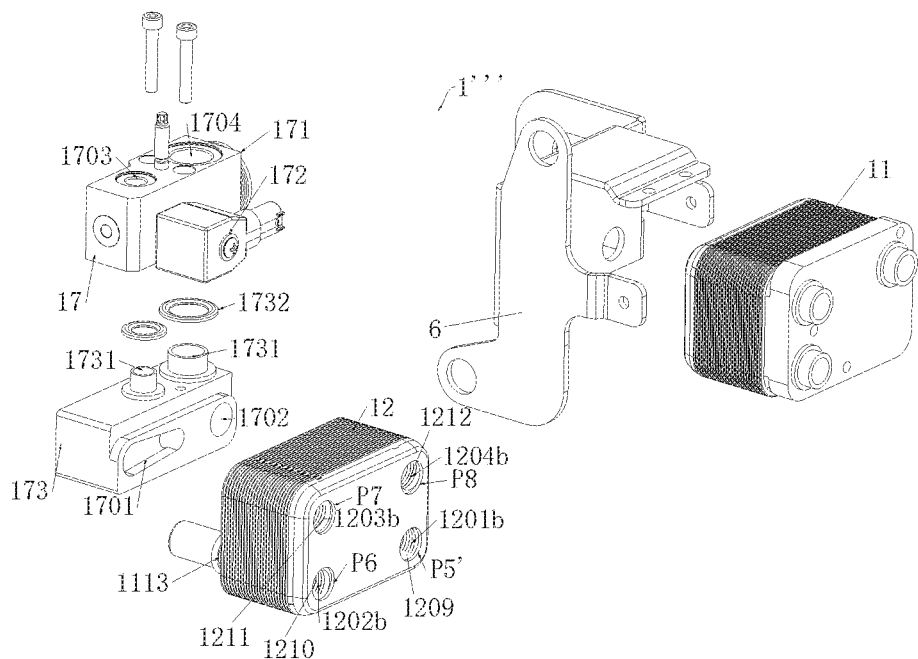
FIG. 48 is a perspective exploded schematic view of the fluid heat exchange module in FIG. 46.
Figure 50:
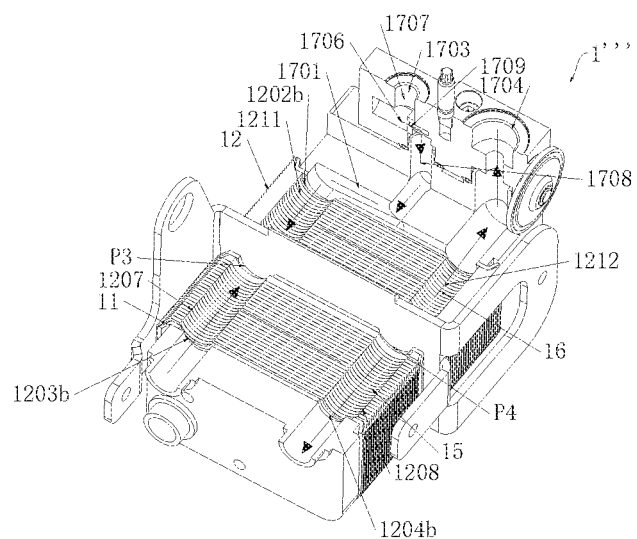
FIG. 50 is a partial sectional schematic view of the fluid heat exchange module in FIG. 46.
Figure 51:
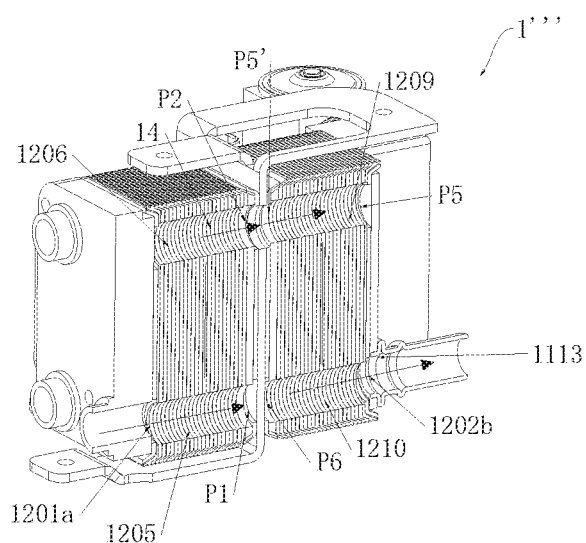
FIG. 51 is a partial sectional schematic view of the fluid heat exchange module in FIG. 46, wherein a sectional direction is different from FIG. 50.

Reference is made to FIGS. 48, 50 and 51, FIGS. 50 and 51 are partial sectional schematic views of the fluid heat exchange module 1″. The first heat exchange core 11 includes a first orifice channel 1205, a second orifice channel 1206, a third orifice channel 1207 and a fourth orifice channel 1208. The first heat exchange core 11 is substantially of a cuboid structure, the first orifice channel 1205, the second orifice channel 1206, the third orifice channel 1207 and the fourth orifice channel 1208 are located at positions close to the corners of the first heat exchange core 11. The second heat exchange core 12 includes a fifth orifice channel 1209, a sixth orifice channel 1210, a seventh orifice channel 1211 and an eighth orifice channel 1212. The second heat exchange core 12 is substantially of a cuboid structure, the fifth orifice channel 1209, the sixth orifice channel 1210, the seventh orifice channel 1211 and the eighth orifice channel 1212 are located at positions close to the corners of the second heat exchange core 12. The first orifice channel 1205 has an outer end opening and an inner end opening P1, the second orifice channel 1206 has an outer end opening and an inner end opening P2, the outer end opening of the second orifice channel 1206 is closed, the third orifice channel 1207 has an inner end opening P3, the fourth orifice channel 1208 has an inner end opening P4, the inner end opening P3 of the third orifice channel 1207 is closed, the inner end opening P4 of the fourth orifice channel 1208 is closed, and the third orifice channel 1207 and the fourth orifice channel 1208 are in communication to form a part of the second fluid communication cavity 15. The fifth orifice channel 1209 has an outer end opening P5 and an inner end opening P5′, the sixth orifice channel 1210 has an outer end opening and an inner end opening P6, the inner end opening P2 of the second orifice channel 1206 is in communication with the inner end opening P5′ of the fifth orifice channel, the outer end opening of the second orifice channel is closed, the outer end opening P5 of the fifth orifice channel is closed, the inner end opening P6 of the sixth orifice channel 1210 is closed, and the first orifice channel, the second orifice channel, the fifth orifice channel and the sixth orifice channel are in communication to form a part of the first fluid communication cavity 14. The seventh orifice channel 1211 has an inner end opening P7, the eighth orifice channel 1212 has an inner end opening P8, the inner end opening P7 of the seventh orifice channel is closed, the inner end opening P8 of the eighth orifice channel is closed, and the seventh orifice channel 1211 and the eighth orifice channel 1212 are in communication to form a part of the third fluid communication cavity 16. In this application, the outer end openings refer to end openings located relatively outside the heat exchange core, and the inner end openings refer to end openings located relatively inside the heat exchange core. Of course, in this application, the inner end portion or the outer end portion of each of the orifice channels may be closed by closing one side of the heat exchange core, or may also be closed by providing a connecting plate between the first heat exchange core and the second heat exchange core.

Figure 47:
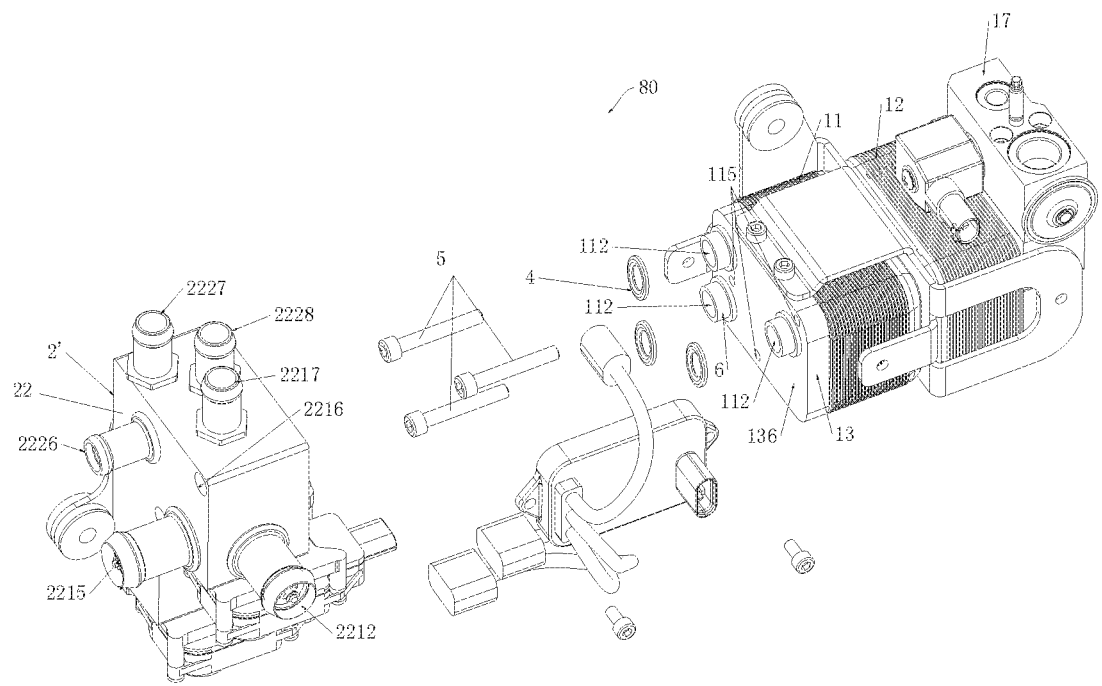
FIG. 47 is a perspective exploded schematic view of the fluid heat exchange assembly in FIG. 46.

In addition, as another embodiment, reference is made to FIGS. 47, 48 and 50, the fluid heat exchange module 1″ includes a flow control member 17, the flow control member 17 includes a first port 1701, a second port 1702, a third port 1703 and a fourth port 1704, a flow control channel 1706 is connected between the third port 1703 and the fourth port 1704, the flow control channel 1706 is in communication with the third fluid communication cavity 16. The flow control channel 1706 is a zigzag channel, and the flow control channel 1706 includes a first connecting region 1707, a second connecting region 1708 and a throttling region 1709. The first connecting region 1707 is in communication with the third port 1703, the second connecting region 1708 is in communication with the first port 1701, the throttling region 1709 communicates the first connecting region 1707 with the second connecting region 1708, and a channel size of the throttling region 1709 is variable. Or the throttling region 1709 blocks the first connecting region 1707 and the second connecting region 1708. The first port 1701 and the second port 1702 are located at a same lateral portion of the flow control member 17, the third port 1703 and the fourth port 1704 are located at a same lateral portion of the flow control member 17 which is not the same lateral portion where the first port 1701 is located. The first port 1701 is in communication with the seventh orifice channel 1211, and the second port 1702 is in communication with the eighth orifice channel 1212. The flow control member 17 can control the opening, closing and size adjustment of the flow control channel.

More specifically, the flow control member 17 includes a valve body 171, a magnetic valve 172 and a mounting block 173. The valve body 171 includes two positioning orifices (not shown in the figs.), and the mounting block 173 includes positioning bosses 1731 corresponding to the positioning orifices. Each of the positioning bosses 1731 matches with the corresponding positioning orifice, and the positioning boss and the positioning orifice are sealingly arranged through a sealing ring 1732. The valve body 171 and the mounting block 173 are fixed by bolts.

The magnetic valve 172 is located at a lateral portion of the valve body 171, and the magnetic valve 172 controls the opening and closing of the flow control channel.

A distance between a center line of the third port 1703 and a center line of the fourth port 1704 is smaller than a distance between a center line of the seventh orifice channel and a center line of the eighth orifice channel. The first port 1701 is of a long strip shape, one end of the first port 1701 in a length direction is in communication with the third port 1703, and another end of the first port 1701 in the length direction is in communication with the seventh orifice channel. The long strip shape herein refers to being approximate to the long strip shape, and the shape of the first port is the long strip shape with respect to a circular shape.

Figure 49:
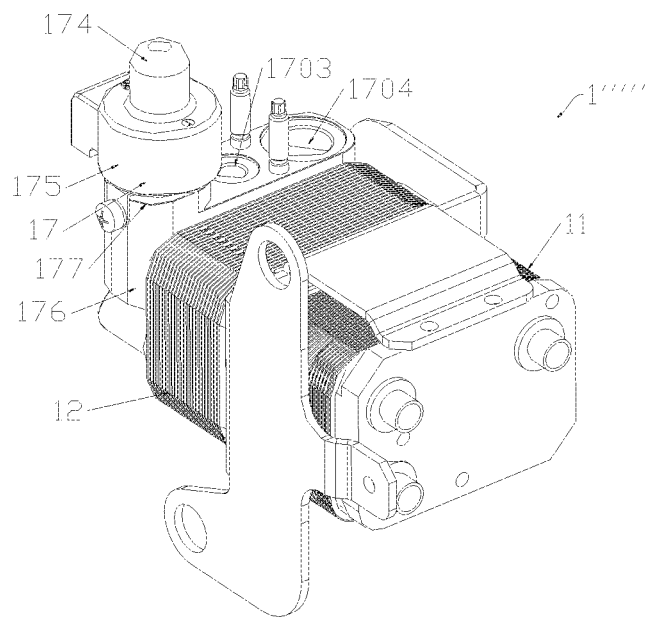
FIG. 49 is a perspective structural schematic view of another embodiment of the fluid heat exchange module.

Reference is made to FIG. 49, which is a perspective structural schematic view of the fluid heat exchange module 1‴. The flow control member 17 of the fluid heat exchange module 1‴ includes a body portion 174, a coil portion 175 and a connecting component 176. The coil portion 175 is sleeved outside the body portion 174, the connecting component 176 further includes an accommodating hole 177, and at least a part of the body portion 174 is located in the accommodating hole 177. The part of the body portion 174 extending into the accommodating hole 177 forms a part of the flow control channel, the opening, closing and size adjustment of the flow control channel are achieved by the movement of a valve needle in the body portion 174, and the movement of the valve needle is driven by a magnetic force of the coil portion 175. The connecting component 176 is provided with the first port, the second port, the third port 1703 and the fourth port 1704.

Reference is made to FIG. 46, the fluid control module 2' further includes a first one-way valve 23 and a second one-way valve 24, the first one-way valve 23 is located at a position of the second fluid first inlet 2215, the second one-way valve 24 is located at a position of the second fluid second inlet 2212, to ensure that the fluid enters the second mounting cavity 2202b through the second fluid first inlet and the second fluid second inlet. With the arrangement of the one-way valves, a flow direction of the second fluid is effectively controlled, thus preventing the fluid from flowing reversely after the second body portion is damaged, which affects the operation result of the system.

Seventh Embodiment

Figure 52:
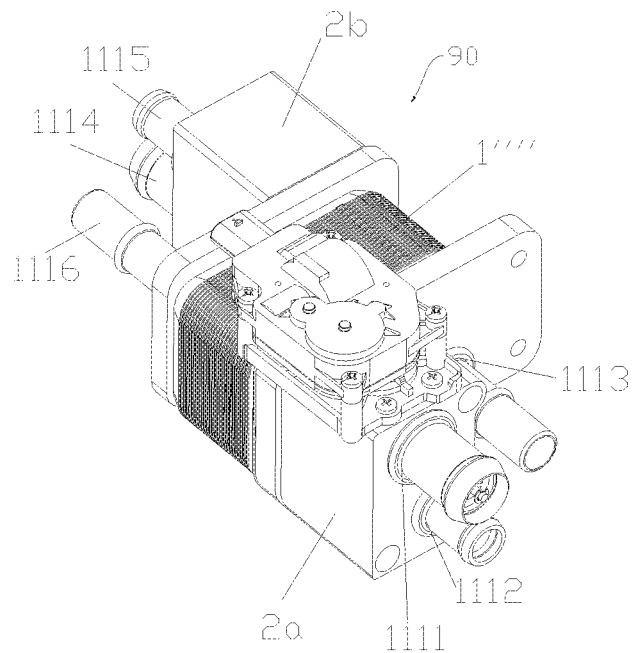
FIG. 52 is a perspective structural schematic view of an embodiment of the fluid heat exchange assembly.

Reference is made to FIG. 52, which is a schematic view of a fluid heat exchange assembly 90. The fluid heat exchange assembly 90 includes at least a first outer port 1111, a third outer port 1112, a third outer port 1113, a fourth outer port 1114, a fifth outer port 1115 and a sixth outer port 1116. The fluid heat exchange assembly 90 includes a fluid heat exchange module 1 and a fluid control module, the fluid control module includes a first fluid control device 2a and a second fluid control device 2b, the first fluid control device 2a is provided with the first outer port 1111 and the third outer port 1112, and the second fluid control device 2b is provided with the fourth outer port 1114 and the fifth outer port 1115.

The first fluid control device 2a and the second fluid control device 2b are arranged at two sides of the fluid heat exchange module respectively, the first fluid control device 2a is fixedly assembled to the fluid heat exchange module 1, and the second fluid control device 2b is fixedly assembled to the fluid heat exchange module 1. The first fluid control device 2a includes a first connecting lateral portion 2201a, the second fluid control device 2b includes a fifth connecting lateral portion 2201b, and the fluid heat exchange module 1 includes a second connecting lateral portion 11010 and a sixth connecting lateral portion 11020. The first connecting lateral portion 2201a and the second connecting lateral portion 11010 are oppositely and sealingly arranged, and the fifth connecting lateral portion 2201b and the sixth connecting lateral portion 11020 are oppositely and sealingly arranged. In this way, the fluid heat exchange assembly integrates the fluid control module and the fluid heat exchange module, the fluid control module and the fluid heat exchange module can be connected through inner structures without pipes, and the fluid heat exchange assembly is connected to other parts of a thermal management system through the outer ports, thus the pipe arrangement of the fluid heat exchange assembly is significantly reduced, the structure is smaller and more compact, and the installation of the system is convenient.

Figure 53:
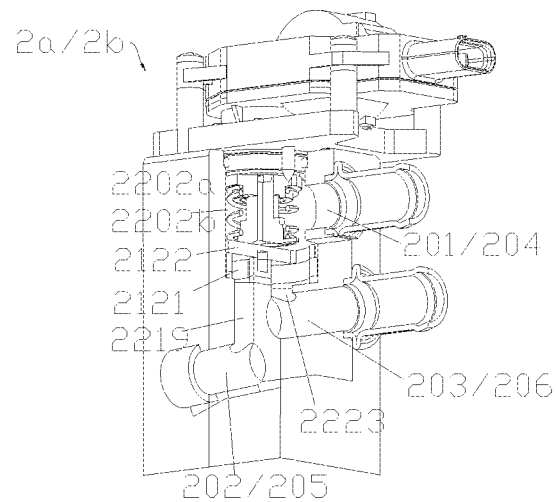
FIG. 53 is a sectional schematic view of one of fluid conducting modules of the fluid heat exchange assembly shown in FIG. 52.
Figure 56:
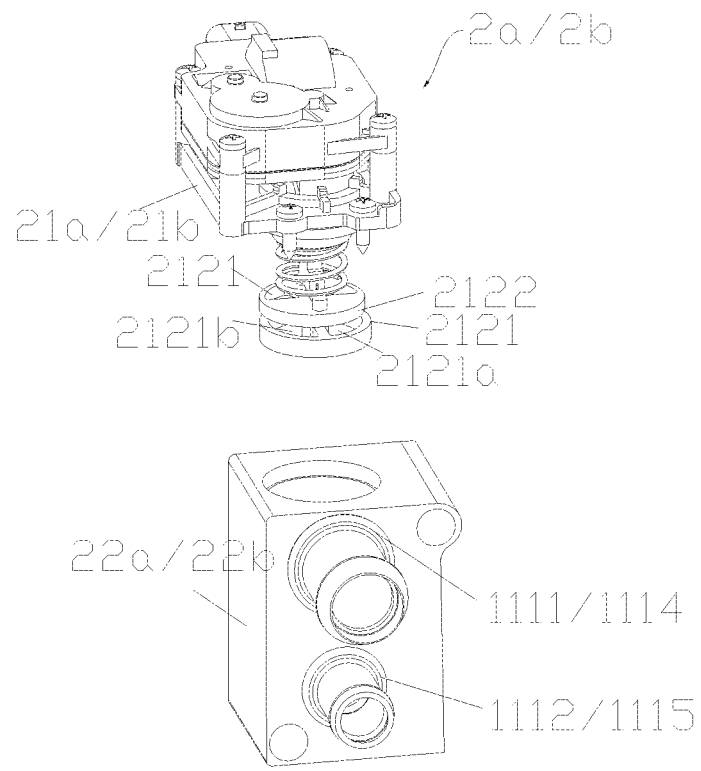
FIG. 56 is a perspective structural exploded schematic view of one of the fluid conducting modules of the fluid heat exchange assembly shown in FIG. 52.

Reference is made to FIGS. 53 and 56, FIG. 53 is a partially sectional schematic view of the first fluid control device 2a and the second fluid control device 2b, and FIG. 56 is a perspective exploded schematic view of the first fluid control device 2a and the second fluid control device 2b. The first fluid control device 2a and the second fluid control device 2b refer to the above description. The first fluid control device 2a includes a first body portion 21a and a base member 22a, the base member 22a includes a mounting cavity 2202a, and at least a part of the first body portion 21a is located in the mounting cavity 2202a. The first fluid control device 2a at least includes a first flow passage 201, a second flow passage 202 and a third flow passage 203. The first flow passage 201 is in communication with the first outer port 1111, the second flow passage 202 is in communication with the third outer port 1112, and the mounting cavity 2202a is in communication with the first flow passage 201. In this application, the first flow passage, the second flow passage, the third flow passage and other similar names represent fluid passages.

The second fluid control device 2b includes a second body portion 21b and a base member 22b, the base member 22b includes a mounting cavity 2202b, and at least a part of the second body portion 21b is located in the mounting cavity 2202b. The second fluid control device 2b at least includes a fourth flow passage 204, a fifth flow passage 205 and a sixth flow passage 206, the fourth flow passage 204 is in communication with the fourth outer port 1114, the fifth flow passage 205 is in communication with the fifth outer port 1115, and the mounting cavity 2202b is in communication with the fourth flow passage 201. Structures of the first body portion and the second body portion may refer to the above description.

By regulating the area of the first through hole 2121a and the second through hole 2121b in the first valve plate 2121 being in communication with the communication hole 2122a in the second valve plate 2122, flow rates of the fluids entering the fifth flow passage 205 and the sixth flow passage 206 can be regulated, and the fifth flow passage or the sixth flow passage can be unblocked or blocked; or flow rates of the fluids entering the second flow passage 202 and the third flow passage 203 can be regulated, and the second flow passage or the third flow passage can be unblocked or blocked.

Figure 54:
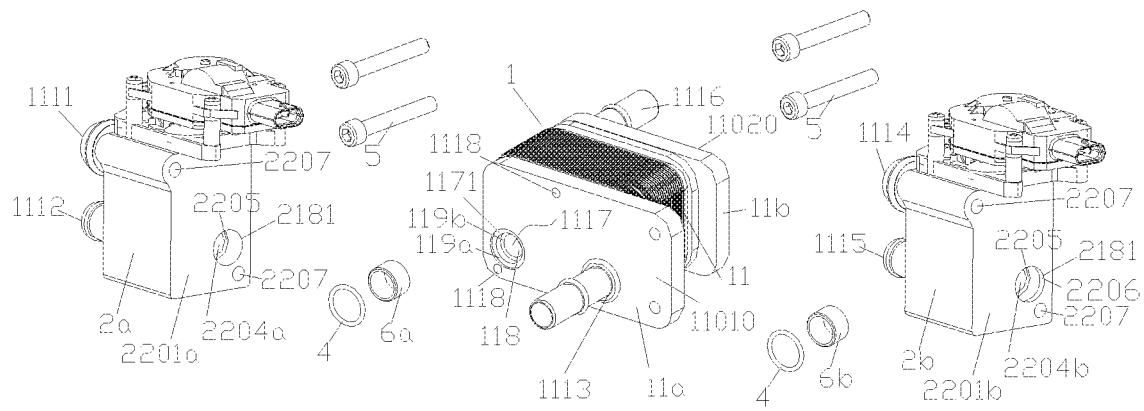
FIG. 54 is a perspective structural exploded schematic view of the fluid heat exchange assembly shown in FIG. 52.
Figure 55:
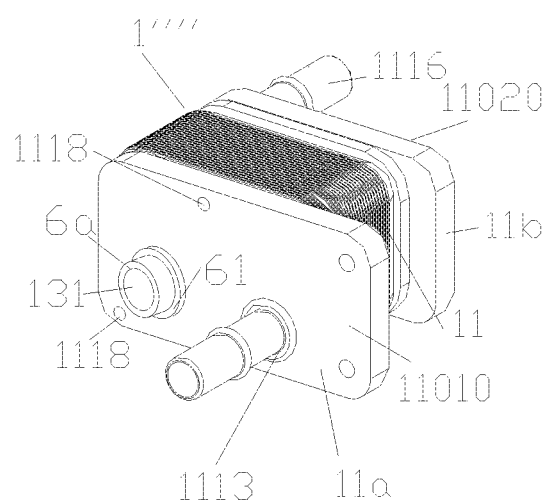
FIG. 55 is a perspective structural schematic view of another embodiment of the fluid heat exchange module.

Reference is made to FIGS. 54 and 55, a fluid heat exchange module 1"" includes at least a heat exchange core 11, a first connecting component 11a and a second connecting component 11b. One side of the heat exchange core 11 is relatively fixed to the first connecting component 11a, another side of the heat exchange core 11 is relatively fixed to the second connecting component 11b, and the heat exchange core, the first connecting component and the second connecting component 11b may be fixed by welding or bolts. The first connecting component 11a is provided with the second connecting lateral portion 11010, the second connecting component 11b is provided with the sixth connecting lateral portion 11020, the first connecting component 11a is fixedly assembled to the first fluid control module 2a, and the second connecting component 11b is fixedly assembled to the second fluid control module 2b. The first connecting component 11a includes a third connecting lateral portion 11011, the heat exchange core 11 includes a fourth connecting lateral portion 11012, and the third connecting lateral portion 11011 and the fourth connecting lateral portion 11012 are fixed by welding. The second connecting component 11b includes a seventh connecting lateral portion 11021, the heat exchange core 1 includes an eighth connecting lateral portion 11022, and the seventh connecting lateral portion 11021 and the eighth connecting lateral portion 11022 are fixed by welding. The first connecting component 11a includes a connecting channel 1117, the connecting channel 1117 penetrates through the first connecting component 11a, and the connecting channel 1117 connects the second flow passage and the first fluid communication cavity. The second connecting component 11b includes a connecting channel 1117', the connecting channel 1117' penetrates through the second connecting component 11b, and the connecting channel 1117' connects the fifth flow passage and the second fluid communication cavity. The first connecting component 11a includes a plane portion 1351, the plane portion 1351 is located at the third connecting lateral portion 11011, the plane portion 1351 is in contact with the heat exchange core 11 and is fixed to the heat exchange core 11 by welding, and the plane portion 1351 occupies at least half of an area of the fourth connecting lateral portion 11012. The second connecting component 11*b* includes a plane portion 1351', the plane portion 1351' is located at the seventh connecting lateral portion 11021, the plane portion 1351' is in contact with the heat exchange core 11 and is fixed to the heat exchange core 11 by welding, and the plane portion 1351' occupies at least half of an area of the eighth connecting lateral portion 11022. In this way, welding faces between the plane portions and the fourth connecting lateral portion and the eighth connecting lateral portion are large, so that the welding between the plane portion and the fourth connecting lateral portion and the welding between the plane portion and the eighth connecting lateral portion are more stable, and leakage is not likely to occur to affect the performance. In addition, the processing of the connecting components is simple, and the assembly of the connecting components and the heat exchange core is relatively simple. Thus, the processing technology of the fluid heat exchange assembly is simplified, which facilitates standardized and rapid manufacturing without requiring complicated molds.

The first connecting lateral portion 2201*a* is provided with a first opening 2181, the second connecting lateral portion 1101 is provided with a second opening 1171, and the first opening 2181 is aligned with the second opening 1171. The first fluid control device 2*a* includes a first flow hole 2204, the fluid heat exchange module 1'''' includes a second flow hole 118, a diameter of the first flow hole 2204*a* is smaller than an inner diameter of the first opening 2181, and a diameter of the second flow hole 118 is smaller than an inner diameter of the second opening 1171. Of course, the structure of the second fluid control device 2*b* is similar to that of the first fluid control device 2*a*. The second fluid control device 2*b* includes a first opening 2181 and a third flow hole 2204*b*, the first opening 2181 of the second fluid control device 2*b* is aligned with the second opening 1171 arranged on the sixth connecting lateral portion 11020 of the fluid heat exchange module 1. The third flow hole 2204*b* of the second fluid control device 2*b* is in communication with a fourth flow hole (which is not shown in the figs. and can refer to the second flow hole 118) arranged on the sixth connecting lateral portion 11020 of the fluid heat exchange module 1. A diameter of the third flow hole 2204*b* is smaller than the inner diameter of the first opening 2181, and a diameter of the fourth flow hole is smaller than the inner diameter of the second opening 1171. The diameter of the first flow hole is smaller than that of the first opening, the diameter of the second flow hole is smaller than that of the second opening, the diameter of the third flow hole is smaller than that of the first opening, and the diameter of the fourth flow hole is smaller than that of the second opening, so that the flow resistance of the fluid flowing through the fluid control module and the fluid heat exchange module is relatively small.

Specifically, the fluid heat exchange module 1'''' is provided with a first flat portion 119*a*, and the first flat portion 119*a* is located around the second opening 1171. The fluid heat exchange assembly includes a sealing element 4, and the sealing element 4 is located at the first flat portion 119*a*. In this way, when the first fluid control device 2*a* is fixedly assembled to the fluid heat exchange module 1, and when the second fluid control device 2*b* is fixedly assembled to the fluid heat exchange module, the first opening 2181 is aligned with the second opening 1171, the first connecting lateral portion 2201*a* and the second connecting lateral portion 11010 are closely fitted, the fifth connecting lateral portion 2201*b* and the sixth connecting lateral portion 11020 are closely fitted, the first flow hole 2204*a* is arranged to be in communication with the second flow hole 118, the third flow hole 2204*b* is arranged to be in communication with the fourth flow hole, the first fluid control device 2*a* and the second fluid control device 2*b* are sealingly arranged with the fluid heat exchange module 1 through pressing the sealing elements. As another embodiment, the first fluid control device 2*a* may also include a first flat portion configured to place the sealing element. As another embodiment, the second fluid control device 2*b* may also include a first flat portion configured to place the sealing element. As another embodiment, the first fluid control device 2*a* or the second fluid control device 2*b*, and the fluid heat exchange module may both be provided with a first flat portion configured to place the sealing element, to achieve the sealing arrangement between the fluid control module and the fluid heat exchange module. As another embodiment, the first fluid control device 2*a*, the second fluid control device 2*b* and the fluid heat exchange module may all be provided with a first flat portion configured to place the sealing element, to achieve the sealing arrangement between the fluid control module and the fluid heat exchange module.

Reference is made to FIGS. 54 and 55, each of the first fluid control device 2*a* and the second fluid control device 2*b* includes through holes 2207, and the fluid heat exchange module 1 includes mounting holes 1118 corresponding to positions of the through holes 2207. The fluid heat exchange assembly includes fasteners 5 which extend into the through holes 2207 and the mounting holes 1118, and the fasteners 5 are fixedly arranged to the first fluid control device 2*a* or the second fluid control device 2*b*, and the fluid heat exchange module 1. The first connecting lateral portion 2201*a* and the second connecting lateral portion 11010 are closely fitted, and the fifth connecting lateral portion 2201*b* and the sixth connecting lateral portion 11020 are closely fitted and are fixed by the fasteners 5, for example, the fasteners are bolts. In this way, the sealing element 4 located at the first flat portion is subjected to a pressure between the first connecting lateral portion 2201*a* and the second connecting lateral portion 11020, to form a sealing surface, thereby preventing the fluid in the fluid heat exchange assembly from leaking.

More specifically, the fluid heat exchange assembly 10 includes a joint component 6, the joint component may be integrally arranged or separately arranged with the fluid control module, or may also be integrally arranged or separately arranged with the fluid heat exchange module. The joint component 6 includes a first joint component 6*a* and a second joint component 6*b*. The structures of the first joint component and the second joint component may also refer to the structure of the joint component 6 in FIG. 21.

Referring to FIG. 54, the fluid heat exchange assembly 90 includes a first joint component 6*a*, an end portion of the first joint component 6*a* is located in the first fluid control device 2*a* and/or the fluid heat exchange module 1. The first fluid control device 2*a* and the fluid heat exchange module 1 are in communication through the first joint component 6*a*, and the second flow passage 202 is in communication with an inner cavity of the first joint component 6*a*. And/or the fluid heat exchange assembly 10 includes a second joint component 6*b*, an end portion of the second joint component 6*b* is located in the second fluid control device 2*b* and/or the fluid heat exchange module 1, the second fluid control device 2*b* and the fluid heat exchange module 1 are in communication through the second joint component 6b, and the fifth flow passage 205 is in communication with an inner cavity of the second joint component 6b. The positioning of the first joint component and the second joint component facilitates the accurate assembly of the fluid heat exchange module and the fluid control module, thereby preventing the fluid leakage which affects the performance of the assembly.

Specifically, the first joint component 6a is separately arranged with the first fluid control device 2a and the fluid heat exchange module 1, and the second joint component 6b is separately arranged with the second fluid control device 2b and the fluid heat exchange module 1. The first joint component 6a extends into the first opening 2181 and the second opening 1171, the first flow hole 2204a is in communication with the inner cavity of the first joint component 6a, and the second flow hole 118 is in communication with the inner cavity of the first joint component 6a. The second joint component 6b extends into the first opening 2181 and the second opening 1171, the third flow hole 2204b is in communication with the inner cavity of the second joint component 6b, and the fourth flow hole is in communication with the inner cavity of the second joint component 6b.

The first joint component 6a is separately arranged with the first fluid control device 2a and the fluid heat exchange module 1, and the second joint component 6b is separately arranged with the second fluid control device 2b and the fluid heat exchange module 1, which contributes to the processing and designing, and in addition, the first joint component 6a and the second port 2b are positioned through the first opening and the second opening, which facilitates the assembly between the fluid heat exchange module and the fluid control module. Besides, inner diameters of the first flow hole 2204a, the second flow hole 118 and the first joint component 6a are substantially equal, and inner diameters of the third flow hole 2204b, the fourth flow hole and the second joint component 6b are substantially equal, so as to avoid a throttling effect caused by a large diameter difference which affects the flow resistance. Herein, the inner diameters of the first flow hole 2204, the second flow hole 118 and the joint component 6 being substantially equal includes situations that the inner diameters of the first flow hole 2204, the second flow hole 118, and the joint component 6 are slightly different. In this application, sizes of the second flow hole 118 arranged in the third connecting lateral portion and the fourth flow hole arranged in the fourth connecting lateral portion may be different or the same; and sizes of the first flow hole 2204a arranged in the first connecting lateral portion and the third flow hole 2204b arranged in the second connecting lateral portion may be different or the same.

Specifically, an outer diameter of the first joint component 6a is smaller than the first opening 2181 and equal to or greater than the second opening 1171, and the first joint component 6a is in interference fit with the fluid heat exchange module 1. And/or an outer diameter of the second joint component 6b is smaller than the first opening 2181 and equal to or greater than the second opening 1171, and the second joint component 6b is in interference fit with the fluid heat exchange module 1. The interference fit between the first joint component 6a and the fluid heat exchange module 1, and the interference fit between the second joint component 6b and the fluid heat exchange module 1 facilitate the assembly and fixation between the first joint component 6a and the first fluid control device 2a and the assembly and fixation between the second joint component 6b and the second fluid control device 2b, thus the positioning is more accurate.

As another embodiment, the outer diameter of the first joint component 6a is smaller than the second opening 1171 and equal to or larger than the first opening 2181, and the first joint component 6a is in interference fit with the first fluid control device 2a. And/or the outer diameter of the second joint component 6b is smaller than the second opening 1171 and equal to or larger than the first opening 2181, and the second joint component 6b is in interference fit with the second fluid control device 2b. The interference fit between the first joint component 6a and the first fluid control device 2a facilitates the assembly and fixation between the first joint component 6a and the fluid heat exchange module 1, and the interference fit between the second joint component 6b and the second fluid control device 2b facilitates the assembly and fixation between the second joint component 6b and the fluid heat exchange module 1, thus the positioning is more accurate. In this application, the interference fit includes a case that a minimum interference amount is zero. The joint component is in interference fit with one of the fluid control module and the fluid heat exchange module and then is assembled to the other, which makes the installation more convenient.

More specifically, the fluid heat exchange module 1 includes a second flat portion 119b, the fluid control device 2 is provided with a second flat portion 2205, the second flat portion 119b is located around the second flow hole 118 or the fourth flow hole, and the second flat portion 2205 is located around the first flow hole 2204a or the third flow hole 2204b. At least one of the second flat portions 119b and 2205 abuts against the end portion of the first joint component 6a, and at least one of the second flat portions 119b and 2205 abuts against the end portion of the second joint component 6b. A distance between the second flat portion 119b and the second flat portion 2205 is greater than or equal to a length of the first joint component 6a or the second joint component 6b. This arrangement facilitates the positioning of the joint components with the fluid heat exchange module 1 and the fluid control module 2, thus avoiding the effect on the performance of the fluid heat exchange assembly.

Specifically, the first joint component 6a extends into the first connecting component 11a and does not penetrate the first connecting component 11a, and a thickness of the first connecting component 11a is smaller than a thickness of the first fluid control device 2a; and/or the second joint component 6b extends into the second connecting component 11b and does not penetrate the second connecting component 11b, and a thickness of the second connecting component 11b is smaller than a thickness of the second fluid control device 2b. The fluid heat exchange module 1 is cooperatively connected to the joint component 6 through the connecting components, the thickness of the first connecting component 11a is smaller than the thickness of the first fluid control device 2a, and the thickness of the second connecting component 11b is smaller than the thickness of the second fluid control device 2b, which facilitates ensuring the connecting strength of the assembly between the joint component 6 and the connecting components.

As another embodiment, the joint component 6 is integrally arranged with one of the fluid heat exchange module 1 and the fluid control device 2. Specifically, reference is made to FIG. 55, which is a perspective structural schematic view of the fluid heat exchange module according to another embodiment. The first joint component 6a is integrally arranged with the fluid heat exchange module 1, the first joint component 6a integrally protrudes from the second connecting lateral portion 11010, the first fluid control device 2a is provided with a first opening 2181 and a first flat portion 2206 (the structure refers to FIG. 54). The end portion of the first joint component 6a extends into the first opening 2181, and the first flat portion 2206 is located around the first opening 2181. The fluid heat exchange assembly further includes a sealing element 4 located at the first flat portion 2206. A thickness of the connecting component is smaller than the thickness of the fluid control module 2. In this embodiment, the first joint component 6a is integrally arranged with one of the fluid heat exchange module 1 and the fluid control device 2, thus the assembly is convenient, and certain connecting strength can also be ensured, besides, the sealing performance is good.

In addition, a root portion of the first joint component 6a is provided with a flange 61, the flange 61 is integrally arranged with the fluid heat exchange module 1, and the flange 61 is arranged opposite to the first flat portion 2206. The first fluid control module 2a is provided with a first flow hole 2204a and a second flat portion 2205 (the structure refers to FIG. 54), the second flat portion 2205 is located around the first flow hole 2204a, the first flat portion 2206 is located around the first opening 2181, and an inner diameter of the first flow hole 2204a is smaller than an inner diameter of the first opening 2181. In this way, the flow resistance of the fluid flowing into the inner cavity of the joint component through the first flow hole 2204a is relatively not affected, so that the fluid can flow smoothly.

As another embodiment, the first joint component 6a is integrally arranged with the first fluid control device 2a, the first joint component 6a integrally protrudes from the first connecting lateral portion 2201a, the fluid heat exchange module 1 is provided with a second opening 1171, and the end portion of the first joint component 6a extends into the second opening 1171. The fluid heat exchange module 1 is provided with a first flat portion 119a, and the first flat portion 119a is located around the second opening 1171. The first joint component extends into the first connecting component and does not penetrate the first connecting component 11a, and the thickness of the first connecting component is smaller than the thickness of the first fluid control device. As another embodiment, the second joint component 6b is integrally arranged with the second fluid control device 2b, the second joint component 6b integrally protrudes from the fifth connecting lateral portion 2201b, the fluid heat exchange module 1 is provided with a second opening 1171, and the end portion of the second joint component 6b extends into the second opening 1171. The fluid heat exchange module 1 is provided with a first flat portion 119a, and the first flat portion 119a is located around the second opening 1171. The second joint component 6b extends into the second connecting component 11b and does not penetrate the second connecting component 11b, and the thickness of the second connecting component 11b is smaller than the thickness of the second fluid control device. As another embodiment, the second joint component 6b is integrally arranged with the fluid heat exchange module 1, the second joint component 6b may integrally protrude from the sixth connecting lateral portion 11020, the second fluid control device 2b is provided with a first flat portion 119a, and the first flat portion 119a is located around the first opening 2181.

In addition, a distance between the second flat portion 2205 and a wall face of the base member 22 forming the mounting cavity 2161 is not smaller than 0.5 mm, such that the cooperation between the joint component 6 and the second flat portion can better meet the strength requirement, and an inner structure of the mounting cavity 2161 is not easily affected.

Figure 57:
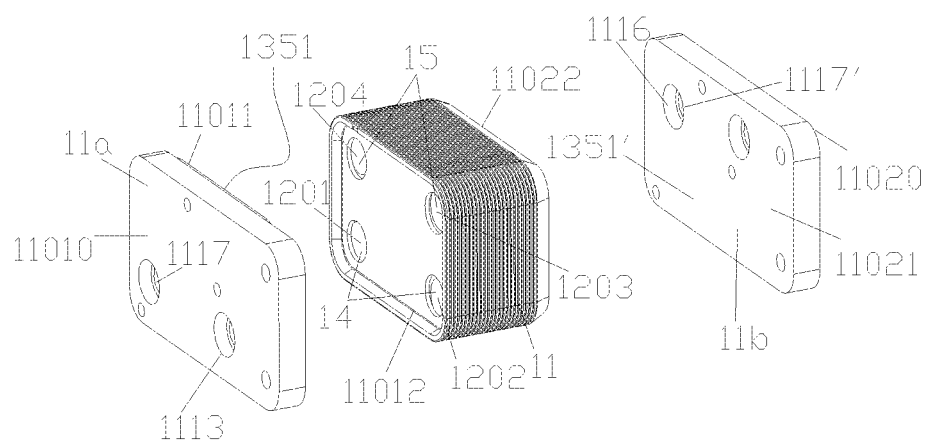
FIG. 57 is a perspective exploded schematic view of the fluid heat exchange module of the fluid heat exchange assembly shown in FIG. 52.

Reference is made to FIG. 57, the heat exchange core includes multiple plates which are laminated, each of the plates includes a first orifice 1201, a second orifice 1202, a third orifice 1203 and a fourth orifice 1204, the first orifices 1201 in all the plates are aligned to form a first orifice channel 1205, the second orifices 1202 in all the plates are aligned to form a second orifice channel 1206, the third orifices 1203 in all the plates are aligned to form a third orifice channel 1207, and the fourth orifices 1204 in all the plates are aligned to form a fourth orifice channel 1208. The heat exchange assembly 90 includes a first fluid communication cavity 14 and a second fluid communication cavity 15, the first fluid communication cavity 14 is isolated from the second fluid communication cavity 15, the first orifice channel 1205 and the second orifice channel 1206 are part of the first fluid communication cavity 14, the third orifice channel 1207 and the fourth orifice channel 1208 are part of the second fluid communication cavity 15, the second orifice channel 1206 is in communication with the third outer port 1113, and the fourth orifice channel 1208 is in communication with the sixth outer port 1116. The heat exchange assembly 90 includes a first fluid channel, a second fluid channel, a third fluid channel and a fourth fluid channel. The first fluid channel includes the first outer port 1111, the first flow passage 201, the second flow passage 202, the inner cavity of the first joint component 6a, the first orifice channel 1205, the second orifice channel 1206 and the third outer port 1113. The second fluid channel includes the fourth outer port 1114, the fourth flow passage 204, the fifth flow passage 205, the inner cavity of the second joint component 6b, the third orifice channel 1207, the fourth orifice channel 1208 and the sixth outer port 1116. The third fluid channel includes the first outer port 1111, the first flow passage 201, the third flow passage 203 and the third outer port 1112. The fourth fluid channel includes the fourth outer port 1114, the fourth flow passage 204, the sixth flow passage 206 and the fifth outer port 1115. The first fluid control device 2a may be provided with an inlet of the first fluid channel, the second fluid control device 2b may be provided with an inlet of the second fluid channel, and the fluid heat exchange module 1 may be provided with an outlet of the first fluid channel and an outlet of the second fluid channel. In this way, a first fluid can enter the fluid heat exchange module from the first fluid control device, and the first fluid is regulated by the first fluid control module, to regulate the flow rate of the fluid entering into the fluid heat exchange module; the second fluid can enter the fluid heat exchange module from the second fluid control module, and the second fluid is regulated by the second fluid control module, to regulate the flow rate of the fluid entering into the fluid heat exchange module, so that the two kinds of fluids can achieve an effective and expected heat exchange effect in the fluid heat exchange module.

Eighth Embodiment

As another embodiment, the fluid heat exchange assembly includes two or more heat exchange cores, and the fluid heat exchange module includes a first fluid communication cavity, a second fluid communication cavity and a third fluid heat exchange channel.

Figure 58:
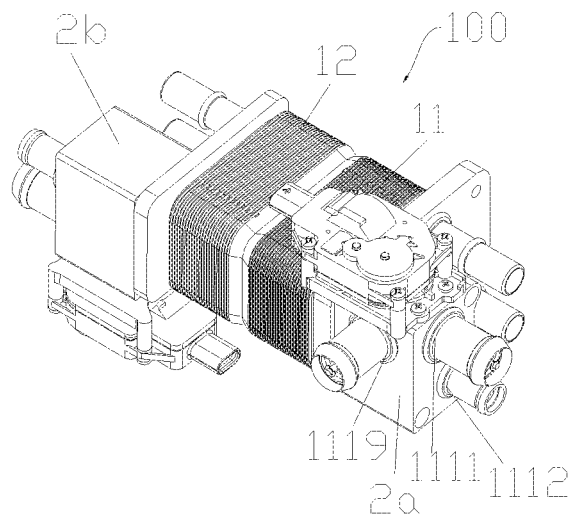
FIG. 58 is a perspective structural schematic view of another embodiment of the fluid heat exchange assembly.
Figure 59:
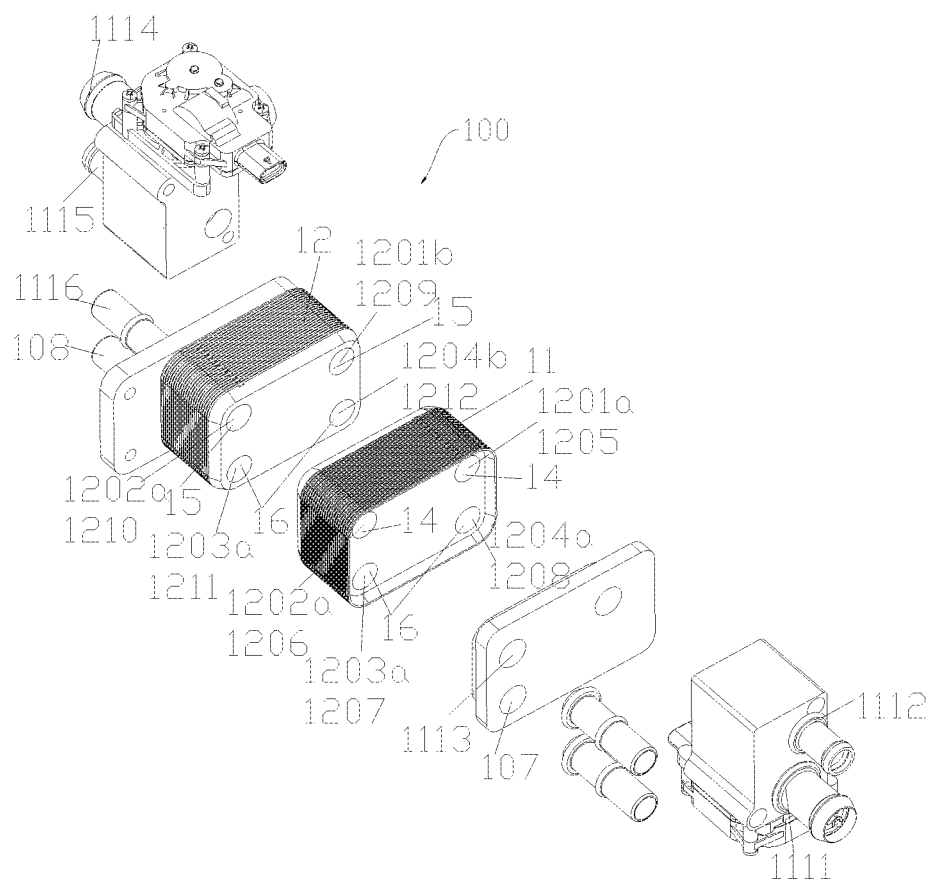
FIG. 59 is a perspective structural exploded schematic view of the fluid heat exchange assembly shown in FIG. 58.

Reference is made to FIG. 58, which is a perspective structural schematic view of the fluid heat exchange assembly 100. The fluid heat exchange module 1' includes a first heat exchange core 1a, a second heat exchange core 1b, a first connecting component 11a and a second connecting component 11b. The first heat exchange core 1a is fixedly assembled to the second heat exchange core 1b, the first fluid control device 14 is fixedly assembled to the first heat exchange core 1a, and the second fluid control device 2b is fixedly assembled to the second heat exchange core 1b, the fixation and assembly therebetween can be achieved by manners such as welding. The fluid heat exchange assembly 100 includes at least a first outer port 1111, a third outer port 1112, a third outer port 1113, a fourth outer port 1114, a fifth outer port 1115, a sixth outer port 1116, a seventh outer port 107 and an eighth outer port 108. The fluid heat exchange module 1 includes a first fluid communication cavity 14, a second fluid communication cavity 15 and a third fluid communication cavity 16. A part of the first fluid communication cavity 14 is arranged in the first heat exchange core 11, a part of the second fluid communication cavity 15 is arranged in the first heat exchange core 11, a part of the second fluid communication cavity 15 is arranged in the second heat exchange core 12, a part of the third fluid communication cavity 16 is arranged in the second heat exchange core 12, and the first fluid communication cavity 14, the second fluid communication cavity 15 and the third fluid communication cavity 16 are isolated from one another.

Reference is made to FIG. 58, which is a perspective structural exploded schematic view of the fluid heat exchange assembly 100. The first heat exchange core 11 includes multiple plates which are laminated, each of the plates includes a first orifice 1201a, a second orifice 1202a, a third orifice 1203a and a fourth orifice 1204a, the first orifices 1201a in all the plates are aligned to form a first orifice channel 1205, the second orifices 1202a in all the plates are aligned to form a second orifice channel 1206, the third orifices 1203a in all the plates are aligned to form a third orifice channel 1207, and the fourth orifices 1204a in all the plates are aligned to form a fourth orifice channel 1208. The first heat exchange core 11 is substantially of a cuboid structure, the first orifice channel 1205, the second orifice channel 1206, the third orifice channel 1207 and the fourth orifice channel 1208 are located at positions close to corners of the first heat exchange core 11. Wherein, the first orifice channel 1205 is in communication with the second orifice channel 1206 to form a part of the first fluid communication cavity 14, the third orifice channel 1207 is in communication with the fourth orifice channel 1208 to form a part of the third fluid communication cavity 16, the second orifice channel 1206 is in communication with the third outer port 1113, and the third orifice channel 1207 is in communication with the seventh outer port 107

The second heat exchange core 12 includes multiple plates which are laminated, each of the plates includes a first orifice 1201b, a second orifice 1202b, a third orifice 1203b and a fourth orifice 1204b, the first orifices 1201b in all the plates are aligned to form a fifth orifice channel 1209, the second orifices 1202b in all the plates are aligned to form a sixth orifice channel 1210, the third orifices 1203b in all the plates are aligned to form a seventh orifice channel 1211, and the fourth orifices 1204b in all the plates are aligned to form an eighth orifice channel 1212. The second heat exchange core 12 is substantially of a cuboid structure, the fifth orifice channel 1209, the sixth orifice channel 1210, the seventh orifice channel 1211 and the eighth orifice channel 1212 are located at positions close to corners of the second heat exchange core 12. Wherein, the fifth orifice channel 1209 is in communication with the sixth orifice channel 1210 to form a part of the second fluid communication cavity 15, the seventh orifice channel 1211 is in communication with the eighth orifice channel 1212 to form a part of the third fluid communication cavity 16, and the fourth orifice channel 1208 is in communication with the eighth orifice channel 1212 to form a part of the third fluid heat exchange channel. The third orifice channel 1207 is in communication with the fourth orifice channel 1208, the seventh orifice channel 1211 is in communication with the eighth outer port 108, and the sixth orifice channel 1210 is in communication with the sixth outer port 1116.

The first fluid communication cavity 14 includes the first orifice channel 1205 and the second orifice channel 1206, the second fluid communication cavity 15 includes the fifth orifice channel 1209 and the sixth orifice channel 1210, and the third fluid communication cavity 16 includes the third orifice channel 1207, the fourth orifice channel 1208, the eighth orifice channel 1212 and the seventh orifice channel 1211. In this way, three kinds of fluids flowing through the heat exchange core can exchange heat in the same fluid heat exchange assembly, to achieve the sufficient utilization of the energy. Of course, the fluid heat exchange assembly 10 may also allow only two kinds of fluids to flow in.

The heat exchange assembly 100 includes a first fluid channel, a second fluid channel, a third fluid channel, a fourth fluid channel and a fifth fluid channel. The first fluid channel includes the first outer port 1111, the first flow passage 201, the second flow passage 202, the first orifice channel 1205, the second orifice channel 1206 and the third outer port 1113. The third fluid channel includes the first outer port 1111, the first flow passage 201, the third flow passage 203 and the third outer port 1112. The second fluid channel includes the fourth outer port 1114, the fourth flow passage 204, the fifth flow passage 205, the fifth orifice channel 1209, the sixth orifice channel 1210, and the sixth outer port 1116. The fourth fluid channel includes the fourth outer port 1114, the fourth flow passage 204, the sixth flow passage 206 and the fifth outer port 1115. The fifth fluid channel includes the seventh outer port 107, the third orifice channel 1207, the fourth orifice channel 1208, the eighth orifice channel 1212, the seventh orifice channel 1211 and the eighth outer port 108. The first fluid control device 2a may be provided with an inlet of the first fluid channel, the second fluid control device 2b may be provided with an inlet of the second fluid channel, and the fluid heat exchange module 1 may be provided with an outlet of the first fluid channel and an outlet of the second fluid channel. In this way, a first fluid can enter the fluid heat exchange module from the first fluid control module, and the first fluid is regulated by the first fluid control device, to regulate the flow rate of the fluid entering into the fluid heat exchange module. And a second fluid can enter the fluid heat exchange module from the second fluid control device, and the second fluid is regulated by the second fluid control device, to regulate the flow rate of the fluid entering into the fluid heat exchange module, so that the fluids in the first fluid channel, the second fluid channel and the fifth fluid channel can achieve an effective and expected heat exchange effect in the fluid heat exchange module. In structure, the fluid heat exchange assembly includes five fluid channels, and the fluid heat exchange assembly integrates functions of fluid communication and fluid heat exchange, which has a compact structure and occupies a small installation space. The fluid heat exchange assembly is provided with multiple outer ports configured to be connected to outer systems, such that the installation is convenient, and the fluid control module and the fluid heat exchange module are not connected by connecting pipes, which reduces the waste of heat in pipelines.

The fluid heat exchange assembly includes at least following operating states:

a first operating state: the first flow passage 201 is not in communication with the second flow passage 202, and the first flow passage 201 is in communication with the third flow passage 203; the fluid flows through the first outer port 1111, the first flow passage 201, the third flow passage 203 and the third outer port 1112;

a second operating state: the first flow passage 201 is in communication with the second flow passage 202, and the first flow passage 201 is not in communication with the third flow passage 203; the fluid flows through the first outer port, the first flow passage 201, the second flow passage 202, the first orifice channel, the second orifice channel and the third outer port;

a third operating state: the first flow passage 201 is in communication with both the second flow passage 202 and the third flow passage 203; after flowing through the first outer port 1111 and the first flow passage 201, the fluid is divided into two branches, one of the branches flows through the second flow passage 202, the first orifice channel, the second orifice channel and the third outer port 1113, and the other flows through the third flow passage 203 and the third outer port 1112.

The fluid heat exchange assembly includes at least following operating states:

a fourth operating state: the fourth flow passage 204 is not in communication with the fifth flow passage 205, and the fourth flow passage 204 is in communication with the sixth flow passage 206; the fluid flows through the fourth outer port, the fourth flow passage 204, the sixth flow passage 206 and the fifth outer port;

a fifth operating state: the fourth flow passage 204 is in communication with the fifth flow passage 205, and the fourth flow passage 204 is not in communication with the sixth flow passage 206; the fluid flows through the fourth outer port, the fourth flow passage 204, the fifth flow passage 205, the seventh orifice channel, the eighth orifice channel and the sixth outer port;

a sixth operating state: the fourth flow passage 204 is in communication with both the fifth flow passage 205 and the sixth flow passage 206; after flowing through the fourth outer port and the fourth flow passage 204, the fluid is divided into two branches, one of the branches flows through the fifth flow passage 205, the seventh orifice channel, the eighth orifice channel and the sixth outer port, and the other flows through the sixth flow passage 206 and the fifth outer port.

With the regulation of the above at least six operating states of the fluid heat exchange assembly, the expected heat exchange of the fluid in the fluid heat exchange module can be realized, so that the fluid heat exchange assembly integrates dual functions of the fluid heat exchange and the fluid control.

Figure 60:
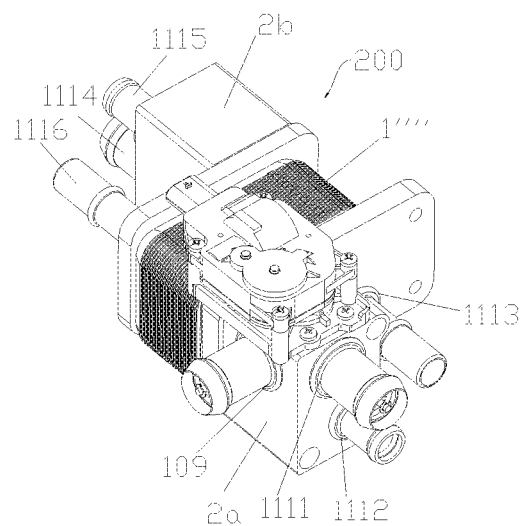
FIG. 60 is a perspective structural schematic view of yet another embodiment of the fluid heat exchange assembly.

In addition, reference is made to FIGS. 58 and 60, and FIG. 60 is a perspective structural schematic view of a fluid heat exchange assembly 200. The fluid heat exchange assembly may further include a ninth outer port 109, and the ninth outer port 109 is in communication with the first flow passage 201 of the fluid control module. The first fluid channel includes the ninth outer port 109, the first outer port 1111, the first flow passage 201, the second flow passage 202, the first orifice channel 1205, the second orifice channel 1206 and the third outer port 1113. The second fluid channel includes the ninth outer port 109, the first outer port 1111, the first flow passage 201, the third flow passage 203 and the third outer port 1112. In this way, the fluid in the fluid channel connected to the first outer port and the fluid in the fluid channel connected to the ninth outer port can be mixed and then be distributed to the second flow passage and/or the third flow passage.

The fluid heat exchange assemblies in the above embodiments may be applied in a thermal management system for vehicle, and the thermal management system for vehicle can be used to realize refrigeration and heating of the air conditioner, engine cooling, and/or battery heating and cooling and the like of the vehicle. As a specific embodiment, the thermal management system for vehicle includes a fluid heat exchange assembly and a battery assembly. The fluid control module includes a first flow passage, a second flow passage and a third flow passage, the fluid heat exchange module includes a first fluid communicating cavity and a second fluid communication cavity, and the first fluid communication cavity and the second fluid communication cavity are isolated from each other in the fluid heat exchange module. The fluid heat exchange assembly includes a first outer port, a second outer port, a third outer port, a fourth outer port and a fifth outer port. The first outer port is in communication with the first flow passage, the second outer port is in communication with the third flow passage, the second flow passage is in communication with the first fluid communication cavity, the fourth outer port is in communication with the second fluid communication cavity, and the fifth outer port is in communication with the second fluid communication cavity. An inlet and an outlet of the battery assembly are in communication with the first outer port and the second outer port. In this way, the thermal management system for vehicle can be applied in battery heating and cooling.

As another embodiment, the thermal management system for vehicle includes a fluid heat exchange assembly, the thermal management system for vehicle includes a coolant and a refrigerant, the first fluid is located in the first fluid communication cavity, the second fluid is located in the second fluid communication cavity, the coolant is defined as the first fluid, and the refrigerant is defined as the second fluid;

the fluid control module includes a first flow passage, a second flow passage and a third flow passage, the fluid heat exchange module includes a first fluid communicating cavity and a second fluid communication cavity, the first fluid communication cavity and the second fluid communication cavity are isolated from each other in the fluid heat exchange module, the fluid heat exchange assembly includes a first outer port, a second outer port, a third outer port, a fourth outer port and a fifth outer port, the first outer port is in communication with the first flow passage, the second outer port is in communication with the third flow passage, the second flow passage is in communication with the first fluid communication cavity, the fourth outer port is in communication with the second fluid communication cavity, and the fifth outer port is in communication with the second fluid communication cavity; the second fluid flows through the fourth outer port, the second fluid communication cavity and the fifth outer port.

The thermal management system for vehicle at least includes following operating states:

a first operating state: the first flow passage is not in communication with the second flow passage, the first fluid flows through the first outer port, the first flow passage, the third flow passage and the second outer port;

a second operating state: the first flow passage is in communication with the second flow passage, a flow rate of a fluid flowing into the second flow passage is controlled and can be regulated through a first valve core member; a part of the first fluid flows through the first outer port, the first flow passage, the second flow passage, the first fluid communication cavity and the third outer port, and another part of the first fluid flows through the first outer port, the first flow passage, the third flow passage and the second outer port.

It should be noted that: the above embodiments are only intended to illustrate the present application, but not to limit the technical solutions of the present application, for example, the directional delimitations of "front", "rear", "left", "right", "upper", "lower" and the like. Although the present application is described in detail with reference to the above embodiments, it should be understood by those skilled in the art that combinations, modifications or equivalent replacements can be made to the present application, and the technical solutions and the modifications without departing from the spirit and scope of the present application should all be deemed to fall into the scope of the present application defined by the claims.

What we claim is:

1. A fluid heat exchange assembly, comprising a module for fluid control and a module for fluid heat exchange, wherein:

the module for fluid control comprises a first connecting lateral portion, the module for fluid heat exchange comprises a second connecting lateral portion, and the first connecting lateral portion and the second connecting lateral portion are oppositely and sealingly arranged;

the module for fluid heat exchange comprises a heat exchange core and a connecting component fixed by welding, the connecting component is provided with the second connecting lateral portion, the connecting component comprises a third connecting lateral portion, the heat exchange core comprises a fourth connecting lateral portion, and the third connecting lateral portion and the fourth connecting lateral portion are fixed by welding;

the module for fluid control comprises at least a first flow passage and a second flow passage, the first flow passage is able to be in communication with the second flow passage; and the module for fluid heat exchange comprises a first fluid communication cavity, the second flow passage is in communication with the first fluid communication cavity, the connecting component comprises a connecting channel, the connecting channel runs through the connecting component, and the second flow passage and the first fluid communication cavity are connected by the connecting channel, the connecting component comprises a plane portion, the plane portion is located at the third connecting lateral portion, the plane portion is in contact with the heat exchange core and is fixed to the heat exchange core by welding, and the plane portion occupies at least ½ of an area of the fourth connecting lateral portion, the fluid heat exchange assembly further comprises a joint component, an end portion of the joint component is located in the module for fluid control and/or the module for fluid heat exchange, the module for fluid control and the module for fluid heat exchange are in communication with each other through the joint component, and the joint component extends into the connecting component in a certain degree; the second flow passage is in communication with an inner cavity of the joint component, and the first fluid communication cavity is in communication with the inner cavity of the joint component;

the joint component, the module for fluid control and the module for fluid heat exchange are separately arranged, the first connecting lateral portion is provided with a first opening, the second connecting lateral portion is provided with a second opening, and the joint component extends into the first opening and the second opening;

the module for fluid control comprises a first flow hole, the module for fluid heat exchange comprises a second flow hole, the first flow hole is in communication with the inner cavity of the joint component, and the second flow hole is in communication with the inner cavity of the joint component; and a diameter of the first flow hole is smaller than an inner diameter of the first opening, and a diameter of the second flow hole is smaller than an inner diameter of the second opening.

2. The fluid heat exchange assembly according to claim 1, wherein the module for fluid control comprises a through hole, the module for fluid heat exchange comprises a mounting hole corresponding to a position of the through hole, the fluid heat exchange assembly further comprises fasteners which extend into the through hole and the mounting hole; the first connecting lateral portion and the second connecting lateral portion are closely fitted; and/or the module for fluid control comprises a base member and a valve core member, the base member comprises a mounting cavity, at least a part of the valve core member is located in the mounting cavity, and the valve core member and the base member are sealingly fixed; the valve core member is rotatable with respect to the base member, communication between the second flow passage and the first flow passage is unblocked or blocked by the valve core member; or the base member comprises a third flow passage, communication between the third flow passage and the first flow passage is unblocked or blocked by the valve core member; or opening degrees of the second flow passage and the third flow passage are regulated through the valve core member; and/or the module for fluid heat exchange comprises a first fluid first port arranged on the connecting component, the module for fluid control comprises a first fluid first outlet in communication with the second flow passage, and the first fluid first outlet is in communication with the first fluid first port; the fluid heat exchange assembly comprises an isolating member, the isolating member is at least provided with a connecting orifice, and the connecting orifice is in communication with both the first fluid first port and the first fluid first outlet.

3. The fluid heat exchange assembly according to claim 2, wherein the module for fluid heat exchange comprises a first fluid first port arranged on the connecting component, the module for fluid control comprises a first fluid first outlet in communication with the second flow passage, and the first fluid first outlet is in communication with the first fluid first port; the fluid heat exchange assembly comprises an isolating member, the isolating member is at least provided with a connecting orifice, and the connecting orifice is in communication with both the first fluid first port and the first fluid first outlet, at least a part of one lateral portion of the isolating member abuts against the connecting component, at least a part of another lateral portion of the isolating member abuts against the module for fluid control; at least a part of the module for fluid control is isolated from the connecting component by the isolating member; or the fluid heat exchange assembly comprises an isolating region, the isolating region is a closed space, the isolating region is located between the module for fluid control and the connecting component, and the module for fluid control and the connecting component are isolated by the isolating region.

4. The fluid heat exchange assembly according to claim 3, wherein the fluid heat exchange assembly comprises the isolating region, the isolating member comprises a main frame, the main frame is of a hollow structure, one lateral portion of a periphery of the main frame abuts against the module for fluid control and another lateral portion of the periphery of the main frame abuts against the connecting component, and the number of the isolating region may be one, two or more; or the module for fluid control is isolated from the connecting component by the isolating member, the isolating member comprises an isolating portion, the isolating portion is arranged at a periphery portion and at least a part of an extended region of the connecting orifice, the isolating portion, the module for fluid control and the connecting component are sealingly arranged, the isolating portion abuts against the module for fluid control or a clearance is kept between the isolating portion and the module for fluid control, and the isolating portion abuts against the connecting component or a clearance is kept between the isolating portion and the connecting component.

5. The fluid heat exchange assembly according to claim 4, wherein a size of the connecting orifice is greater than or equal to sizes of the first fluid first port and the first fluid first outlet, the isolating member is made of one of plastic, nylon, resin or a mixture thereof;

the module for fluid control comprises a first mounting hole penetrating the module for fluid control, the isolating member comprises a second mounting hole penetrating the isolating member, the connecting component comprises a third mounting hole, positions of the first mounting hole, the second mounting hole, and the third mounting hole correspond to one another; and the fluid heat exchange assembly comprises a member for fixing, the member for fixing extends into the first mounting hole, the second mounting hole and the third mounting hole, and the module for fluid control, the isolating member and the connecting component are fixedly assembled.

6. The fluid heat exchange assembly according to claim 1, wherein at least one of the module for fluid control and the module for fluid heat exchange is provided with a first flat portion, the module for fluid control and the module for fluid heat exchange are each provided with a second flat portion, and the first flat portion is located around the first opening and/or the second opening;

the fluid heat exchange assembly comprises an element for sealing located at the first flat portion, the second flat portion is located around the first flow hole and the second flow hole, an end portion of the joint component abuts against at least one second flat portion; and a distance between the second flat portion of the module for fluid control and the second flat portion of the module for fluid heat exchange is greater than or equal to a length of the joint component.

7. The fluid heat exchange assembly according to claim 1, wherein an outer diameter of the joint component is smaller than the first opening and equal to or greater than the second opening, and the joint component is in interference fit with the module for fluid heat exchange; or the outer diameter of the joint component is smaller than the second opening and equal to or greater than the first opening, and the joint component is in interference fit with the module for fluid control.

8. The fluid heat exchange assembly according to claim 1, wherein the joint component is integrally arranged with one of the module for fluid control and the module for fluid heat exchange, and the joint component integrally protrudes from the first connecting lateral portion or the second connecting lateral portion; the other one of the module for fluid control and the module for fluid heat exchange is provided with a first opening and a first flat portion, and the first flat portion is located around the first opening;

the fluid heat exchange assembly further comprises an element for sealing located on the first flat portion.

9. The fluid heat exchange assembly according to claim 8, wherein a root portion of the joint component is provided with a flange, the flange is integrally arranged with the module for fluid heat exchange, and the flange is opposite to the first flat portion; the module for fluid control is provided with a first flow hole and a second flat portion, the second flat portion is located around the first flow hole, the first flat portion is located around the first opening, and an inner diameter of the first flow hole is smaller than an inner diameter of the first opening; or the flange is integrally arranged with the module for fluid control, the module for fluid heat exchange is provided with a second flow hole and a second flat portion, the second flat portion is located around the second flow hole, and an inner diameter of the second flow hole is smaller than the inner diameter of the first opening.

10. A thermal management system for vehicle, comprising a battery assembly and the fluid heat exchange assembly according to claim 1, wherein the module for fluid control comprises the first flow passage, the second flow passage and the third flow passage, the module for fluid heat exchange comprises the first fluid communicating cavity and a second fluid communication cavity, the first fluid communication cavity and the second fluid communication cavity are isolated from each other in the module for fluid heat exchange;

the fluid heat exchange assembly comprises a first outer port, a second outer port, a third outer port, a fourth outer port and a fifth outer port, the first outer port is in communication with the first flow passage, the second outer port is in communication with the third flow passage, the second flow passage is in communication with the first fluid communication cavity, the fourth outer port is in communication with the second fluid communication cavity, and the fifth outer port is in communication with the second fluid communication cavity; an inlet and an outlet of the battery assembly are in communication with the first outer port and the second outer port.

11. The thermal management system for vehicle, comprising the fluid heat exchange assembly according to claim 1, wherein the thermal management system for vehicle comprises a coolant and a refrigerant, a first fluid is in the first fluid communication cavity, a second fluid is in the second fluid communication cavity, the coolant is defined as the first fluid, and the refrigerant is defined as the second fluid; wherein the module for fluid control comprises the first flow passage, the second flow passage and the third flow passage, the module for fluid heat exchange comprises the first fluid communicating cavity and a second fluid communication cavity, the first fluid communication cavity and the second fluid communication cavity are isolated from each other in the module for fluid heat exchange;

the fluid heat exchange assembly comprises a first outer port, a second outer port, a third outer port, a fourth outer port and a fifth outer port, the first outer port is in communication with the first flow passage, the second outer port is in communication with the third flow passage, the second flow passage is in communication with the first fluid communication cavity, the fourth outer port is in communication with the second fluid communication cavity, and the fifth outer port is in communication with the second fluid communication cavity; the second fluid flows through the fourth outer port, the second fluid communication cavity and the fifth outer port; and the thermal management system for vehicle at least comprises:
a first operating state, wherein the first flow passage is not in communication with the second flow passage, the first fluid flows through the first outer port, the first flow passage, the third flow passage and the second outer port; and
a second operating state, wherein the first flow passage is in communication with the second flow passage, a flow rate of a fluid flowing into the second flow passage is controlled and can be regulated through a first valve core member; a part of the first fluid flows through the first outer port, the first flow passage, the second flow passage, the first fluid communication cavity and the third outer port, and another part of the first fluid flows through the first outer port, the first flow passage, the third flow passage and the second outer port.

12. A fluid heat exchange assembly, comprising a module for fluid control and a module for fluid heat exchange, wherein:

the module for fluid control comprises a first connecting lateral portion, the module for fluid heat exchange comprises a second connecting lateral portion, and the first connecting lateral portion and the second connecting lateral portion are oppositely and sealingly arranged;

the module for fluid heat exchange comprises a heat exchange core and a connecting component fixed by welding, the connecting component is provided with the second connecting lateral portion, the connecting component comprises a third connecting lateral portion, the heat exchange core comprises a fourth connecting lateral portion, and the third connecting lateral portion and the fourth connecting lateral portion are fixed by welding;

the module for fluid control comprises at least a first flow passage and a second flow passage, the first flow passage is able to be in communication with the second flow passage; and the module for fluid heat exchange comprises a first fluid communication cavity, the second flow passage is in communication with the first fluid communication cavity, the connecting component comprises a connecting channel, the connecting channel runs through the connecting component, and the second flow passage and the first fluid communication cavity are connected by the connecting channel, the connecting component comprises a plane portion, the plane portion is located at the third connecting lateral portion, the plane portion is in contact with the heat exchange core and is fixed to the heat exchange core by welding, and the plane portion occupies at least ½ of an area of the fourth connecting lateral portion, wherein the module for fluid control comprises a base member and a valve core member, the base member comprises a mounting cavity, at least a part of the valve core member is located in the mounting cavity, and the valve core member and the base member are sealingly fixed; the valve core member is rotatable with respect to the base member, communication between the second flow passage and the first flow passage is unblocked or blocked by the valve core member; or the base member comprises a third flow passage, communication between the third flow passage and the first flow passage is unblocked or blocked by the valve core member; or opening degrees of the second flow passage and the third flow passage are regulated through the valve core member, wherein the valve core member comprises a first valve plate, a second valve plate and a transmission member, the first valve plate and the second valve plate are located in the mounting cavity, the transmission member is fixedly arranged or limitedly arranged with the second valve plate, the second valve plate is rotatable with the transmission member, and the first valve plate is fixedly arranged or limitedly arranged with the base member;

the base member comprises at least a fluid first inlet, a fluid first outlet, the first flow passage and the second flow passage, the fluid first inlet is in communication with the first flow passage, and the fluid first outlet is in communication with the second flow passage;

the second valve plate is rotatable to unblock or block communication between the mounting cavity and the second flow passage, or to change a flow rate of a fluid entering the second flow passage; and the valve core member comprises a positioning shaft, the positioning shaft and the transmission member are separately arranged, the first valve plate comprises a first position-limiting hole, the second valve plate comprises a second position-limiting hole, at least one of the first position-limiting hole and the second position-limiting hole is a blind hole, at least a part of the positioning shaft is located in the first position-limiting hole, and at least another part of the positioning shaft is located in the second position-limiting hole.

13. The fluid heat exchange assembly according to claim 12, wherein an opening of the second position-limiting hole is toward the first valve plate, the second valve plate comprises a wall portion which forms the second position-limiting hole, the wall portion is opposite to the opening of the second position-limiting hole, at least a part of the positioning shaft is located in the first position-limiting hole and the second position-limiting hole, and the positioning shaft does not penetrate the second valve plate; or an opening of the first position-limiting hole is toward the second valve plate, the first valve plate comprises a wall portion which forms the first position-limiting hole, the wall portion is opposite to the opening of the first position-limiting hole, at least a part of the positioning shaft is located in the first position-limiting hole and the second position-limiting hole, and the positioning shaft does not penetrate the first valve plate.

14. The fluid heat exchange assembly according to claim 13, wherein
the opening of the second position-limiting hole is toward the first valve plate, the second valve plate comprises a wall portion which forms the second position-limiting hole, the wall portion of the second position-limiting hole is opposite to the opening of the second position-limiting hole, and the positioning shaft does not penetrate the second valve plate;
the opening of the first position-limiting hole is toward the second valve plate, the first valve plate comprises a wall portion which forms the first position-limiting hole, the wall portion of the first position-limiting hole is opposite to the opening of the first position-limiting hole, and the positioning shaft does not penetrate the first valve plate;
the positioning shaft is located in the first position-limiting hole and the second position-limiting hole, and a height of the positioning shaft is not greater than the sum of a depth of the first position-limiting hole and a depth of the second position-limiting hole; or
the opening of the second position-limiting hole faces the first valve plate, the second valve plate comprises a wall portion which forms the second position-limiting hole, the wall portion is opposite to the opening of the second position-limiting hole, and the positioning shaft does not penetrate the second valve plate; the first position-limiting hole is a through hole, one end of the positioning shaft is located in the second position-limiting hole, and the other end of the positioning shaft extends out of the first position-limiting hole; or
the second position-limiting hole is a through hole, the second valve plate comprises a wall portion and a side wall which form the second position-limiting hole, the wall portion is opposite to the opening of the second position-limiting hole; an equivalent inner diameter of the side wall is smaller than an equivalent inner diameter of the positioning shaft, an end portion of the positioning shaft abuts against the wall portion of the second position-limiting hole, or a clearance is kept between the end portion of the positioning shaft and the wall portion of the second position-limiting hole.

15. The fluid heat exchange assembly according to claim 12, wherein the second valve plate comprises a positioning hole, the positioning hole is located at a lateral portion of the second valve plate away from the first valve plate, the positioning hole does not penetrate the second valve plate;
the transmission member comprises a body portion and a matching portion, the matching portion and the body portion are integrally arranged, the matching portion protrudes in an axial direction of the transmission member from the body portion, and the matching portion is arranged to match with the positioning hole; and
two or more matching portions are provided, the body portion comprises an inward retracted portion, the inward retracted portion is located between the matching portions, a clearance is kept between the inward retracted portion and the second valve plate, and the second valve plate is located between the inward retracted portion and the positioning shaft, or a clearance is kept between the inward retracted portion and the positioning shaft.

16. The fluid heat exchange assembly according to claim 15, wherein the base member comprises a fluid second outlet and a third flow passage, the fluid second outlet is in communication with the third flow passage, the second valve plate is rotatable, and the mounting cavity is in communication with at least one of the second flow passage and the third flow passage;
the first valve plate comprises a first through hole and a second through hole, the second valve plate comprises at least one communication hole, the communication hole is not larger than the first through hole in size, and the communication hole is not larger than the second through hole in size;
an operation position of the second valve plate at least comprises a first position and a second position, when the second valve plate is located at the first position, the second valve plate unblocks the communication between the first through hole and the second flow passage, and blocks the communication between the second through hole and the third flow passage;
when the second valve plate is at the second position, the second valve plate unblocks the communication between the second through hole and the third flow passage, and blocks communication between the first through hole and the second flow passage; and
when the second valve plate is located between the first position and the second position, the first through hole and the second through hole are opened at the same time, the sum of an opening degree of the first through hole and an opening degree of the second through hole equals to a full opening degree of the first through hole or a full opening degree of the second through hole.

17. The fluid heat exchange assembly according to claim 16, wherein the first valve plate comprises a first positioning hole, the base member comprises a second positioning hole located at a bottom of the mounting cavity, a position of the second positioning hole corresponds to a position of the first positioning hole, an opening of the first positioning hole is located at a side of the first valve plate facing the bottom of the mounting cavity, and the first positioning hole does not penetrate the first valve plate;
the flow control device comprises a positioning pin located in the first positioning hole and the second positioning hole, the base member and the first valve plate are kept fixed to each other through the positioning pin;
the first valve plate has a disc-shaped structure, and comprises an isolating portion, a first through hole and a second through hole, the first through hole and the second through hole are isolated by the isolating portion, the first position-limiting hole is located at the isolating portion and at a center of a circle of the first valve plate, and the first positioning hole is located at the isolating portion;
a number of the positioning holes is two or more, the positioning holes are located on a symmetric line of a second opening and a third opening or located at positions adjacent to the symmetric line, and the positioning pin is located in the first positioning hole, the positioning hole and second positioning hole.

18. The fluid heat exchange assembly according to claim 17, wherein the base member comprises the first opening located at a side portion of the mounting cavity and the second opening and the third opening located at the bottom of the mounting cavity, the first flow passage is in communication with the first opening, the second flow passage is in communication with the second opening, and the third flow passage is in communication with the third opening;

the first through hole is larger than or equal to the second opening in size, the second through hole is larger than or equal to the third opening in size, the first opening is located at one side of the first valve plate and/or the second valve plate, the second opening and the third opening are located at another side of the first valve plate and/or the second valve plate;

the first valve plate comprises a first face and a second face oppositely arranged, the first face and the base member are in sealing contact with each other or the first face and the base member are sealingly arranged by providing an element for sealing, and the second face of the first valve plate is in contact with the second valve plate.

19. The fluid heat exchange assembly according to claim 12, wherein the flow control module comprises a sealing sheet, the first face of the first valve plate and the base member are sealed by the sealing sheet;

the sealing sheet comprises an isolating portion and a positioning through hole, the positioning through hole is located at the isolating portion, the first valve plate comprises a first positioning hole, a position of the first positioning hole corresponds to a position of the positioning through hole, the valve core member comprises a positioning pin, and the positioning pin is located in the first positioning hole and the positioning through hole;

the base member comprises a second positioning hole located at the bottom of the mounting cavity, a position of the second positioning hole corresponds to the position of the positioning through hole, two or more positioning through holes are provided, the positioning through holes are located on the symmetric line of the second opening and the third opening or located at positions adjacent to the symmetric line, and the positioning pin is located in the first positioning hole, the positioning through hole and second positioning hole;

the sealing sheet comprises a third through hole and a fourth through hole, the third through hole and the fourth through hole are isolated by the isolating portion, the third through hole is in communication with the second opening, and the fourth through hole is in communication with the third opening;

the second valve plate comprises a third face and a fourth face oppositely arranged, the third face of the second valve plate is in sealing contact with the second face of the first valve plate, and the third face of the second valve plate rotates along the second face of the first valve plate, a roughness of the third face of the second valve plate is smaller than or equal to that of the second face of the second valve plate, and a roughness of the first face of the first valve plate is smaller than or equal to that of the second face of the first valve plate;

the first valve plate is disc-shaped, the second valve plate is disc-shaped, the second valve plate comprises two communication holes, the second position-limiting hole is located at a center of a circle of the second valve plate, the two communication holes are symmetrically arranged with respect to the second position-limiting hole, and the two communication holes have the same size; or the second valve plate comprises a plurality of communication holes, the first valve plate comprises a first through hole and a second through hole, the sum of areas of the plurality of communication holes is not greater than an area of the first through hole, and the sum of areas of the plurality of communication holes is not greater than an area of the second through hole.

* * * * *